US000001248H

United States Statutory Invention Registration [19]

[11] Reg. Number: H1248

Sakanoue et al.

[43] Published: Nov. 2, 1993

[54] SILVER HALIDE COLOR PHOTOGRAPHIC MATERIALS

[75] Inventors: Kei Sakanoue; Hidetoshi Kobayashi, both of Kanagawa, Japan

[73] Assignee: Fuji Photo Film Co., Ltd., Japan

[21] Appl. No.: 206,462

[22] Filed: Jun. 14, 1988

[30] Foreign Application Priority Data

Jun. 15, 1987 [JP] Japan ..... 62-146876

[51] Int. Cl.[5] ..... G03C 1/08

[52] U.S. Cl. ..... 430/543; 430/552; 430/553

[58] Field of Search ..... 430/552, 553, 549, 955, 430/430, 393

[56] References Cited

U.S. PATENT DOCUMENTS

| | | | |
|---|---|---|---|
| 2,362,598 | 11/1944 | Vittum et al. | 430/552 |
| 4,075,021 | 2/1978 | Kikuchi et al. | 430/955 |
| 4,690,889 | 9/1987 | Saito et al. | 430/553 |
| 4,725,530 | 2/1988 | Kobayashi et al. | 430/553 |
| 4,842,994 | 6/1989 | Sakanoue et al. | 430/549 |

FOREIGN PATENT DOCUMENTS

| | | |
|---|---|---|
| 0161626 | 11/1985 | European Pat. Off. . |
| 0193389 | 9/1986 | European Pat. Off. . |

OTHER PUBLICATIONS

Research Disclosure No. 11449, Oct. 1973, "Bleach Accelerater Releasing Coupler".

Research Disclosure, No. 242, Jun. 1984, pp. 286–292, No. 24241, Industrial Opportunities, Hauant, Hampshire, GB: R. Pollet et al.

*Primary Examiner*—Robert L. Stoll
*Assistant Examiner*—Joseph D. Anthony
*Attorney, Agent, or Firm*—Sughrue, Mion, Zinn, Macpeak & Seas

[57] ABSTRACT

A Silver halide color photographic materials comprising a support having thereon at least one silver halide emulsion layer, wherein said material contains (1) at least one type of compound which reacts with the oxidized product of a primary aromatic amine based developing agent and releases a bleach accelerating agent, and (2) at least one type of cyan dye forming coupler represented by general formula (A) below:

General formula (A)

wherein $R_1$, $R_2$, $R_3$, T and l' are defined as in the specification.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC MATERIALS

FIELD OF THE INVENTION

This invention relates to silver halide color photographic materials.

BACKGROUND OF THE INVENTION

In general, silver halide color photographic materials are processed basically by means of a color development process and a de-silvering process. Thus, the exposed silver halide is reduced by means of a color developing agent to form silver during the color developing process and at the same time, the oxidized form of the color developing agent reacts with a color forming agent (coupler) to provide a colored image. The silver which is formed at this time is subsequently oxidized by means of a bleaching agent and then transformed into a soluble silver complex by the action of a fixing agent, the silver being dissolved and removed in the de-silvering process.

Strong demands have arisen in the industry in recent years for quicker processing, which is to say for shorter processing times, and particularly the shortening of the de-silvering process which accounts for about half of the processing time.

Disclosures concerning bleach accelerating compound releasing type couplers have been made in *Research Disclosure* Nos. 24241 and 11449, and in Japanese Patent Application (OPI) No. 201247/86, as a way of increasing bleaching power. It is known that de-silvering properties can be improved by using silver halide color photographic materials which contain these bleach accelerating compound releasing type couplers.

However, photosensitive materials which contain the said bleach accelerating compound releasing type couplers suffer from a pronounced worsening of the cyan image re-coloring properties when they are processed quickly in the de-silvering process.

On the other hand, there are various known cyan image forming couplers which are effective for improving the re-coloring properties of the cyan image (for example the ureidophenol type cyan couplers disclosed in U.S. Pat. No. 4,333,999 and Japanese Patent Application (OPI) Nos. 207593/82, 204544/82, 11863/83 etc., the 5-amidonaphthol cyan couplers disclosed in Japanese Patent Application (OPI) Nos. 237448/85, 145557/86 and 153640/86 and, additionally, the diacylaminophenol type cyan couplers which are used in the field of color paper, etc.), and a 2-ureidophenol type cyan coupler which has a 4-cyanophenyl group, a type of cyan image forming coupler which is effective in terms of the re-coloring properties, is used in the examples of Japanese Patent Application (OPI) No. 201247/86 which concerns the above mentioned bleach accelerating compound releasing type couplers.

However, it has been found that there is a disadvantage in that a satisfactory minimum density cannot be obtained when 2-ureidophenol type cyan couplers are used as cyan image forming couplers. This disadvantage is especially pronounced when high speed processing is used, Thus, it does not give rise to the solution of the problem of shortening the de-silvering process. Furthermore, the diacylaminophenol type cyan couplers also undesirably tend to have a high level of residual color and increased minimum image density similar to that observed with the ureido type.

This invention is intended to solve the above-described problems, which arise with silver halide color photographic materials which contain bleach accelerating agent releasing type compounds.

SUMMARY OF THE INVENTION

Accordingly, an object of the invention is to provide silver halide color photographic materials which are superior in terms of de-silvering speed and which have good color re-forming properties and minimum image densities.

It has been found that the above mentioned object of the invention can be achieved by means of silver halide color photographic materials of which the distinguishing feature is that (1) at least one type of compound which reacts with the oxidized product of a primary aromatic amine based developing agent and releases a bleach accelerating agent, and (2) at least one type of cyan dye forming coupler represented by general formula (A) below are contained in a silver halide color photographic material which has at least one silver halide emulsion layer on a support.

General formula (A)

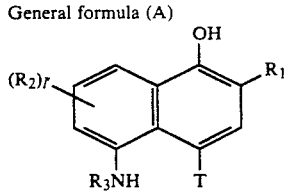

In general formula (A), $R_1$ represents a halogen atom, an aliphatic group, an aromatic group, a heterocyclic group, an amidino group, a guanidino group or a group which can be represented by $-COR_4$, $-SO_2R_4$, $-SOR_4$,

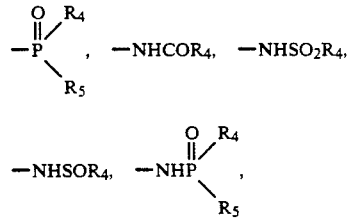

$R_2$ represents a halogen atom, a hydroxyl group, a carboxyl group, a sulfo group, an amino group, a cyano group, a nitro group, an aliphatic group, an aromatic group, a carbonamido group, a sulfonamido group, a carbamoyl group, a sulfamoyl group, a ureido group, an acyl group, an acyloxy group, an aliphatic oxy group, an aromatic oxy group, an aliphatic sulfonyl group, an aromatic sulfonyl group, an aliphatic sulfinyl group, an aromatic sulfinyl group, an aliphatic oxycarbonyl group, an aromatic oxycarbonyl group, an aliphatic oxycarbonylamino group, an aromatic oxycarbonylamino group, a sulfamoylamino group, a heterocyclic group or an imido group, l' represents an integer of value from 0 to 3, $R_3$ represents a hydrogen atom or $R_6U$, and T represents a hydrogen atom or a group which can be eliminated by a coupling reaction with the oxidized product of a primary aromatic amine developing agent, wherein $R_4$ and $R_5$ each represent independently an aliphatic group, an aromatic group, a heterocyclic group, an amino group, an aliphatic oxy group or an aromatic oxy group, and $R_6$ represents a hydrogen atom, an aliphatic group, an aromatic group, a heterocyclic group, $—OR_7$, $—SR_7$, $—COR_8$,

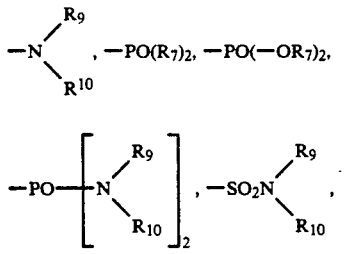

$—CO_2R_7$, $—SO_2R_7$, $—SO_2OR_7$ or an imido group, and U represents $>N—R_9$, —CO—, $—SO_2—$, —SO— or a simple bond, wherein $R_7$ represents an aliphatic group, an aromatic group or a heterocyclic group, $R_8$ represents a hydrogen atom, an aliphatic group, an aromatic group or a heterocyclic group, and $R_9$ and $R_{10}$ each represent independently a hydrogen atom, an aliphatic group, an aromatic group, a heterocyclic group, an acyl group, an aliphatic sulfonyl group or an aromatic sulfonyl group.

When l' is 2 or 3 the $R_2$ groups may be the same or different, and they may be joined together to form a ring. $R_2$ and $R_3$, or $R_3$ and T, may be joined together, respectively, to form rings. Furthermore, dimers or oligomers or polymers which are linked together via divalent groups or groups of a valency greater than two for any of $R_1$, $R_2$, $R_3$ or T may also be formed.

In this invention it has been surprisingly found, that when a photosensitive material which contains a compound which reacts with the oxidized product of a primary aromatic amine based color developing agent and releases a bleach accelerating agent (hereinafter referred to as a "bleach accelerating agent releasing type compound") is processed quickly, not only are the recoloring properties improved, but the minimum density obtained is also effectively suppressed by the inclusion in the photosensitive material of the specific cyan image forming coupler represented by general formula (A).

DETAILED DESCRIPTION OF THE INVENTION

The compounds which can be used in the invention are described in more detail below.

The aliphatic groups are linear chain, branched or cyclic alkyl groups, alkenyl groups or alkynyl groups, and they may be substituted or unsubstituted groups.

The aromatic groups are substituted or unsubstituted aryl groups and they may have condensed rings.

The heterocyclic groups are substituted or unsubstituted, single ring or condensed ring type heterocyclic groups.

Actual examples of aliphatic groups include a methyl group, an ethyl group, an n-propyl group, a i-propyl group, an n-butyl group, an i-butyl group, a t-butyl group, a cyclopentyl group, a t-pentyl group, a cyclohexyl group, an n-octyl group, a 2-ethylhexyl group, an n-decyl group, an n-dodecyl group, an n-tetradecyl group, an n-hexadecyl group, an n-octadecyl group, a 2-hexyldecyl group, an adamantyl group, a trifluoromethyl group, a carboxymethyl group, a methoxyethyl group, a vinyl group, an allyl group, a hydroxyethyl group, a heptafluoropropyl group, a benzyl group, a phenethyl group, a phenoxyethyl group, a methylsulfonylethyl group, a methanesulfonamidoethyl group, a 3-(2-ethylhexyloxy)propyl group, a 3-n-decyloxypropyl group, a 3-n-dodecyloxypropyl group, a 3-n-tetradecyloxypropyl group, an oleyl group, a propargyl group, an ethynyl group, a 3-(2,4-di-t-pentylphenoxy)-propyl group, a 4-(2,4-di-t-pentylphenoxy)butyl group, a 1-(2,4-di-t-pentylphenoxy)propyl group, a 1-(2,4-di-t-pentylphenoxy)pentyl group, a 1-(3-tetradecylphenoxy)propyl group, a 2-n-dodecylthioethyl group etc.

Actual examples of aromatic groups include a phenyl group, a p-tolyl group, an m-tolyl group, an o-tolyl group, a 4-chlorophenyl group, a 4-nitrophenyl group, a 4-cyanophenyl group, a 4-hydroxyphenyl group, a 3-hydroxyphenyl group, a 1-naphthyl group, a 2-naphthyl group, an o-biphenylyl group, a p-biphenylyl group, a pentafluorophenyl group, a 2-methoxyphenyl group, a 2-ethoxyphenyl group, a 4-methoxyphenyl group, a 4-t-butylphenyl group, a 4-t-octylphenyl group, a 4-carboxyphenyl group, a 4-methanesulfonamidophenyl group, a 4-(4-hydroxyphenylsulfonyl)phenyl group, a 2-n-tetradecyloxyphenyl group, a 4-n-tetradecyloxyphenyl group, a 2-chloro-5-n-dodecyloxyphenyl group, a 3-n-pentadecylphenyl group, a 2-chlorophenyl group, a 4-methoxycarbonylphenyl group, a 4-methylsulfonylphenyl group, a 2,4-di-t-pentylphenyl group etc.

Actual examples of heterocyclic groups include a 2-pyridyl group, a 3-pyridyl group, a 4-pyridyl group, a 2-furyl group, a 2-thienyl group, a 3-thienyl group, a 4-quinolyl group, a 2-imidazolyl group, a 2-benzimidazolyl group, a 4-pyrazolyl group, a 2-benzooxazolyl group, a 2-benzothiazolyl group, a 1-imidazolyl group, a 1-pyrazolyl group, a 5-tetrazolyl group, a 1,3,4-thiadiazol-2-yl group, a 2-prolyl group, a 3-triazolyl group, a 4-oxazolyl group, a 4-thiazolyl group, a 2-pyrimidyl group, a 1,3,5-triazin-2-yl group, a 1,3,4-oxadiazol-2-yl group, a 5-pyrazolyl group, a 4-pyrimidyl group, a 2-pyrazyl group, a succinimido group, a phthalimido group, a morpholino group, a pyrrolidino group, a piperidino group, an imidazolidin-2,4-dione-3-yl group, imidazolidin-2,4-dione-1-yl group, an oxazolidin-2,4-dione-3-yl group etc.

The individual substituent groups in general formula (A) are described in detail below.

$R_1$ in general formula (A) represents a halogen atom, aliphatic group, aromatic group, heterocyclic group, amidino group, guanidino group or a group which can be represented by $—COR_4$, $—SO_2R_4$, $—SOR_4$,

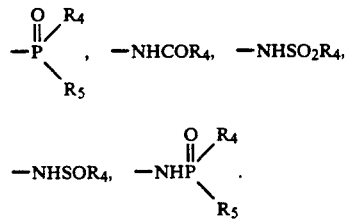

Here $R_4$ and $R_5$ each individually represent an aliphatic group which has from 1 to 30 carbon atoms, an aromatic group which has from 6 to 30 carbon atoms, a heterocyclic group which has from 1 to 30 carbon atoms, an amino group which has from 0 to 30 carbon atoms (for example an amino group, a methylamino group, a dimethylamino group, an n-butylamino group, an anilino group, an N-(2-n-tetradecyloxyphenyl)amino group, a pyrrolidino group, a morpholino group, a piperidino group, a 2-ethylhexylamino group, an n-dodecylamino group, an N-methyl-N-dodecylamino group, a 3-dodecyloxypropylamino group, a 3-(2,4-di-t-pentylphenoxy)propylamino group, a 4-(2,4-di-t-pentylphenoxy)butylamino group etc.), an aliphatic oxy group which has from 1 to 30 carbon atoms (for example a methoxy group, an ethoxy group, a butoxy group, a methoxyethoxy group, an n-dodecyloxy group, a 3(2,4-di-t-pentylphenoxy)propoxy group etc.) or an aromatic oxy group which has from 6 to 30 carbon atoms (for example a phenoxy group, a 4-n-dodecyloxyphenoxy group, a 4methoxycarbonylphenoxy group etc.). $R_4$ and $R_5$ may be joined together to form a ring. When $R_1$ is a halogen atom it is a fluorine atom, chlorine atom, bromine atom or iodine atom. When $R_1$ is an amidino group or a guanidino group, the total number of carbon atoms is from 1 to 30, and these groups may be substituted with aliphatic groups, aromatic groups, hydroxyl groups, aliphatic oxy groups, acyl groups, aliphatic sulfonyl groups, aromatic sulfonyl groups, acyloxy groups, aliphatic sulfonyloxy group or aromatic sulfonyloxy groups, and two nitrogen atoms may be joined together to form a heterocyclic ring such as an imidazole or a benzimidazole etc.

$R_2$ in general formula (A) represents a halogen atom (a fluorine atom, a chlorine atom, a bromine atom or an iodine atom), a hydroxyl group, a carboxyl group, a sulfo group, a cyano group, a nitro group, an amino group which has from 0 to 30 carbon atoms (for example an amino group, a methylamino group, a dimethylamino group, a pyrrolidino group, an anilino group etc.), an aliphatic group which has from 1 to 30 carbon atoms, an aromatic group which has from 6 to 30 carbon atoms, a carbonamido group which has from 1 to 30 carbon atoms (for example a formamido group, an acetamido group, a trifluoroacetamido group, a benzamido group etc.), a sulfonamido group which has from 1 to 30 carbon atoms (for example a methanesulfonamido group, a trifluoromethanesulfonamido group, an n-butanesulfonamido group, a p-toluenesulfonamido group etc.), a carbamoyl group which has from 1 to 30 carbon atoms (for example a carbamoyl group, an N,N-dimethylcarbamoyl group, an N-methylcarbamoyl group, a pyrrolidinocarbamoyl group, an N-n-hexadecylcarbamoyl group etc.), a sulfamoyl group which has from 0 to 30 carbon atoms (for example a sulfamoyl group, an N-methylsulfamoyl group, an N,N-dimethylsulfamoyl group, a morpholinosulfonyl group, an N-n-dodecylsulfamoyl group etc.), a ureido group which has from 1 to 30 carbon atoms (for example a ureido group, a 3-methylureido group, a 3-phenylureido group, a 3,3-dimethylureido group etc.), an acyl group which has from 1 to 30 carbon atoms (for example an acetyl group, a pivaloyl group, a benzoyl group, a dodecanoyl group etc.), an acyloxy group which has from 1 to 30 carbon atoms (for example an acetoxy group, a benzoyloxy group etc.), an aliphatic oxy group which has from 1 to 30 carbon atoms, an aromatic oxy group which has from 6 to 30 carbon atoms, an aliphatic thio group which has from 1 to 30 carbon atoms, an aromatic thio group which has from 6 to 30 carbon atoms, an aliphatic sulfonyl group which has from 1 to 30 carbon atoms, an aromatic sulfonyl group which has from 6 to 30 carbon atoms, an aliphatic sulfinyl group which has from 1 to 30 carbon atoms, an aromatic sulfinyl group which has from 6 to 30 carbon atoms, an aliphatic oxycarbonyl group which has from 2 to 30 carbon atoms, an aromatic oxycarbonyl group which has from 7 to 30 carbon atoms, an aliphatic oxycarbonylamino group which has from 2 to 30 carbon atoms, an aromatic oxycarbonylamino group which has from 7 to 30 carbon atoms, a sulfamoylamino group which has from 0 to 30 carbon atoms (for example a sulfamoylamino group, a 3,3-dimethylsulfamoylamino group, a piperidinosulfonylamino group etc.), a heterocyclic group which has from 1 to 30 carbon atoms or an imido group which has from 4 to 30 carbon atoms (for example a succinimido group, a maleimido group, a phthalimido group, a diglycolimido group, a 4-nitrophthalimido group etc.).

$R_3$ in general formula (A) represents a hydrogen atom or $R_6U$. Here $R_6$ represents a hydrogen atom, an aliphatic group which has from 1 to 30 carbon atoms, an aromatic group which has from 6 to 30 carbon atoms, a heterocyclic group which has from 1 to 30 carbon atoms,

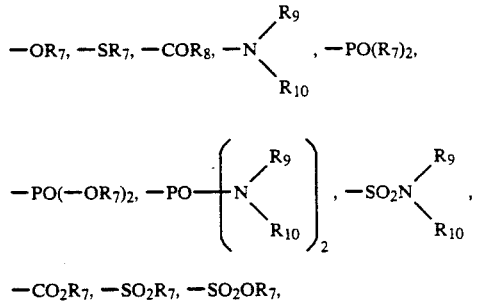

or an imido group which has from 4 to 30 carbon atoms (for example a succinimido group, a maleimido group, a phthalimido group, a diacetylamino group etc.) and U represents $>N-R_9$, —CO—, $-SO_2-$, —SO— or a simple bond, and $R_7$ represents an aliphatic group which has from 1 to 30 carbon atoms, an aromatic group which has from 6 to 30 carbon atoms or a heterocyclic group which has from 1 to 30 carbon atoms, $R_8$ represents a hydrogen atom, an aliphatic group which has from 1 to 30 carbon atoms, an aromatic group which has from 6 to 30 carbon atoms or a heterocyclic group which has from 1 to 30 carbon atoms, and $R_9$ and $R_{10}$ are each independently represent a hydrogen atom, an aliphatic group which has from 1 to 30 carbon atoms, an aromatic group which has from 6 to 30 carbon atoms, a heterocyclic group which has from 1 to 30 carbon atoms, an acyl group which has from 1 to 30 carbon atoms (for example an acetyl group, a trifluoroacetyl group, a benzoyl group, a p-chlorobenzoyl group etc.) or a sulfonyl group which has from 1 to 30 carbon atoms (for example a methylsulfonyl group, an n-butylsulfonyl group, a phenylsulfonyl group, a p-nitrophenylsulfonyl group etc.). $R_9$ and $R_{10}$ may be joined together to form a ring.

T in general formula (A) represents a hydrogen atom or a group which can be eliminated by a coupling reaction with the oxidized product of a primary aromatic amine developing agent. Here, examples of the latter groups include halogen atoms (a fluorine atom, a chlorine atom, a bromine atom and an iodine atom), a sulfo group, a thiocyanato group, an iso-thiocyanato group, a selenocyanato group, aliphatic oxy groups which have from 1 to 30 carbon atoms, aromatic oxy groups which have from 6 to 30 carbon atoms, aliphatic thio groups which have from 1 to 30 carbon atoms, aromatic thio groups which have from 6 to 30 carbon atoms, heterocyclic thio groups which have from 1 to 30 carbon atoms, heterocyclic oxy groups which have from 1 to 30 carbon atoms, aromatic azo groups which have from 6 to 30 carbon atoms, heterocyclic groups which have from 1 to 30 carbon atoms, acyloxy groups which have from 1 to 30 carbon atoms (for example an acetoxy group, a benzoyloxy group etc.), sulfonyloxy groups which have from 1 to 30 carbon atoms (for example a methylsulfonyloxy group, a p-tolylsulfonyloxy group etc.), carbamoyloxy groups which have from 1 to 30 carbon atoms (for example an N,N-dimethylcarbamoyloxy group, a pyrrolidinocarbonyloxy group, an N-ethylcarbamoyloxy group etc.), a thiocarbonyloxy groups which have from 2 to 30 carbon atoms (for example a methylthiocarbonyloxy group, a phenylthiocarbonyloxy group etc.), and carbonyldioxy groups which have from 2 to 30 carbon atoms (for example a methoxycarbonyloxy group, a phenoxycarbonyloxy group etc.).

In general formula (A), $R_2$ and $R_3$, $R_3$ and T, or a plurality of $R_2$ may be joined together, respectively, to form rings. Examples of $R_2$ joined to $R_3$ include —$CH_2CO$—, —OCO—, —NHCO—, —$C(CH_3)_2CO$—, —CH=CHCO— etc. Examples of T joined to $R_3$ include —$CH_2C$—, —COO— etc. Examples in which a plurality of $R_2$ are joined together include —$(CH_2)_3$—, —$(CH_2)_4$—, —OCO—, —OCONH—, —NHCONH—, —$(CH=CH)_2$—, —$OCH_2O$—, —$OCH_2CH_2O$—, —$OC(CH_3)_2O$— etc.

Examples of the preferred substituent groups on the compounds which can be represented by general formula (A) are described below.

$R_1$ in general formula (A) is preferably a halogen atom, —$COR_4$ or —$SO_2R_4$, and cases in which $R_4$ is an amino group are more desirable. Examples of —$COR_4$ include a carbamoyl group, an N-ethylcarbamoyl group, an N-n-butylcarbamoyl group, an N-cyclohexylcarbamoyl group, an N-(2-ethylhexyl)carbamoyl group, an n-dodecylcarbamoyl group, an N-hexadecylcarbamoyl group, an N-(3-decyloxypropyl)carbamoyl group, an N-(3-dodecyloxypropyl)carbamoyl group, an N-[3-(2,4-di-t-pentylphenoxy)propyl]-carbamoyl group, an N-[4-(2,4-di-t-pentylphenoxy)butyl]-carbamoyl group, an N,N-dimethylcarbamoyl group, an N,N-dibutylcarbamoyl group, an N-methyl-N-dodecylcarbamoyl group, morpholinocarbamoyl group, an N-methyl-N-phenylcarbamoyl group, an N-(2-tetradecyloxyphenyl)-carbamoyl group, an N-phenylcarbamoyl group, an N-(4-tetradecyloxyphenyl)carbamoyl group, an N-(2-propoxyphenyl)carbamoyl group, an N-(2-chloro-5-dodecyloxyphenyl)carbamoyl group, an N-(2-chlorophenyl)carbamoyl group etc., and examples of —$SO_2R_4$ include a sulfamoyl group, an N-methylsulfamoyl group, an N,N-diethylsulfamoyl group, an N,N-diisopropylsulfamoyl group, an N-(3-dodecyloxypropyl)carbamoyl group, an N-[3-(2,4-di-t-pentylphenoxy)propyl]carbamoyl group, an N-[4-(2,4-di-t-pentylphenoxy)butyl]carbamoyl group, a pyrrolidinosulfonyl group, an N-phenylsulfonyl group, an N-(2-butoxyphenyl)carbamoyl group, an N-(2-tetradecyloxyphenyl)carbamoyl group etc. The —$COR_2$ groups (where $R_4$ is an amino group) are the most desirable for $R_1$.

l' in $(R_2)_{l'}$ in general formula (A) is preferably equal to 0, followed by l'=1. When l'=1, $R_2$ is preferably a halogen atom, an aliphatic group, an aliphatic oxy group, a carbonamido group, a sulfonamido group, a cyano group etc., and of these a fluorine atom, a chlorine atom, a trifluoromethyl group, a methoxy group or a cyano group is the most desirable. The $R_2$ group is preferably substituted in the 2-position or the 4-position with respect to the $R_3NH$— group.

$R_6$ in $R_3$ of general formula (A) is preferably an aliphatic group, an aromatic group, —$OR_7$ or —$SR_7$, and U is preferably —CO— or —$SO_2$—. Examples of aliphatic groups include a methyl group, a trifluoromethyl group, a trichloromethyl group, an ethyl group, a heptafluoropropyl group, a t-butyl group, a 1-ethylpentyl group, a cyclohexyl group, a benzyl group, an undecyl group, a tridecyl group, a 1-(2,4-di-t-pentylphenoxy)-propyl group etc., examples of aromatic groups include a phenyl group, a 1-naphthyl group, a 2-naphthyl group, a 2-chlorophenyl group, a 4-methoxyphenyl group, a 4-nitrophenyl group, a pentafluorophenyl group, etc., examples of —$OR_7$ include a methoxy group, an ethoxy group, an iso-propoxy group, an n-butoxy group, an iso-butoxy group, a t-butoxy group, an n-pentyloxy group, an n-hexyloxy group, an n-octyloxy group, a 2-ethylhexyloxy group, an n-decyloxy group, an n-dodecyloxy group, a 2-methoxyethoxy group, a benzyloxy group, a trichloroethoxy group, a trifluoroethoxy group, a phenoxy group, a p-methylphenoxy group etc., and examples of —$SR_7$ include a methylthio group, an ethylthio group, an allylthio group, an n-butylthio group, a benzylthio group, an n-dodecylthio group, a phenylthio group, a p-t-octylphenylthio group, a p-dodecylphenylthio group, a p-octyloxyphenylthio group etc. $R_3$ is preferably an aliphatic oxycarbonyl group (where $R_6$ is an $R_7O$— group and U is an —CO— group), or an aliphatic or aromatic sulfonyl group (where $R_6$ is an aliphatic or aromatic group and U is an —$SO_2$— group), and it is most desirably an aliphatic oxycarbonyl group.

T in general formula (A) preferably represents a hydrogen atom, a halogen atom, an aliphatic oxy group, an aromatic oxy group, an aliphatic thio group or a heterocyclic thio group. Examples of aliphatic oxy groups include a methoxy group, an ethoxy group, a 2-hydroxyethoxy group, a 2-chloroethoxy group, a carboxymethoxy group, a 1-carboxyethoxy group, a methoxyethoxy group, a 2-(2-hydroxyethoxy)ethoxy group, a 2-methylsulfonylethoxy group, a 2-methylsulfonyloxyethoxy group, a 2-methanesulfonamidoethoxy group, a 2-carboxyethoxy group, a 3-carboxypropoxy group, a 2-(carboxymethylthio)ethoxy group, a 2-(1-carboxytridecylthio)ethoxy group, a 1-carboxytridecyl group, an N-(2-methoxyethyl)carbamoylmethoxy group, a 1-imidazolylmethoxy group, a 5-phenoxycarbonylbenzotriazol-1-ylmethoxy group etc., examples of aromatic oxy groups include a 4-nitrophenoxy group, a 4-acetamidophenoxy group, a 2-acetamidophenoxy group, a 4-methylsulfonylphenoxy group, a 4-(3-carboxypropanamido)phenoxy group etc, examples of aliphatic thio groups include, a methylthio group, a 2-hydroxyethylthio group, a carboxymethylthio group, a 2-carboxyethylthio group, a 1-carboxyethylthio group, a 3-carboxypropylthio group, a 2-dimethylaminoethylthio group, a benzylthio group, an n-dodecylthio group, a 1-carboxytridecylthio group etc., and examples of heterocyclic thio groups include a 1-phenyl-1,2,3,4-tetrazol-5-ylthio group, a 1-ethyl-1,2,3,4-tetrazol-5-ylthio group, a 1-(4-hydroxyphenyl)-1,2,3,4-tetrazol-5-ylthio group, a 4-phenyl-1,2,4-triazol-3-ylthio group, a 5-methyl-1,3,4-oxadiazol-2-ylthio group, a 1-(2-carboxyethyl)-1,2,3,4-tetrazol-5-ylthio group, a 5-methylthio-1,3,4-thiadiazol-2-ylthio group, a 5-methyl-1,3,4-thiadiazol-2-ylthio group, a 5-phenyl-1,3,4-oxadiazol-2-ylthio group, a 5-amino-1,3,4-thiadiazol-2-ylthio group, a benzooxazol-2-ylthio group, a 1-methyl-benzimidazol-2-ylthio group, a 1-(2-dimethylaminophenyl)-1,2,3,4-tetrazol-5-yl-thio group, a benzothiazol-2-ylthio group, a 5-(ethoxycarbonylmethylthio)-1,3,4-thiadiazol-2-ylthio group, a 1,2,4-triazol-3-ylthio group, a 4-pyridylthio group, a 2-pyrimidylthio group etc. More desirably, T is a hydrogen atom, a chlorine atom, an aliphatic oxy group or an aliphatic thio group, and most desirably it is a hydrogen atom or an aliphatic oxy group.

The couplers which can be represented by general formula (A) can take the form of dimers or larger oligomers which are bonded together via divalent groups or groups of higher valency for the substituent groups $R_1$, $R_2$, $R_3$ or T, respectively. In this case the groups may be outside the specified number of carbon atoms shown for each of the aforementioned substituent groups.

Cases in which the couplers indicated by the general formula (A) are in the form of oligomers are typically homopolymers, or copolymers, of ethylenic unsaturated addition polymerizable compounds which have a cyan dye forming coupler residual group (cyan color forming monomers). In such a case, the oligomer contains a repeating unit of general formula (B), and one or more type of cyan color forming repeating unit shown by general formula (B) may be included in the oligomer, and it may be a copolymer which contains one or more types of non-color forming ethylenic monomer as a copolymer component.

General Formula (B)

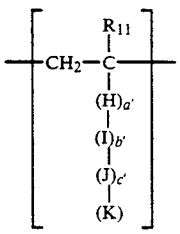

In this formula $R_{11}$ represents a hydrogen atom, an alkyl group which has from 1 to 4 carbon atoms or a chlorine atom, H represents —CONH—, —COO— or a substituted or unsubstituted phenylene group, I represents a substituted or unsubstituted alkylene group, phenylene group or aralkylene group, and J represents —CONH—, —NHCONH—, —NHCOO—, —NHCO—, —OCONH—, —NH—, —COO—, —OCO—, —CO—, —O—, $—SO_2—$, $—NHSO_2—$ or $—SO_2NH—$. Moreover, a', b' and c' represent 0 or 1. K represents a cyan coupler residual group, in which a hydrogen atom other than the hydrogen atom of the hydroxyl group in the 1-position has been removed from a compound which can be represented by general formula (A).

Copolymers of cyan color forming monomers which provide a coupler unit of general formula (B) and the non-color forming ethylenic monomers indicated below are the preferred oligomers.

Non-color forming ethylenic monomers which do not couple with the oxidation products of primary aromatic amine developing agents include acrylic acid, α-chloroacrylic acid, α-alkyl acrylic acids (for example methacrylic acid etc.), esters and amides derived from these acrylic acids (for example acrylamide, methacrylamide, n-butylacrylamide, t-butylacrylamide, diacetoneacrylamide, N-methylolacrylamide, N-(1,1-dimethyl-2-sulfonatoethyl)acrylamide, N-(3-sulfonatopropyl)acrylamide, methyl acrylate, ethyl acrylate, n-propyl acrylate, n-butyl acrylate, t-butylacrylate, isobutyl acrylate, acetoacetoxyethyl acrylate, n-hexyl acrylate, 2-ethylhexyl acrylate, n-octyl acrylate, lauryl acrylate, methyl methacrylate, ethyl methacrylate, n-butyl methacrylate and β-hydroxymethacrylate), vinyl esters (for example vinyl acetate, vinyl propionate and vinyl laurate), acrylonitrile, methacrylonitrile, aromatic vinyl compounds (for example styrene and derivatives thereof, for example vinyltoluene, divinylbenzene, potassium styrenesulfinate, vinylacetophenone and sulfostyrene), itaconic acid, citraconic acid, crotonic acid, vinylidene chloride, vinyl alkyl ethers (for example vinyl ethyl ether), maleic acid esters, N-vinyl-2-pyrrolidone, N-vinylpyridine, 2-vinylpyridine and 4-vinylpyridine etc.

The acrylic acid esters, methacrylic acid esters and the maleic acid esters are especially desirable. Two or more types of non-color forming ethylenic monomer can be used conjointly. For example, it is possible to use methyl acrylate with butyl acrylate, butyl acrylate with styrene, butyl methacrylate with methacrylic acid, methyl acrylate with diacetoneacrylamide, N-(1,1-dimethyl-2-sulfonatoethyl)acrylamide with acrylic acid, potassium styrenesulfinate with N-vinylpyrrolidone etc.

The ethylenic unsaturated monomer used for copolymerization with the aforementioned vinyl based monomer corresponding to general formula (B) can be selected in such a way so as to have a beneficial effect on the physical and/or chemical properties, for example the solubility, compatibility with binding agents such as gelatin used in photographic colloidal compositions, flexibility and heat resistance of the photographic colloidal compositions etc., of the copolymer which is formed, as is well known in the polymeric coupler field.

Lipophilic non-color forming ethylenic monomers (for example acrylic acid esters, methacrylic acid esters, maleic acid esters etc.) are preferably selected as the main copolymer component for obtaining lipophilic polymeric couplers which are soluble in organic solvents.

A solution of a lipophilic polymeric coupler obtained by polymerizing a vinyl based monomer which provides a coupler unit which can be represented by the aforementioned general formula (B) in an organic solvent can be prepared by emulsification and dispersion, or by direct emulsification polymerization, in the form of a latex in an aqueous gelatin solution.

The method disclosed in U.S. Pat. No. 3,451,820 can be used for the emulsification and dispersion of a lipophilic polymeric coupler in the form of a latex in an aqueous gelatin solution, and the method disclosed in U.S. Pat. Nos. 4,080,211 and 3,370,952 can be used for emulsion polymerization.

Hydrophilic non-color forming ethylenic monomers such as N-(1,1-dimethyl-2-sulfonatoethyl)acrylamide, 3-sulfonatopropyl acrylate, sodium styrenesulfonate, potassium 2-styrenesulfinate, acrylamide, methacrylamide, acrylic acid, methacrylic acid, N-vinylpyrrolidone, N-vinylpyridine etc. are preferred as copolymer components for obtaining hydrophilic polymeric couplers which are soluble in neutral or alkaline water.

Hydrophilic polymeric couplers can be added to a coating liquid as an aqueous solution, or they can be dissolved in a mixed solution consisting of water and an organic solvent which is miscible with water such as a lower alcohol, tetrahydrofuran, acetone, ethyl acetone, cyclohexane, ethyl lactate, dimethylformamide, dimethylacetamide etc. and added in this form. Moreover, they can be dissolved in aqueous alkaline solutions or in alkali containing organic solvents and added in this form. Small quantities of surfactants can also be added.

Actual examples of couplers represented by the general formula (A) which can be used in the invention are indicated below, but the invention is not limited to these examples.

(A-1)

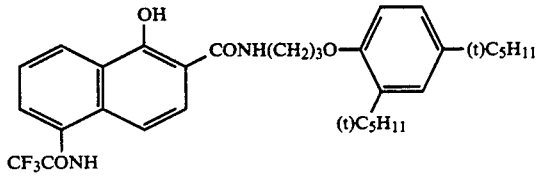

(A-2)

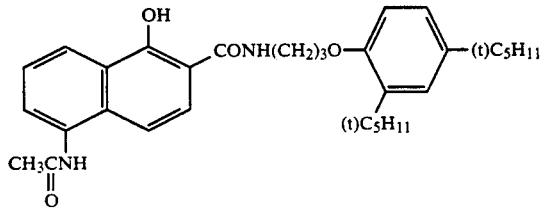

(A-3)

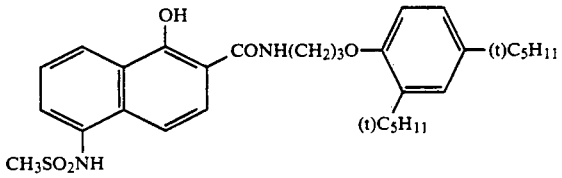

(A-4)

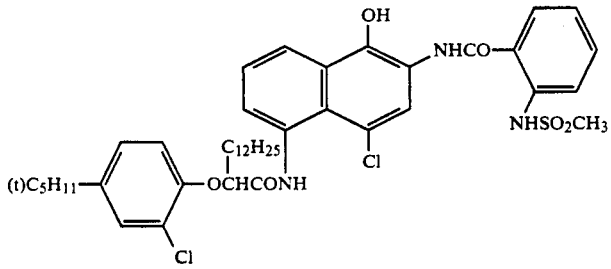

(A-5)

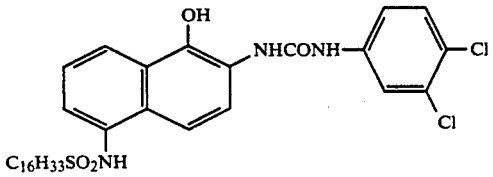

(A-6)

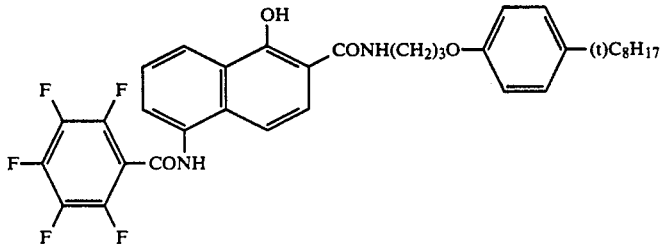

-continued
(A-7)
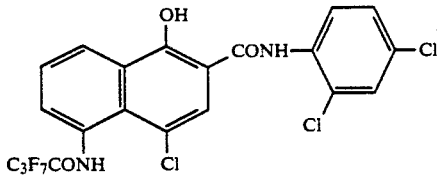
(A-8)
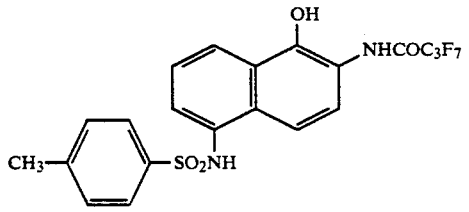
(A-9)
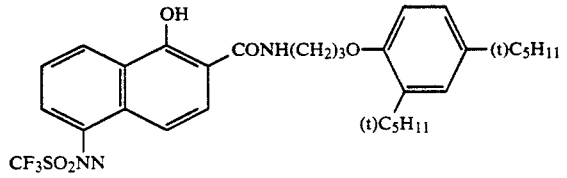
(A-10)
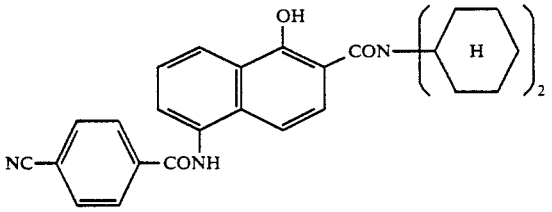
(A-11)
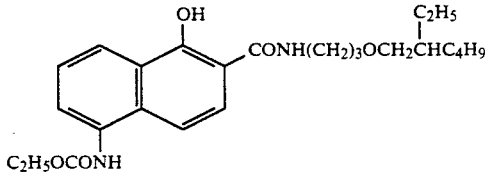
(A-12)
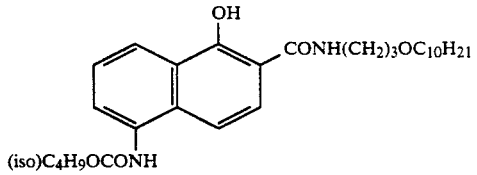
(A-13)
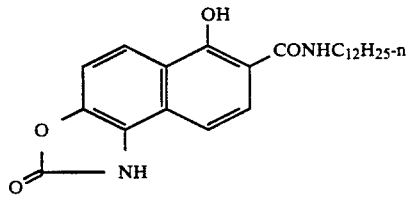
(A-14)
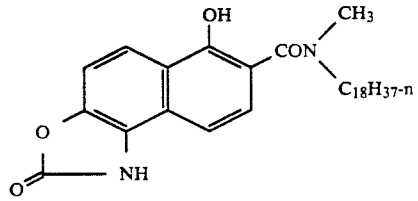

-continued
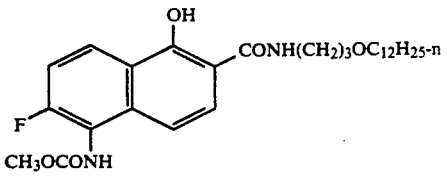
(A-15)
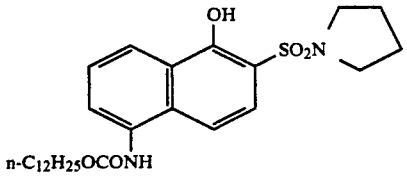
(A-16)
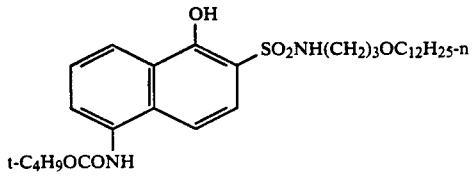
(A-17)
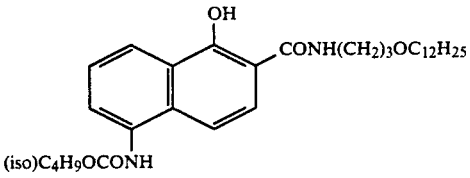
(A-18)
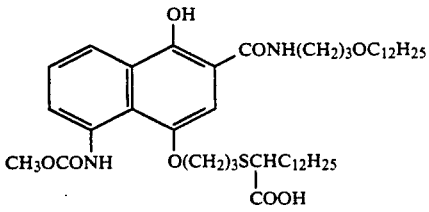
(A-19)
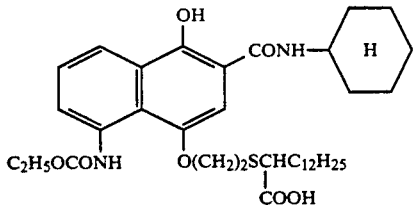
(A-20)
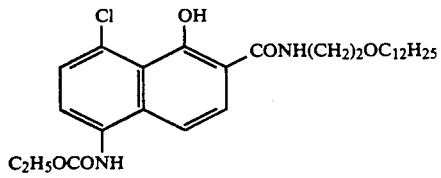
(A-21)
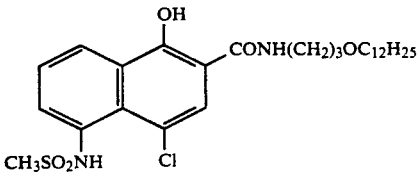
(A-22)

-continued
(A-23)
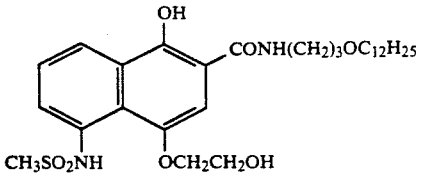
(A-24)
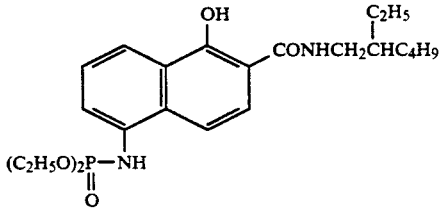
(A-25)
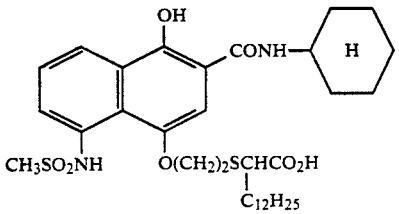
(A-26)
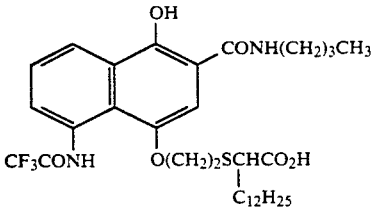
(A-27)
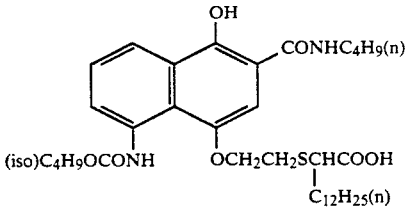
(A-28)
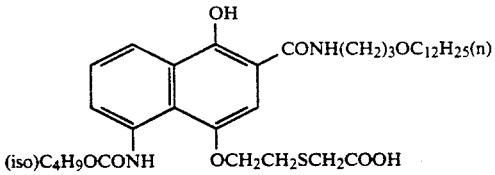
(A-29)
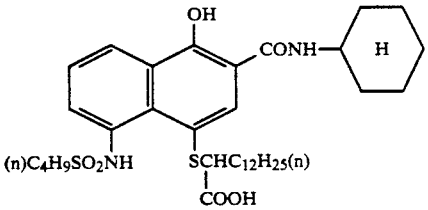
(A-30)
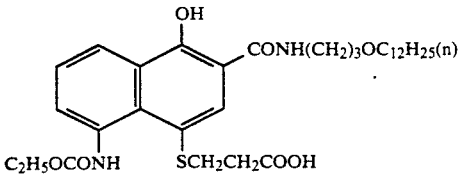

-continued
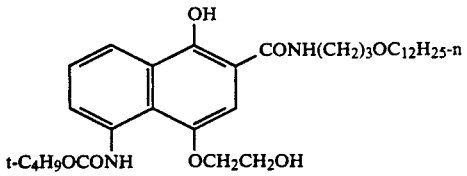
(A-31)
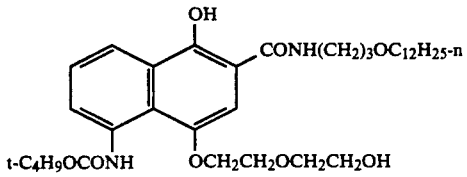
(A-32)
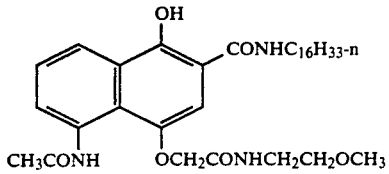
(A-33)
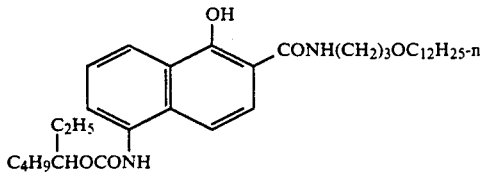
(A-34)
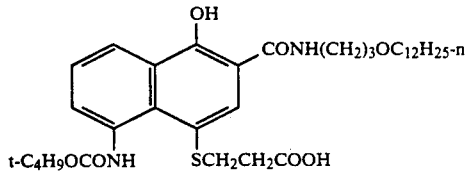
(A-35)
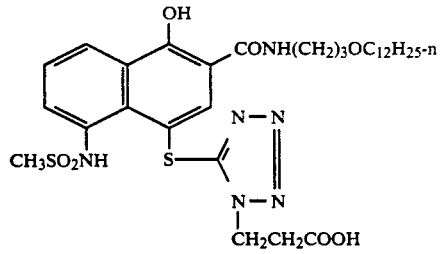
(A-36)
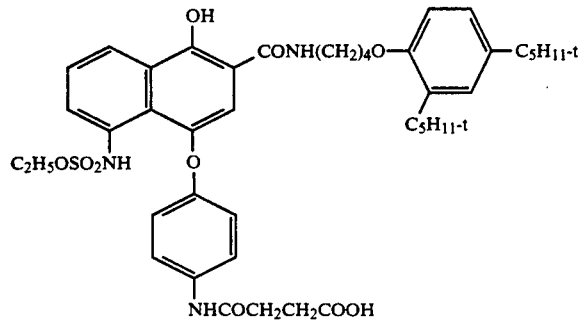
(A-37)

-continued
(A-38)
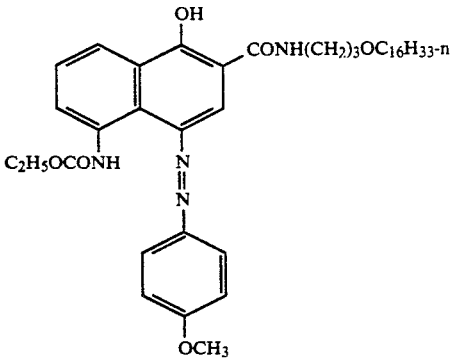
(A-39)
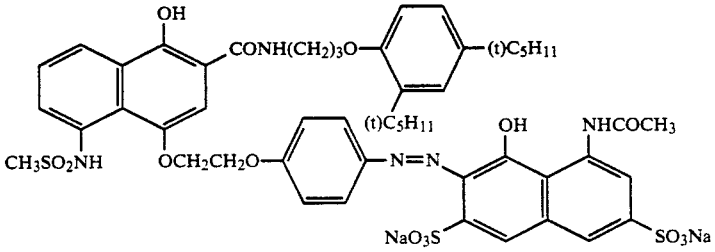
(A-40)
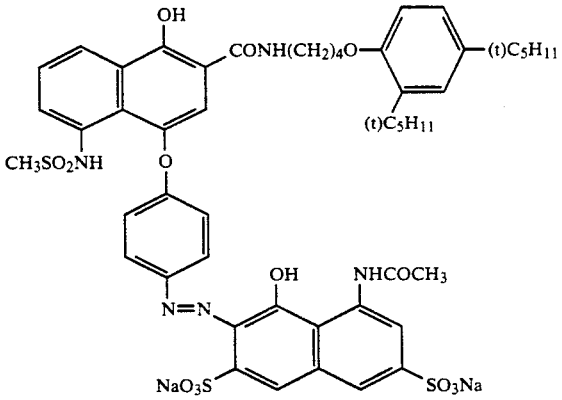
(A-41)
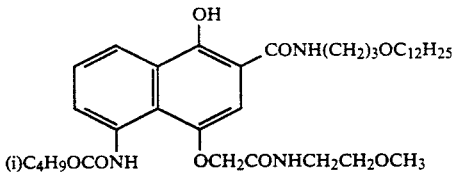
(A-42)
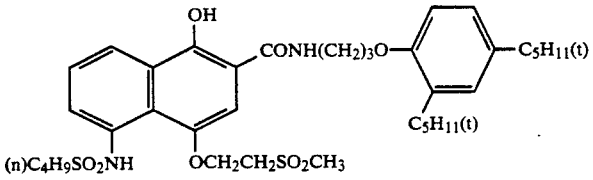
(A-43)
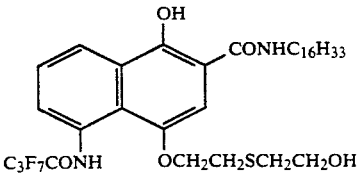

-continued
(A-44)
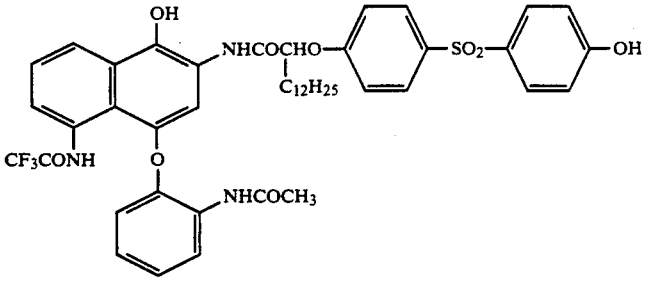
(A-45)
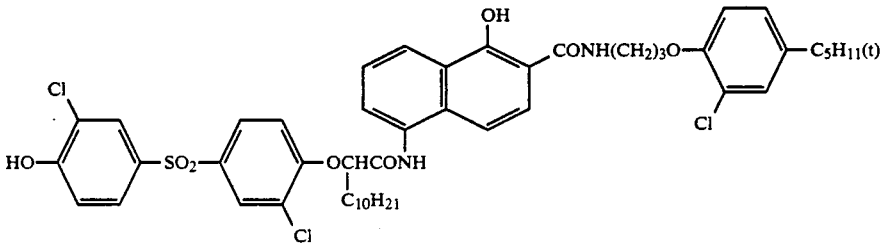
(A-46)
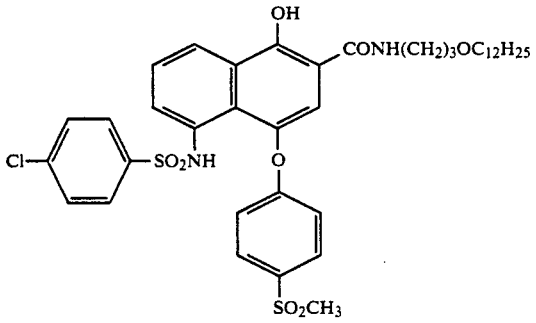
(A-47)
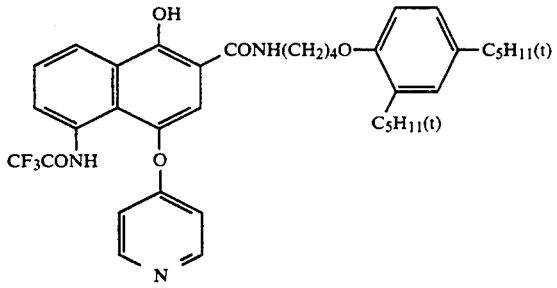
(A-48)
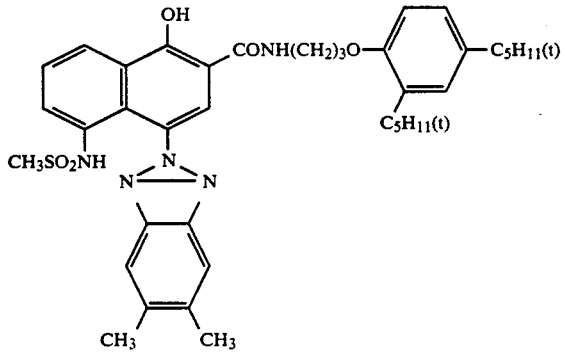

-continued
(A-49)
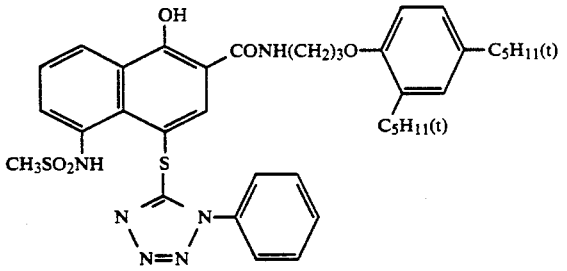
(A-50)
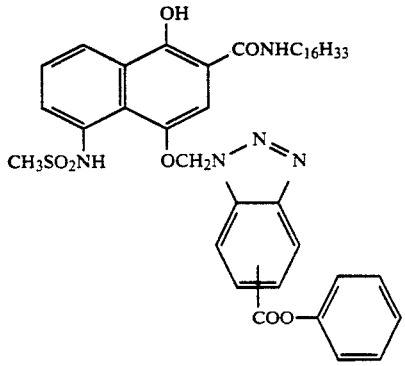
(A-51)
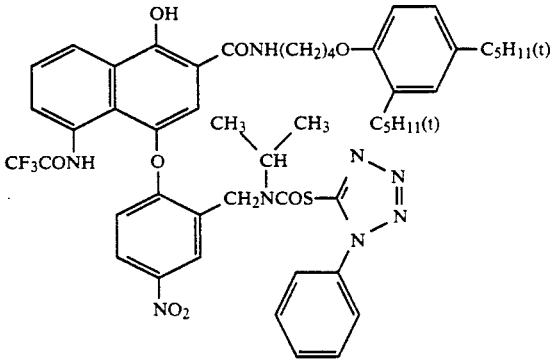
(A-52)
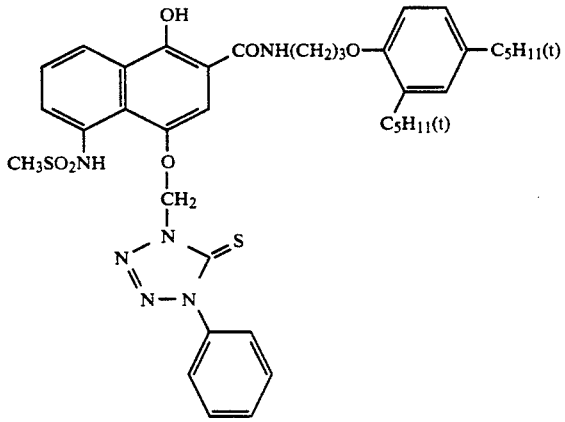

-continued
(A-53)
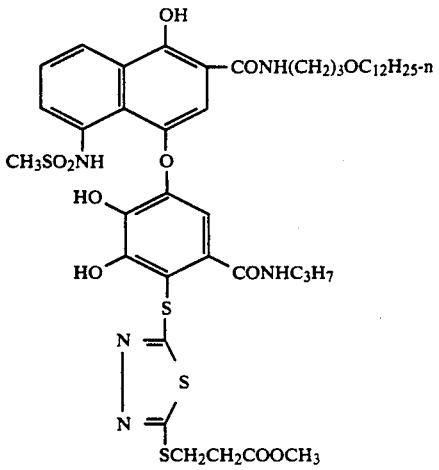
(A-54)
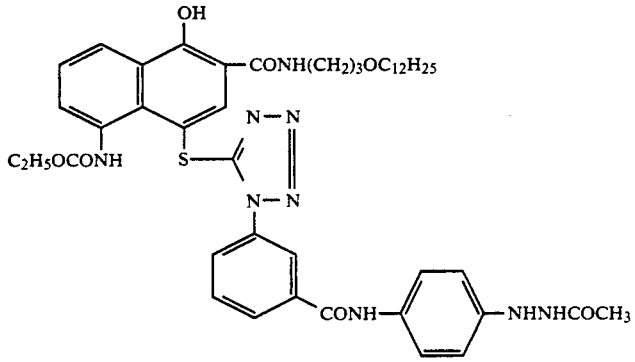
(A-55)
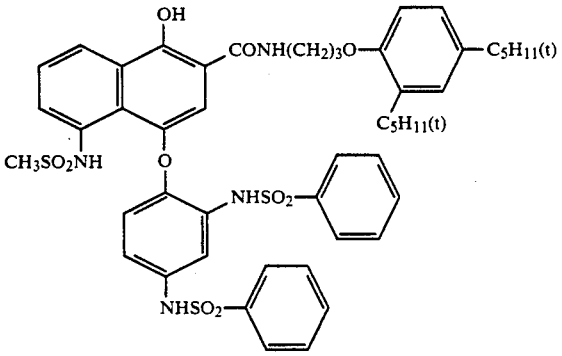
(A-56)
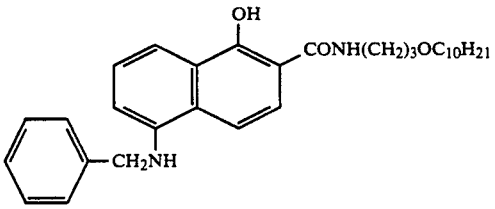
(A-57)
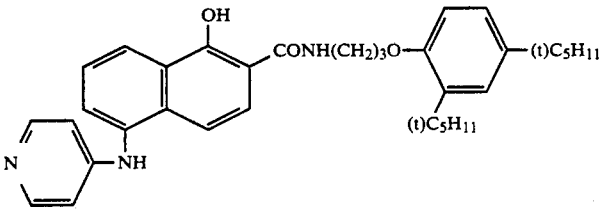

-continued
(A-58)
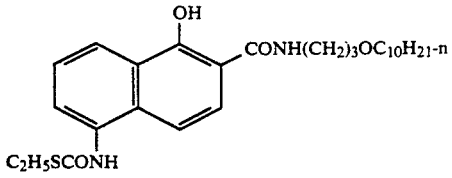
(A-59)
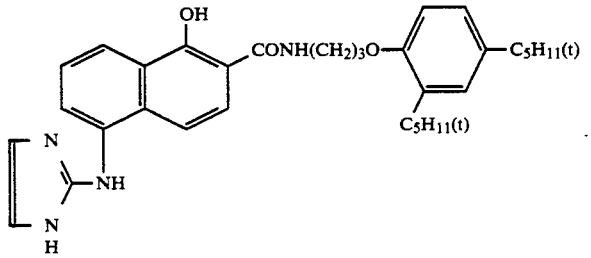
(A-60)
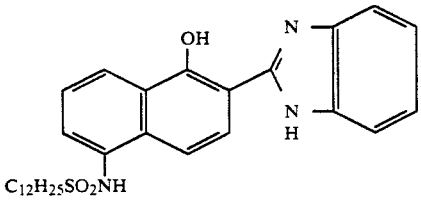
(A-61)
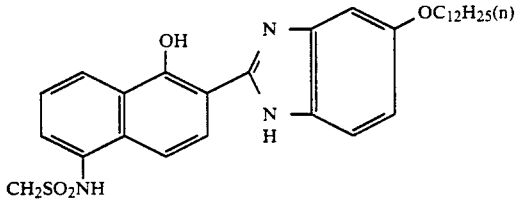
(A-62)
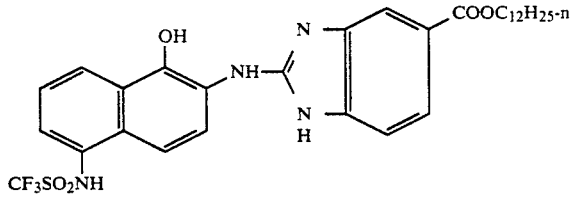
(A-63)
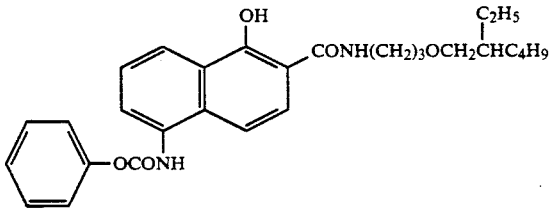
(A-64)
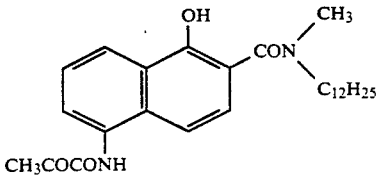

-continued
(A-65)
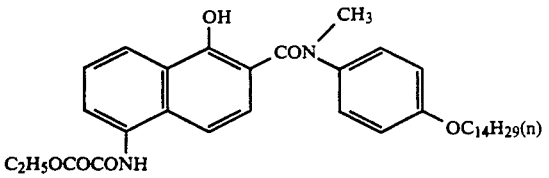
(A-66)
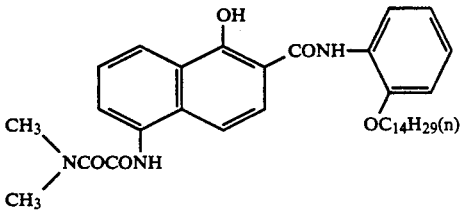
(A-67)
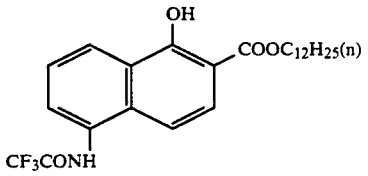
(A-68)
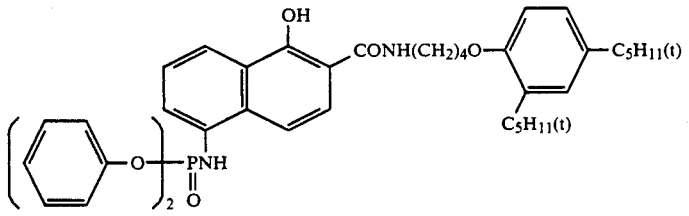
(A-69)
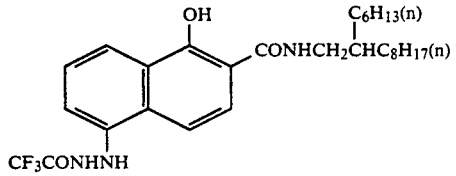
(A-70)
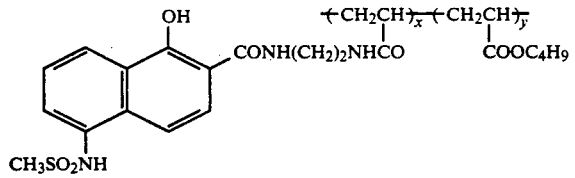
x:y = 70:30
(weight ratio)
(A-71)
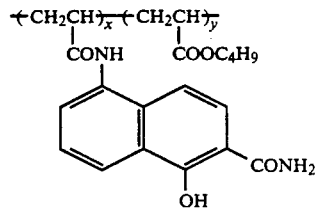
x:y = 55:45
(weight ratio)

-continued (A-72)

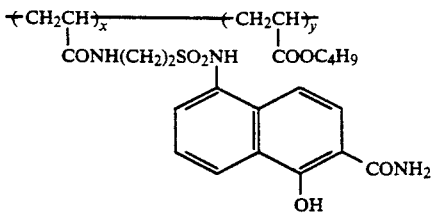

x:y = 80:20
(weight ratio)

(A-73)

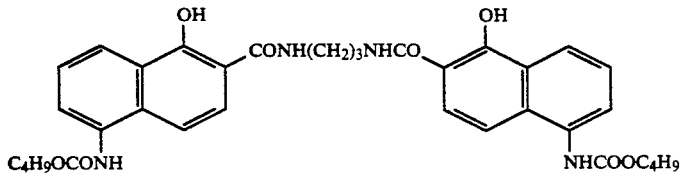

(A-74)

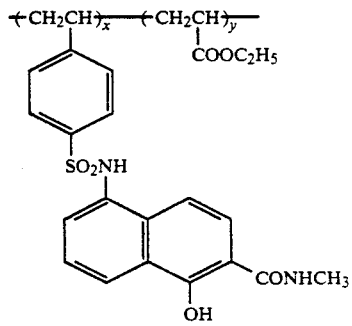

x:y = 60:40
(weight ratio)

(A-75)

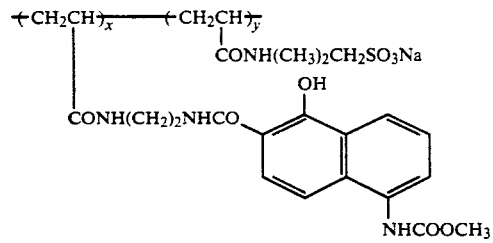

x:y = 50:50
(weight ratio)

Examples of couplers represented by the general formula (A) other than those mentioned above which can be used in the invention have been disclosed in Japanese Patent Application (OPI) Nos. 237448/85, 153640/86 and 145557/86 and in Japanese Patent Application No. 42090/87. Furthermore, these couplers can be synthesized using the methods disclosed in Japanese Patent Application Nos. 259752/85, 259753/85 and 205344/86 as well as those in the patent specifications mentioned above.

The couplers represented by the general formula (A) of this invention can be added to an emulsion layer or to a non-photosensitive intermediate layer. They are preferably included in an emulsion layer.

The amount added is from 0.01 mol% to 100 mol%, preferably from 0.1 mol% to 50 mol%, and most desirably from 1 mol% to 20 mol%, with respect to the total amount of silver coated.

The bleach accelerating agent releasing type compounds used in the invention are described in detail below.

The compounds which can be represented by general formula (I) below are preferred as the compounds which release a bleach accelerating agent in this invention.

$$A-(L)_p-Z$$ General Formula (I)

(In this formula, A represents a group of which the bond with $(L)_p$—Z is cleaved by reaction with the oxidized product of the developing agent, L represents a timing group or a group of which the bond with Z is cleaved by reaction with the oxidized product of the developing agent, p represents a integer of 0 to 3, and when p is 2 or 3 the p individual L groups may be the same or different, and Z represents a group which, when the bond with A-$(L)_p$ has been cleaved, has a bleach accelerating action.)

Moreover, compounds which can be represented by general formula (I') below are preferred.

$$A-(L_1)_a-(L_2)_b-Z$$ General Formula (I')

(In this formula, A represents a group of which the bond with $(L_1)_a$—$(L_2)_b$—Z is cleaved by reaction with the oxidized product of the developing agent, $L_1$ represents a timing group or a group of which the bond with $(L_2)_b$—Z is cleaved by reaction with the oxidized product of the developing agent, $L_2$ represents a timing group or a group of which the bond with Z is cleaved by reaction with the oxidized product of the developing agent, Z represents a group which, when the bond with A—$(L_1)_a$—$(L_2)_b$ has been cleaved, has a bleach accelerating action, and a and b each have a value of 0 or 1.)

More precisely, A in general formulae (I) and (I') represents a coupler residual group or a redox group.

The known coupler residual groups can be used for the coupler residual group represented by A. For example, it may be a yellow coupler residual group (for example an open chain ketomethylene type coupler residual group), a magenta coupler residual group (for example a coupler residual group of the 5-pyrazolone type, pyrazoloimidazole type, pyrazolotriazole type etc.), a cyan coupler residual group (for example a coupler residual group of the phenol type, naphthol type etc.), or a colorless coupler residual group (for example a coupler residual group of the indanone type, acetophenone type etc.). Furthermore, it may be a coupler residual group of the heterocyclic type disclosed in U.S. Pat. Nos. 4,315,070, 4,183,752, 3,961,959 or 4,171,223.

When A in general formula (I') represents a coupler residual group, the preferred examples of A are the coupler residual groups which can be represented by general formulae (Cp-1), (Cp-2), (Cp-3), (Cp-4), (Cp-5), (Cp-6), (Cp-7), (Cp-8), (Cp-9) or (Cp-10) indicated below. These couplers preferably have a high coupling rate.

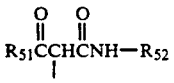

General Formula (Cp-1)

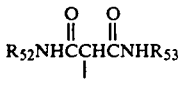

General Formula (Cp-2)

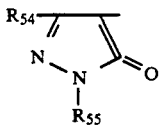

General Formula (Cp-3)

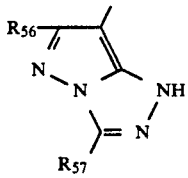

General Formula (Cp-4)

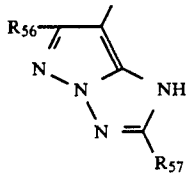

General Formula (Cp-5)

-continued

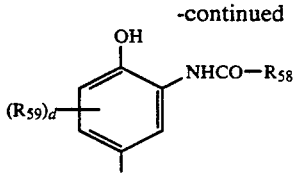

General Formula (Cp-6)

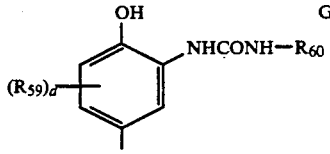

General Formula (Cp-7)

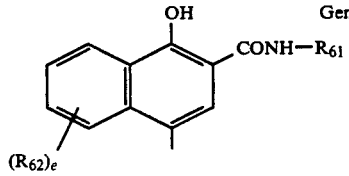

General Formula (Cp-8)

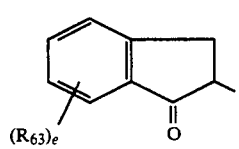

General Formula (Cp-9)

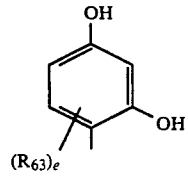

General Formula (Cp-10)

In the formulae indicated above, the free bond extending from the coupling position indicates the bonding position of the coupling elimination group.

In cases where a diffusion resisting group is included in $R_{51}$, $R_{52}$, $R_{53}$, $R_{54}$, $R_{55}$, $R_{56}$, $R_{57}$, $R_{58}$, $R_{59}$, $R_{60}$, $R_{61}$, $R_{62}$ or $R_{63}$ in the formulae indicated above, it is selected in such a way that the total number of carbon atoms is from 8 to 40, and preferably from 10 to 30, and in other cases the total number of carbon atoms is preferably not more than 15. In the case of bis type, telomeric or polymeric couplers, any of the aforementioned substituent groups may represent the divalent group connecting the repeating units etc. In this case, the number of carbon atoms may be outside the range indicated above.

$R_{51}$ to $R_{63}$, d and e are described in detail below. Here $R_{41}$ represents an aliphatic group, an aromatic group or a heterocyclic group, $R_{42}$ represents an aromatic group or a heterocyclic group and $R_{43}$, $R_{44}$ and $R_{45}$ represent hydrogen atoms, aliphatic groups, aromatic groups or heterocyclic groups.

$R_{51}$ has the same meaning as $R_{41}$. $R_{52}$ and $R_{53}$ each have the same meaning as $R_{42}$. $R_{54}$ represent a group having the same meaning as $R_{41}$, an $R_{41}CON(R_{43})$— group, an $R_{41}N(R_{43})$— group, an $R_{41}SO_2N(R_{43})$— group, an $R_{41}S$— group, and $R_{43}O$— group, an $R_{45}NCON$— group
$R_{43}$ $R_{44}$ or an N≡C— group. $R_{55}$ represents a group having the same meaning as $R_{41}$. $R_{56}$ and $R_{57}$ each represent groups having the same meaning as $R_{43}$ or an $R_{41}S$— group, an $R_{43}O$— group, an $R_{41}CON$— group or an $R_{41}SO_2N$— group.
$R_{43}$ $R_{43}$ $R_{58}$ represents a group having the same meaning as $R_{41}$. $R_{59}$ represents a group having the same meaning as $R_{41}$, an $R_{41}CON$— group, an $R_{41}OCON$— group,
$R_{43}$ $R_{43}$ an $R_{41}SO_2N$— group, an $R_{43}N$—CO—N— group,
$R_{43}$ $R_{44}$ $R_{45}$ an $R_{41}O$— group, an $R_{41}S$— group, a halogen atom or an $R_{41}N$— group.
$R_{43}$ Moreover d represents a value from 0 to 3.

When d is more than one, the plurality of $R_{59}$ groups may represent the same substituent group or different substituent groups. Furthermore, the $R_{59}$ groups may be divalent group linked together to form a ring structure. The groups indicated below are typical examples of divalent groups for forming ring structures.

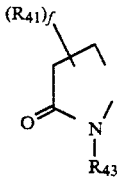

group or

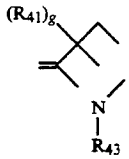

group

There f represents an integer of value 0 to 4 and g represents an integer of value 0 to 2.

$R_{60}$ represents a group which has the same meaning as $R_{41}$. $R_{61}$ represents a group which has the same meaning as $R_{41}$. $R_{62}$ represents a group which has the same meaning as $R_{41}$, an $R_{41}CONH$— and $R_{41}O$-CONH— group, an $R_{41}SO_2NH$— group, an $R_{43}N$—CO—N— group,
$R_{44}$ $R_{45}$ -continued an $R_{43}NSO_2N$— group,
$R_{44}$ $R_{45}$ an $R_{43}O$— group, an $R_{41}S$— group, a halogen atom or an $R_{41}N$— group.
$R_{43}$ $R_{63}$ represents a group which has the same meaning as $R_{41}$, an $R_{41}CON$— group, an $R_{41}NCO$— group,
$R_{44}$ $R_{44}$ an $R_{41}SO_2N$— group, an $R_{41}NSO_2$— group,
$R_{44}$ $R_{44}$ an $R_{41}SO_2$— group, an $R_{41}OCO$— group, an $R_{41}SO_2$— group, a halogen atom, a nitro group, a cyano group or an $R_{43}CO$— group. Moreover, e represents an integer of value 0 to 4. When there are two or more $R_{62}$ or $R_{63}$ groups, they may represent the same group or different groups.

In the above description the aliphatic group is a saturated or unsaturated, chain like or cyclic, linear chain or branched, substituted or unsubstituted, aliphatic group which has from 1 to 32, preferably from 1 to 22, carbon atoms. Typical examples include a methyl group, an ethyl group, a propyl group, an iso-propyl group, a butyl group, a t-butyl group, an iso-butyl group, a t-amyl group, a hexyl group, a cyclohexyl group, a 2-ethylhexyl group, an octyl group, a 1,1,3,3-tetramethylbutyl group, a decyl group, a dodecyl group, a hexadecyl group and an octadecyl group.

The aromatic group is preferably a substituted or unsubstituted phenyl group or a substituted or unsubstituted naphthyl group which has from 6 to 20 carbon atoms.

The heterocyclic group is a substituted or unsubstituted, preferably 3 to 8 membered, heterocyclic group in which the hetero atoms are selected from among a nitrogen atom, an oxygen atom or a sulfur atom, and which has from 1 to 20, and preferably from 1 to 7, carbon atoms. Typical examples of heterocyclic groups include a 2-pyridyl group, a 2-thienyl group, a 2-furyl group, a 1-imidazolyl group, a 1-indolyl group, a phthalimido group, a 1,3,4-thiadiazol-2-yl group, a 2-quinolyl group, a 2,4-dioxo-1,3-imidazolidin-5-yl group, a 2,4-dioxo-1,3-imidazolidin-3-yl group, a succinimido group, a 1,2,4-triazol-2-yl group or a 1-pyrazolyl group.

When the aformentioned aliphatic groups, aromatic groups and heterocyclic groups have substituent groups, the substituent groups may be, for example, halogen atoms, $R_{47}O$— groups, $R_{46}S$— groups, $R_{47}CON$— groups, $R_{47}NCO$— groups,
$R_{48}$ $R_{48}$ $R_{46}OCON$— groups, $R_{46}SO_2N$— groups,
$R_{47}$ $R_{47}$ -continued $R_{47}NSO_2$— groups,
|
$R_{48}$ $R_{46}SO_2$— groups, $R_{47}OCO$—groups, $R_{47}NCON$— groups,
| |
$R_{48}$ $R_{49}$ groups which have the same meaning as $R_{46}$,

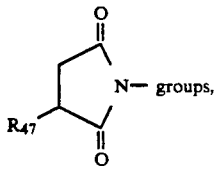

$R_{46}COO$— groups, $R_{47}OSO_2$— groups, cyano groups or nitro groups. Here $R_{46}$ represents an aliphatic group, an aromatic group or a heterocyclic group and $R_{47}$, $R_{48}$ and $R_{49}$ each represent an aliphatic group, an aromatic group, a heterocyclic group or a hydrogen atom. The meaning of the terms an aliphatic group, an aromatic group and a heterocyclic group is the same as defined earlier.

The preferred ranges for $R_{51}$ to $R_{63}$, d and e are described below.

$R_{51}$ is preferably an aliphatic group or an aromatic group. $R_{52}$, $R_{53}$ and $R_{55}$ are preferably aromatic groups. $R_{54}$ is preferably an $R_{41}CONH$— group or an $R_{41}$—N— group.
|
$R_{43}$ $R_{56}$ and $R_{57}$ are preferably aliphatic groups, $R_{41}$— groups or $R_{41}S$— groups.

$R_{58}$ is preferably an aliphatic group or an aromatic group. In general formula (Cp-6), $R_{59}$ is preferably a chlorine atom, an aliphatic group or an $R_{41}CONH$— group, and d is preferably 1 or 2. $R_{60}$ is preferably an aromatic group. In general formula (Cp-7), $R_{59}$ is preferably an $R_{41}CONH$— group. In general formula (Cp-7), d is preferably 1. $R_{61}$ is preferably an aliphatic group or an aromatic group. In general formula (Cp-8), e is preferably 0 or 1. An $R_{41}OCONH$— group, $R_{41}CONH$— group or an $R_{41}SO_2NH$— group is preferred for $R_{62}$ and these are preferably substituted in the 5-position of the naphthol ring. In general formula (Cp-9), $R_{63}$ is preferably an $R_{41}CONH$— group, an $R_{41}SO_2NH$— group, an $R_{41}NSO_2$ group,
|
$R_{44}$ $R_{41}SO_2$— group, an $R_{41}NCO$— group,
|
$R_{44}$ a nitro group or a cyano group.

In general formula (Cp-10), $R_{63}$ is preferably an $R_{41}NCO$— group,
|
$R_{44}$ an $R_{43}OCO$— group, or an $R_{43}CO$— group.

Typical examples of $R_{51}$ to $R_{63}$ are described below.

$R_{51}$ may be a t-butyl group, a 4-methoxyphenyl group, a phenyl group, a 3-{2-(2,4-di-t-amylphenoxy)-butanamido}phenyl group, or a methyl group. $R_{52}$ and $R_{53}$ may be 2-chloro-5-dodecyloxycarbonylphenyl groups, 2-chloro-5-hexadecylsulfonamidophenyl groups, 2-chloro-5-tetradecanamidophenyl groups, 2-chloro-5-}4-(2,4-di-t-amylphenoxy)butanamido}phenyl groups, 2-chloro-5-{2-(2,4-di-t-amylphenoxy)-butanamido}phenyl groups, 2-methoxyphenyl groups, 2-methoxy-5-tetradecyloxycarbonylphenyl groups, 2-chloro-5-(1-ethoxycarbonyl-ethoxycarbonyl)phenyl groups, 2-pyridyl groups, 2-chloro-5-octyloxycarbonyl-phenyl groups, 2,4-dichlorophenyl groups, 2-chloro-5-(1-dodecyloxycarbonylethoxy-carbonyl)phenyl groups, 2-chlorophenyl groups or 2-ethoxyphenyl groups.

$R_{54}$ be a 3-{2-(2,4-di-t-amylphenoxy)butanamido}benzamido group, a 3-{4-(2,4-di-t-amylphenoxy)-butanamido}benzamido group, a 2-chloro-5-tetradecanamidoanilino group, a 5-(2,4-di-t-amylphenoxyacetamido)benzamido group, a 2-chloro-5-dodecenyl-succinimidoanilino group, a 2-chloro-5-{2-(3-t-butyl-4-hydroxyphenoxy)tetradecanamido}anilino group, a 2,2-dimethylpropanamido group, a 2-(3-pentadecyl-phenoxy)butanamido group, pyrrolidino group or a N,N-dibutylamino group. $R_{55}$ is preferably a 2,4,6-trichlorophenyl group, a 2-chlorophenyl group, a 2,5-dichlorophenyl group, a 2,3-dichlorophenyl group, a 2,6-dichloro-4-methoxyphenyl group, a 4-{2-(2,4-di-t-amylphenoxy)butanamido}phenyl group or a 2,6-dichloro-4-methanesulfonylphenyl group. $R_{56}$ may be a methyl group, an ethyl group, an iso-propyl group, a methoxy group, an ethoxy group, a methylthio group, an ethylthio group, a 3-phenylureido group or a 3-(2,4-di-t-amylphenoxy)propyl group. $R_{57}$ may be a 3-(2,4-di-t-amylphenoxy)propyl group, a 3-[4-{2-[4-(4-hydroxy-phenylsulfonyl)phenoxy]tetradecanamido}phenyl]propyl group, a methoxy group, a methylthio group, an ethylthio group, a methyl group, a 1-methyl-2-(2-octyloxy-5-[2-octyloxy-5-(1,1,3,3-tetramethylbutyl)-phenylsulfonamido)phenylsulfonamido)ethyl group, a 3-{4-(4-dodecyloxyphenylsulfonamido)phenyl}propyl group, a 1,1-dimethyl-2-(2-octyloxy-5-(1,1,3,3-tetramethylbutyl)phenylsulfonamido]ethyl group or a dodecylthio group. $R_{58}$ may be a 2-chlorophenyl group, a pentafluorophenyl group, a pentafluoropropyl group, a 1-(2,4-di-t-amylphenoxy)propyl group, a 3-(2,4-di-t-amylphenoxy)propyl group, a 2,4-di-t-amylphenoxymethyl group or a furyl group. $R_{59}$ may be a chlorine atom, a methyl group, an ethyl group, a propyl group, a butyl group, an iso-propyl group, a 2-(2,4-di-t-amylphenoxy)butanamido group, a 2-(2,4-di-t-amylphenoxy)hexanamido group, a 2-(2,4-di-t-octylphenoxy)octanamido group, a 2-(2-chlorophenoxy)tetradecanamido group, a 2-{4-(4-hydroxyphenylsulfonyl)phenoxy}tetradecanamido group or a 2-{2-(2,4-di-t-amylphenoxyacetamido)phenoxy}butanamido group. $R_{60}$ may be a 4-cyanophenyl group, a 2-cyanophenyl group, a 4-butylsulfonylphenyl group, a 4-propylsulfonylphenyl group, a 4-chloro-3-cyanophenyl group, a 4-ethoxycarbonylphenyl group or a 3,4-dichlorophenyl group. $R_{61}$ may be a dodecyl group, a hexadecyl group, a cyclohexyl group, a 3-(2,4-di-t-amylphenoxy) propyl group, a 4-(2,4-di-t-amylphenoxy)butyl group, a 3-dodecyloxypropyl group, a t-butyl group, a 2-methoxy-5-dodecyloxycarbonylphenyl group or a 1-naphthyl group. $R_{62}$ may be an iso-butyloxycarbonylamino group, an ethoxycarbonylamino group, a phenylsulfonylamino group, a methanesulfonamido group, a benzamido group, a trifluoroacetamido group, a 3-phenylureido group, a butoxycarbonylamino group or an acetamido group. $R_{63}$ may be a 2,4-di-t-amylphenoxyacetamido group, a 2-(2,4-di-t-amylphenoxy)butanamido group, a hexadecanesulfonamido group, an N-methyl-N-octadecylsulfamoyl group, an N,N-dioctylsulfamoyl group, a 4-t-octylbenzoyl group, a dodecyloxycarbonyl group, a chlorine atom, a nitro group, a cyano group, an N-{4-(2,4-di-t-amylphenoxy)butyl}carbamoyl group, an N-3-(2,4-di-t-amylphenoxy)propylsulfamoyl group, a methanesulfonyl group or a hexadecylsulfonyl group.

When A in general formula (I) represents a redox group it is, more precisely, a group which can be represented by general formula (II) below.

$$A_1—P—(X=Y)_n—Q—A_2$$ General Formula (II)

In this formula, P and Q each independently represent an oxygen atom or a substituted or unsubstituted imino group, at least one of the n individual X and Y groups represents a methine group which has a group $—(L_1)_a—(L_2)_b—Z$ as a substituent and the other X and Y groups represent substituted or unsubstituted methine groups or nitrogen atoms, n represents an integer of from 1 to 3 (representing n individual X and n individual Y groups which are the same or different), and $A_1$ and $A_2$ each represent hydrogen atoms or groups which can be removed with alkali. Here, cases in which any two of the substituent groups P, X, Y, Q, $A_1$ and $A_2$ are divalent and linked together to form a ring structure are also included. For example $(X=Y)_n$ may form a benzene ring, a pyridine ring etc.

When P and Q represent substituted or unsubstituted imino groups, the imino groups are preferably substituted with sulfonyl groups or acyl groups.

At this time, P and Q can be represented by the following general formulae:

General Formula (N-1)

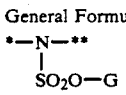

General Formula (N-2)

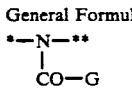

Here, * indicates the position at which the group is bonded to $A_1$ or $A_2$, and ** indicates the position of one of the free bonds of the $\text{-}(X=Y)_n\text{-}$ group.

In these formulae, the group represented by G is preferably a linear chain, branched or cyclic, saturated or unsaturated, substituted or unsubstituted aliphatic group which has from 1 to 32, and preferably from 1 to 22, carbon atoms (for example a methyl group, an ethyl group, a benzyl group, a phenoxybutyl group, an isopropyl group etc.), a substituted or unsubstituted aromatic group which has from 6 to 10 carbon atoms (for example a phenyl group, a 4-methylphenyl group, a 1-naphthyl group, a 4-dodecyloxyphenyl group etc.), or a four to seven membered heterocyclic group in which the hetero atom is selected from among nitrogen atom, a sulfur atom or an oxygen atom (for example a 2-pyridyl group, a 1-phenyl-4-imidazolyl group, a 2-furyl group, a benzothienyl group etc.).

P and Q in general formula (II) are preferably each independently oxygen atoms or groups which can be represented by the general formula (N-1).

When $A_1$ and $A_2$ represent groups which can be removed with alkali (hereinafter referred to as "precursor groups") they are preferably groups which can be hydrolyzed, such as acyl groups, alkoxycarbonyl groups, aryloxycarbonyl groups, carbamoyl groups, sulfonyl groups etc., precursor groups of the type in which a reverse Michael reaction is used as disclosed in U.S. Pat. No. 4,009,029, precursor groups of the type in which an anion formed after the ring opening cleavage is used as an intramolecular nucleophilic group as disclosed in U.S. Pat. No. 4,310,612, precursor groups in which an anion transfers an electron via a conjugated system and thereby brings about a cleavage reaction as disclosed in U.S. Pat. Nos. 3,674,478, 3,932,480, or 3,993,661, precursor groups in which a cleavage reaction is brought about by the electron transfer of an anion which has reacted after ring opening cleavage as disclosed in U.S. Pat. No. 4,335,200 or a precursor group in which an imidomethyl group is used as disclosed in U.S. Pat. Nos. 4,363,865 or 4,410,618.

In general formula (II), P preferably represents an oxygen atom and $A_2$ preferably represents a hydrogen atom.

Moreover, in general formula (II), X and Y are preferably substituted or unsubstituted methine groups, except for the X and Y groups which are methine groups which have $—(L_1)_a—(L_2)_b—Z$ as a substituent group.

Of the groups which can be represented by general formula (II), those which can be represented by general formulae (III) and (IV) below are especially desirable.

General Formula (III)

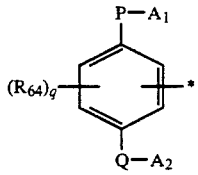

General Formula (IV)

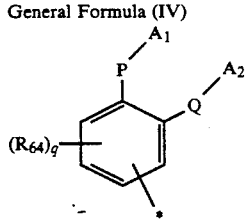

In these formulae, * indicates the position at which the $—(L_1)_a—(L_2)_b—Z$ group is bonded and P, Q, $A_1$ and $A_2$ have the same meaning as described in connection with general formula (II). Moreover, $R_{64}$ represents a substituent group and q represents 0 or an integer of from 1 to 3. When q has a value of 2 or 3 the 2 or 3 $R_{64}$ groups may be the same of different, and when the $R_{64}$ groups are substituent groups on adjacent carbon atoms, cases in which they are divalent groups and linked together and represent a ring structure are also included. In such a case, a condensed benzene ring may be formed to provide for example ring structures such as naphthalenes, benzonorbornanes, chromans, indoles, benzothiophenes, quinolines, benzofurans, 2,3-dihydrobenzofurans, indanes or indenes etc., and these may have one or more substituent group. Examples of preferred substituent groups when substituent groups are present on these condensed rings and preferred examples of $R_{64}$ when the $R_{64}$ do not form a condensed ring are indicated below. That is to say these groups include an $R_{41}$ group, halogen atoms, an $R_{43}O$— group, an $R_{43}S$— group, an $R_{43}NCO$— group, ($R_{44}$)

an $R_{43}OOC$— group, an $R_{41}SO_2$— group, an $R_{43}NSO_2$— group, ($R_{44}$) an $R_{43}CON$— group ($R_{43}$) an $R_{41}SO_2N$— group, ($R_{43}$)

an $R_{43}CO$— group, an $R_{41}COO$— group, an $R_{43}NCON$— group, ($R_{44}$, $R_{45}$)

a cyano group or an

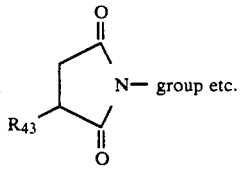

Here $R_{41}$, $R_{43}$, $R_{44}$ and $R_{45}$ have the same meaning as described earlier. Typical examples of $R_{64}$ are indicated below. That is to say, a methyl group, an ethyl group, a t-butyl group, a methoxy group, a methylthio group, a dodecylthio group, a 3-(2,4-di-t-amylphenoxy)propylthio group, an N-3-(2,4-di-t-amylphenoxy)propylcarbamoyl group, an N-methyl-N-octadecyloxycarbamoyl group, a methoxycarbonyl group, a dodecyloxycarbonyl group, a propylcarbamoyl group, a hydroxyl group or an N,N-dioctylcarbamoyl group. An example of a case in which two $R_{64}$ groups form a ring structure is provided by the group indicated below:

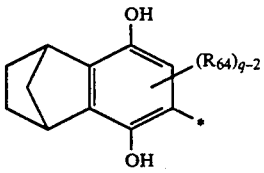

P and Q preferably represent oxygen atoms on general formulae (III) and (IV).

$A_1$ and $A_2$ preferably represent hydrogen atoms in general formulae (III) and (IV).

The groups represented by $L_1$ and $L_2$ in general formula (I') may or may not be used in the invention. They are not used for preference, but they can be selected appropriately for a particular purpose. When $L_1$ and $L_2$ represent timing groups they may consist of the well known linking groups indicated below.

(1) Groups in which a Hemiacetal Cleavage Reaction is used.

These have been disclosed for example in U.S. Pat. No. 4,146,396 and Japanese Patent Application (OPI) Nos. 249148/85 and 249149/85 and they are groups which can be represented by the general formula indicated below. Here, * indicates the position which is bonded on the left hand side in general formula (II) and ** indicates the position which is bonded on the right hand side in formula (II).

General Formula (T-1)

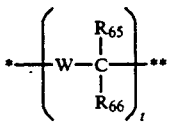

In this formula, W represents an oxygen atom, a sulfur atom or an $-N(R_{67})-$ group.

$R_{65}$ and $R_{66}$ represent hydrogen atoms or substituent groups, $R_{67}$ represents a substituent group, and t represents 1 or 2. When t is 2, the two $-W-C(R_{65})(R_{66})-$ groups may be the same of different. Typical examples of $R_{65}$ and $R_{66}$ as substituent groups and of $R_{67}$ are an $R_{69}$ group, an $R_{69}CO$— group, an $R_{69}SO_2$— group, an $R_{69}NCO$— group ($R_{70}$) or an $R_{69}NSO_2$— group. ($R_{70}$)

Here $R_{69}$ is a group which has the same meaning as $R_{41}$ described earlier, and $R_{70}$ is a group which has the same meaning as $R_{43}$. Cases in which $R_{65}$, $R_{66}$ and $R_{67}$ represent divalent groups respectively and these are joined together to form ring structures are also included. The groups indicated below are actual examples of groups which can be represented by the general formula (T-1).

*—$OCH_2$—**

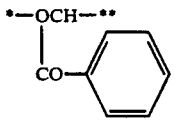

*—$SCH_2$—**

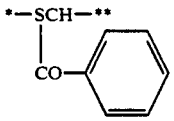

-continued

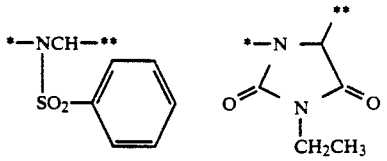

(2) Groups in which a Cleavage Reaction is Brought About Using an Intramolecular Nucleophilic Substitution Reaction.

For example, the timing groups which are disclosed in U.S. Pat. No. 4,248,962. These can be represented by general formula (T-2)indicated below.

*—Nu—Link—E—** General Formula (T-2)

In this formula, * indicates the position at which it is bonded on the left hand side in general formula (II) and  indicates the position at which it is bonded on the right hand side in general formula (II), Nu represents a nucleophilic group, with an oxygen atom or a sulfur atom as examples of the nucleophilic species, E represents an electrophilic group, being a group which is subjected to nucleophilic attack by Nu and which can cleave the bond marked . Moreover, Link represents a linking group which provides a steric relationship such that Nu and E can undergo an intramolecular nucleophilic substitution reaction. Actual examples of groups which can be represented by general formula (T-2) are indicated below.

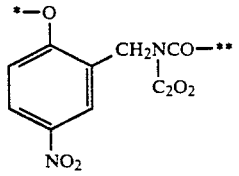

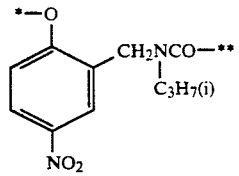

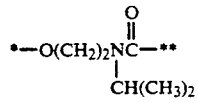

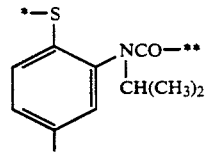

(3) Groups in which a Cleavage Reaction is Brought About Using an Electron Transfer Reaction Along a Conjugated System.

For example those disclosed in U.S. Pat. No. 4,409,323 or 4,421,845, being groups which can be represented by general formula (T-3) indicated below.

General Formula (T-3)

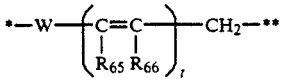

In this formula, *, **, W, $R_{65}$, $R_{66}$ and t have the same meaning as in general formula (T-1).

Groups such as those indicated below are actual examples of such groups.

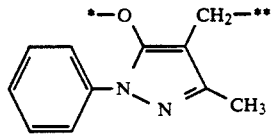

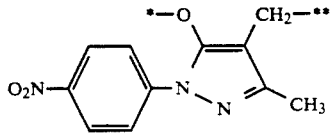

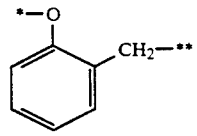

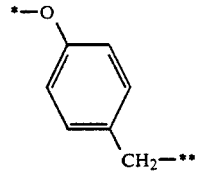

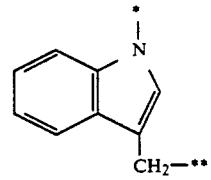

(4) Groups in which a Cleavage Reaction due to the Hydrolysis of an Ester is Used.

For example the linking groups disclosed in West German Patent Application (OLS) No. 2,626,315, being groups as indicated below. In these formulae, * and ** have the same meaning as described in connection with general formula (T-1).

General Formula (T-4)

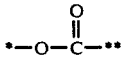

General Formula (T-5)

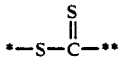

(5) Groups in which an Iminoketal Cleavage Reaction is Used.

For example the linking groups disclosed in U.S. Pat. No. 4,546,073, being groups which can be represented by general formula (T-6) indicated below.

General Formula (T-6)

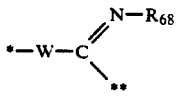

In this formula, *, ** and W have the same meaning as described in connection with general formula (T-1) and $R_{68}$ represents a group which has the same meaning as $R_{67}$. The following groups are actual examples of groups which can be represented by general formula (T-6)

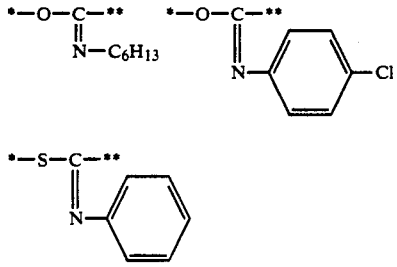

When the group which is represented by $L_1$ in general formula (I') is a group which reacts with the oxidized product of the developing agent after cleavage from A and from which the group $(L_2)_b$—Z is cleaved, it is more specifically a group which forms a coupler or a group which forms a redox group after cleavage from A. Similarly, when the group which is represented by $L_2$ is a group which reacts with the oxidized product of the developing agent after cleavage from the A-$(L_1)_b$ group with the cleavage of the Z group, it is more specifically a group which forms a coupler or group which forms a redox group after cleavage from A-$(L_1)_b$.

The groups which form couplers, in the case of phenol type couplers for example, are those in which A—, or A—$(L_1)_b$— is bonded to an oxygen atom obtained by removing the hydrogen atom of a hydroxyl group. Furthermore, in the case of the 5-pyrazolone type couplers, they are those in which A— or A—$(L_1)_b$— is bonded to an oxygen atom obtained by removing a hydrogen atom from the hydroxyl group of the tautomeric 5-hydroxypyrazole form. In these examples, a phenol type coupler or 5-pyrazolone type coupler is formed, starting with the elimination from A— or A—$(L_1)_b$— respectively. These have —$L_2)_b$—Z or Z at the coupling position.

When $L_1$ and $L_2$ represent groups which become couplers, they are preferably groups which can be represented by general formulae (V), (VI), (VII) or (VIII) below. In these formulae, * indicates the position of the bonding on the left hand side in general formula (I') and ** indicates the position of the bonding on the right hand side.

General Formula (V)

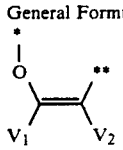

General Formula (VI)

-continued

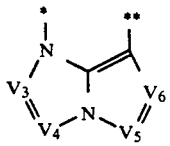

General Formula (VII)

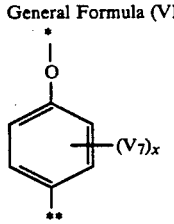

General Formula (VIII)

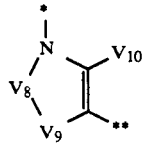

In these formulae, $V_1$ and $V_2$ represent substituent groups, $V_3$, $V_4$, $V_5$ and $V_6$ represent nitrogen atoms or substituted or unsubstituted methine groups, $V_7$ represents a substituent group, and x represents an integer of 0 to 4. When x is two or more, then the $V_7$ groups may be the same or different and two $V_7$ groups may be linked together to form a ring structure. $V_8$ represents a —CO— group, a —$SO_2$— group, an oxygen atom or a substituted imino group, $V_9$ represents a group of non-metallic atoms for forming a five to eight membered ring in conjunction with

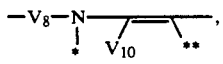

and $V_{10}$ represents a hydrogen atom or a substituent group. However, $V_1$ and $V_2$ may each be divalent groups and linked together to form a five to eight membered ring in conjunction with

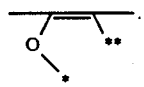

$V_1$ preferably represents an $R_{71}$ group, and an $R_{72}$ group, an $R_{72}CO$— group, an $R_{73}NCO$— group,
|
$R_{74}$ an $R_{72}SO_2$— group, and $R_{72}S$— group, an $R_{72}O$— group or an $R_{73}SO_2N$—
|
$R_{74}$ group are preferred examples of the $V_2$ group. Examples of rings formed by the linking together of $V_1$ and $V_2$ include indenes, indoles, pyrazoles and benzothiophenes.

When $V_3$, $V_4$, $V_5$ or $V_6$ is a substituted methine group, the preferred substituent groups are an $R_{71}$ group, an $R_{73}O$— group, an $R_{71}S$— group or an $R_{71}CONH$— group.

Halogen atom, an $R_{71}$ group, an $R_{71}CONH$— group, an $R_{71}SO_2NH$— group, an $R_{73}O$— group, an $R_{71}S$— group, an $R_{73}N(R_{74})CO$— group, an $R_{73}N(R_{74})CON(R_{75})$— group, an $R_{71}CO$— group and an $R_{73}OOC$— group are preferred examples of $V_7$. Examples of ring structures formed by the linking together of a plurality of $V_7$ groups include naphthalenes, quinolines, oxyindoles, benzodiazipin-2,4-diones, benzimidazol-2-ones and benzothiophenes.

When $V_8$ represents a substituted imino group it is preferably an $R_{73}N<$ group.

The preferred ring structures formed by $V_9$ with

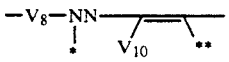

are indoles, imidazolinones, 1,2,5-thiadiazolin-1,1-dioxides, 3-pyrazolin-5-ones, 3-iso-oxazolin-5-ones or rings of the type indicated below.

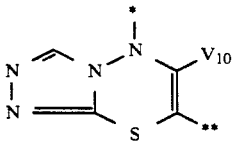

An $R_{73}$ group, an $R_{73}O$— group, an $R_{73}N(R_{74})$— group, an $R_{71}CON(R_{73})$— group and an $R_{71}S$— group are preferred examples of $V_{10}$.

$R_{71}$ and $R_{72}$ in the description above represent aliphatic groups, aromatic groups or heterocyclic groups, and $R_{73}$, $R_{74}$ and $R_{75}$ represent hydrogen atoms, aliphatic groups, aromatic groups or heterocyclic groups. Here aliphatic groups, aromatic groups and heterocyclic groups have the same meaning as described earlier in connection with $R_{41}$. However, the total number of carbon atoms contained in these groups is preferably not more than 10.

The groups indicated below are typical examples of groups which can be represented by general formula (V).

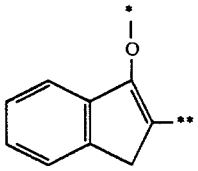

-continued

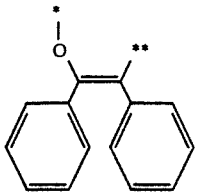

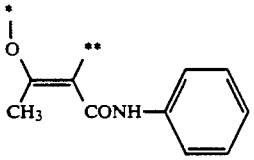

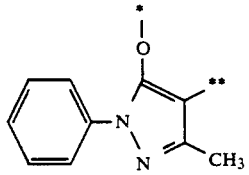

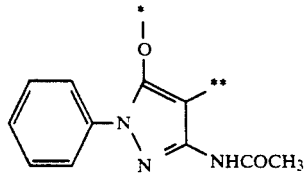

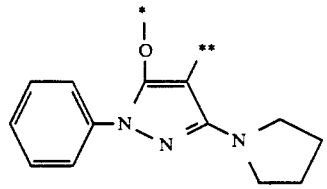

The following groups are typical examples of groups which can be represented by general formula (VI).

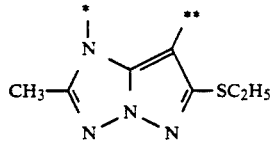

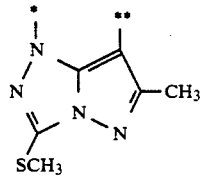

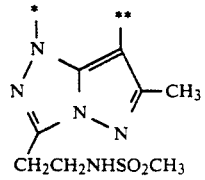

-continued

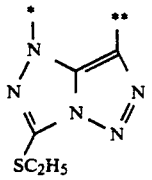

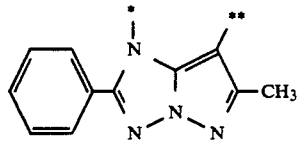

The following groups are typical examples of groups which can be represented by general formula (VII).

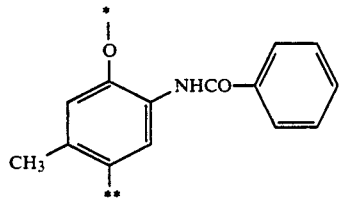

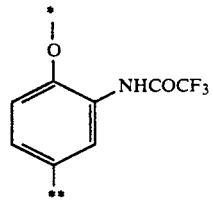

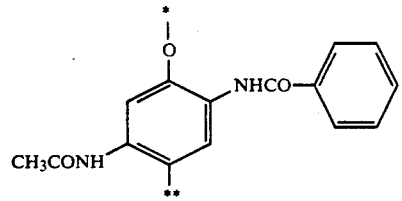

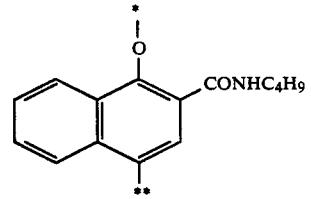

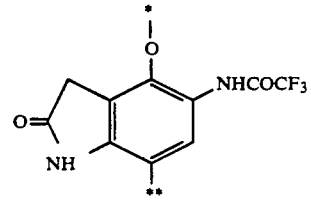

The following groups are typical examples of groups which can be represented by general formula (VIII).

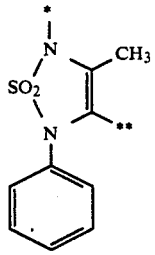

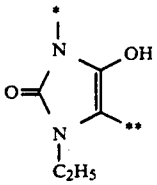

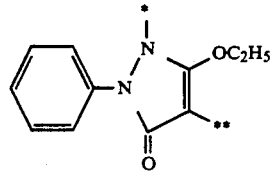

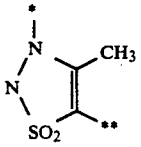

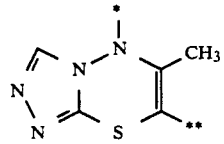

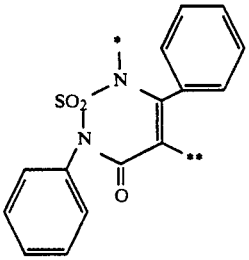

Groups which can be represented by general formula (IX) below are preferred when the groups represented by $L_1$ and $L_2$ in general formula (I') are groups which become redox groups.

$$*P'-(X'=Y')_{n'}-Q'-A'_2$$ General Formula (IX)

In this formula, * indicates the position at which the group is bonded on the left hand side in general formula (I), $A'_2$, P', Q' and n' have the same meaning as $A_2$, P, Q and n respectively as described in connection with general formula (II), at least one of the n' individual X' groups and n' individual Y' groups represents a methine group which has —($L_2$)—Z or Z as a substituent group and the other X' and Y' groups are substituted or unsubstituted methine groups or nitrogen atoms. Cases in which any two substituent groups of $A'_2$, P', Q', X' and Y' are divalent groups and a ring structure is formed are also included here. Ring structures of this type are for example benzene rings or pyridine rings.

P' in general formula (IX) preferably represents an oxygen atom and Q' preferably represents an oxygen atom or one of the groups indicated below. Here, * indicates the free bond which is bonded to (X'=Y')n' and ** indicates the free bond which is bonded to $A'_2$.

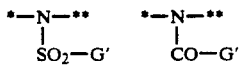

In these formulae, G' has the same meaning as G described in connection with general formulae (N-1) and (N-2).

Q' is most desirably an oxygen atom or a group which can be represented by

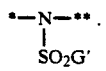

The groups which can be represented by the general formulae (X) and (XI) below are especially desirable among the groups which can be represented by the general formula (IX).

General Formula (X)

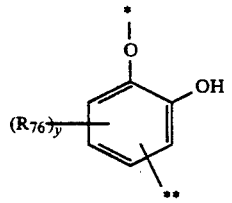

General Formula (XI)

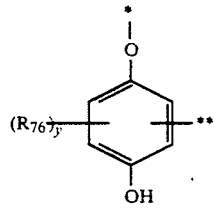

In these formulae, * indicates the position of the bonding on the left hand side to $L_1$ or $L_2$ in general formula (I) and ** indicates the position of the bonding on the right hand side. $R_{76}$ has the same meaning as $R_{64}$ described in connection with general formula (III) or general formula (IV). Moreover, y represents an integer of 0 to 3, and when y is two or more the $R_{76}$ groups may be the same or different. Furthermore, cases in which two $R_{76}$ groups are linked together and form a ring structure are also included.

The groups indicated below are especially desirable examples of $R_{76}$. That is to say alkoxy groups (for example a methoxy group, an ethoxy group etc.), acylamino groups (for example an acetamido group, a benzamido group etc.), sulfonamido groups (for example a methanesulfonamido group, a benzenesulfonamido group etc.), alkylthio groups (for example a methylthio group, an ethylthio group etc.), carbamoyl groups (for example an N-propylcarbamoyl group, an N-t-butylcarbamoyl group, an N-iso-propylcarbamoyl group etc.), alkoxycarbonyl groups (for example a methoxycarbonyl group, a propoxycarbonyl group etc.), aliphatic groups (for example a methyl group, a t-butyl group etc.), halogen atoms (for example a fluoro group, a chloro group etc.), sulfamoyl groups (for example an N-propylsulfamoyl group, a sulfamoyl group etc.), acyl groups (for example an acetyl group, a benzoyl group etc.), a hydroxyl group and a carboxyl group. Furthermore, a typical example of a case in which two $R_{76}$ groups are linked together and a ring structure is formed is shown below: (here * and ** have the same meaning as described in connection with general formula (XI).

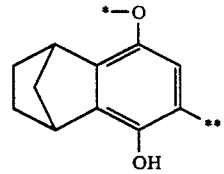

The group which is represented by Z in general formula (I') is a known bleach accelerating agent residual group. For example, it may be one of a variety of mercapto compounds as disclosed in U.S. Pat. No. 3,893,858, British Patent No. 1,138,842 or in Japanese Patent Application (OPI) No. 141623/78, a compound which has a disulfide bond as disclosed in Japanese Patent Application (OPI) No. 95630/78, a thiazolidine derivative as disclosed in Japanese Patent Publication No. 9854/78, an iso-thiourea derivative as disclosed in Japanese Patent Application (OPI) No. 94927/78, a thiourea derivative as disclosed in Japanese Patent Publication No. 8506/70 or 26586/74, a thioamido compound as disclosed in Japanese Patent Application (OPI) No. 42349/74, a dithiocarbamic acid salt as disclosed in Japanese Patent Application (OPI) No. 26506/80, or an arylenediamine compound as disclosed in U.S. Pat. No. 4,552,834. Those of these compounds in which the $A—(L_1)_a—(L_2)_b—$ group in general formula (I') is bonded to a substitutable hetero atom which is contained in the molecule are preferred.

The group represented by Z is most desirably a group which can be represented by general formula (XII), (XIII) or (XIV) below.

General Formula (XII)

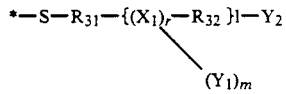

General Formula (XIII)

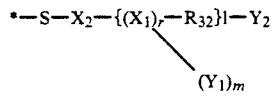

General Formula (XIV)

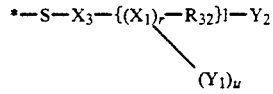

In these formulae, * indicates the position of bonding with $A—(L_1)_a—(L_2)_b—$, $R_{31}$ represents a divalent aliphatic group which has from 1 to 8, and preferably from 1 to 5, carbon atoms, $R_{32}$ represents a group which has the same meaning as $R_{31}$, a divalent aromatic group which has from 6 to 10 carbon atoms or a three to eight membered, and preferably a five or six membered, divalent heterocyclic group, $X_1$ represents an —O— group, a —S— group, a —COO— group, a $—SO_2—$ group,

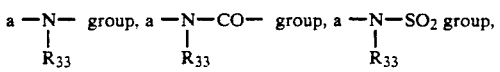

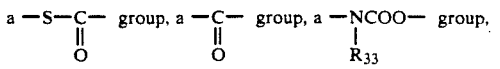

-continued a $-\underset{\underset{R_{33}}{|}}{N}=C-$ group, a $-\underset{\underset{R_{33}}{|}}{N}CO-\underset{\underset{R_{34}}{|}}{N}-$ group or an $-\underset{\underset{R_{33}}{|}}{N}SO_2\underset{\underset{R_{34}}{|}}{N}-$ group, $X_2$ represents an aromatic group which has 6 to 10 carbon atoms, $X_3$ represents a three to eight membered, and preferably a five or six membered, heterocyclic group which has at least one carbon atom which is bonded to sulfur within the ring, $Y_1$ represents a carboxyl group or a salt thereof, a sulfo group or a salt thereof, a hydroxyl group, a phosphonic acid group or a salt thereof, an amino group (this may be substituted with aliphatic group(s) which have 1 to 4 carbon atoms), an $-NHSO_2-R_{35}$ group or an $-SO_2NH-R_{35}$ group (here the term salt signifies a salt such as a sodium salt, a potassium salt, an ammonium salt etc.), $Y_2$ represents a group having the same meaning as those described for $Y_1$ or a hydrogen atom, r represents 0 or 1, l represents an integer of 0 to 4, m represents an integer of 1 to 4 and u represents an integer of 0 to 4. Furthermore, the m individual $Y_1$ groups are bonded at each of the substitutable positions of $R_{31}\{(X_1)_r-R_{32}\}_l$, $X_2\{(X_1)_r-R_{32}\}_l$, and $X_3\{(X_1)_r-R_{32}\}_l$, and when m is two or more the m individual $Y_1$ groups may be the same or different, and when l is two or more the l individual $\{(X_1)_r-R_{32}\}$ groups may be the same or different. Here $R_{33}$, $R_{34}$ and $R_{35}$ each represent a hydrogen atom or an aliphatic group which has from 1 to 8, and preferably from 1 to 5, carbon atoms. When $R_{31}$ to $R_{35}$ represent aliphatic groups they may be chain form or cyclic, linear chain or branched, saturated or unsaturated, substituted or unsubstituted aliphatic groups. Unsubstituted groups are preferred but they may have for example halogen atoms, alkoxy groups (for example methoxy groups, ethoxy groups), alkylthio groups (for example methylthio groups, ethylthio groups) etc. as substituent groups.

The aromatic groups represented by $X_2$ and the aromatic group when $R_{32}$ represents an aromatic group may have substituent groups. For example, they may have the aforementioned substituents cited as aliphatic group substituent groups.

The heterocyclic groups represented by $X_3$ and the heterocyclic groups when $R_2$ represents a heterocyclic group are saturated or unsaturated, substituted or unsubstituted heterocyclic groups which have oxygen atoms, sulfur atoms or nitrogen atoms as the hetero atoms. For example, they may be pyridine rings, imidazole rings, piperidine rings, oxylane rings, suforane rings, imidazolidine rings, thiazipine rings or pyrazole rings. The aforementioned groups cited as aliphatic group substituent groups may also be substituent groups in this case.

Actual examples of groups which can be represented by general formula (XII) are indicated below.

$-SCH_2CH_2CO_2H$, $-SCH_2CO_2H$, $-SCH_2CH_2N(CH_3)_2$, $-SCH_2\underset{\underset{OH}{|}}{C}HCH_2OH$ -continued $-SCH_2CH_2NH_2$, $-SCH_2\underset{\underset{NH_2}{|}}{C}HCO_2H$, $-S(CH_2)_2\underset{\underset{O}{\|}}{C}CH_2OH$, $-SCH_2CH_2NHCOCH_3$, $-S(CH_2)_4CO_2H$, $-S\underset{\underset{CH_3}{|}}{C}HCO_2H$, $-SCH_2CONHCH_2CO_2H$, $-SCH_2CH_2OCH_2CO_2H$, $-SCH_2COOCH_2CH_2OH$, $-SCH_2CH_2OCH_2CH_2OCH_2CH_2OH$,

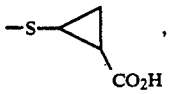

, $-SCH_2-\underset{\underset{OH}{|}}{C}H-CH_3$, $-SCH_2CH_2SCH_2CO_2H$, $-SCH_2CH_2CH_2CO_2H$,

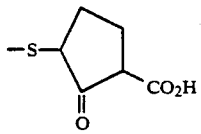

Actual examples of groups which can be represented by general formula (XIII) are indicated below.

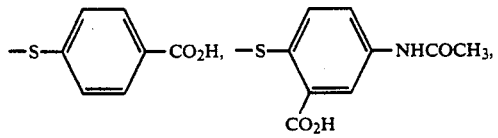

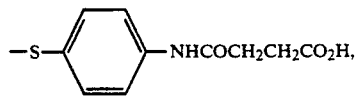

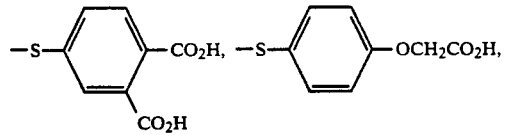

Actual examples of groups which can be represented by general formula (XIV) are indicated below.

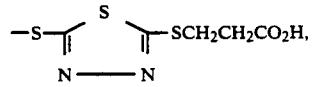

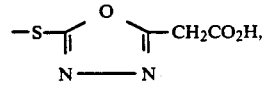

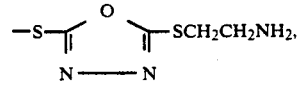

-continued

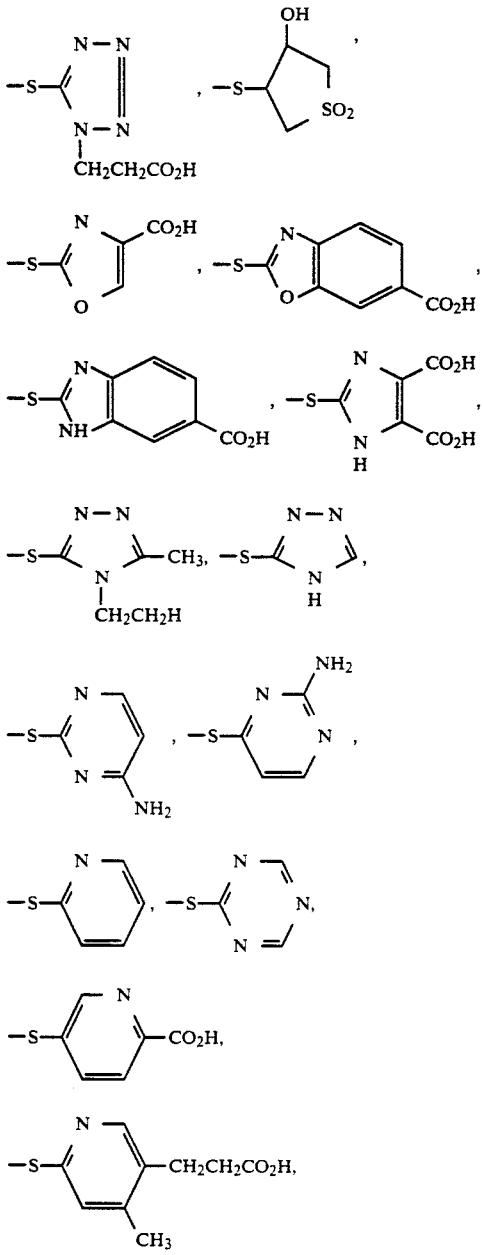

The compounds which can be represented by general formula (I') of this invention also include dimers, telomers and polymers. For example, in the case of polymers there are polymers derived from monomers represented by general formula (XV) and which have a repeating unit which can be represented by general formula (XVI), and copolymers with at least one type of non-color forming monomer which contains at least one ethylenic group which has no capacity for coupling with the oxidized product of a primary aromatic amine developing agent. Here, two or more monomers which can be represented by general formula (XV) can be polymerized at the same time.

General Formula (XV)

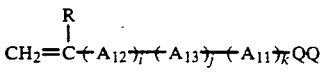

-continued

General Formula (XVI)

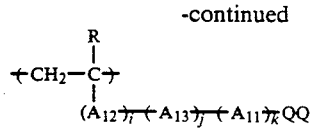

In these formulae, R represents a hydrogen atom, a lower alkyl group which has from 1 to 4 carbon atoms or a chlorine atom, $A_{11}$ represents —CONH—, —NHCONH—, —NHCOO—, —COO—, —$SO_2$—, —CO—, —NHCO—, —$SO_2$NH—, —NH$SO_2$—, —OCO—, —OCONH—, —NH— or —O—, $A_{12}$ represents —CONH— or —COO—, and $A_{13}$ represents an unsubstituted or substituted alkyline group, an aralkylene group or an unsubstituted or substituted arylene group, which has from 1 to 10 carbon atoms, and the alkylene groups may be either linear chain or branched. (Examples of alkylene groups include methylene groups, methylmethylene groups, dimethylmethylene groups, dimethylene groups, trimethylene groups, tetramethylene groups, pentamethylene groups, hexamethylene groups, decylmethylene groups, the aralkylene groups include for example benzylidene groups, and arylene groups include for example phenylene group, naphthylene group etc.).

QQ represent the residual groups of compounds which can be represented by general formula (I') and these can be bonded at any position, excluding the group which is represented by Z, of the substituent groups described previously.

Moreover, i, j and k represent 0 or 1 but i, j and k cannot all be 0 at the same time.

The substituents for the alkylene groups, aralkylene groups and arylene groups which can be represented by $A_{13}$ include aryl groups (for example phenyl groups), nitro groups, hydroxyl groups, cyano groups, sulfo groups, alkoxy groups (for example methoxy groups), aryloxy groups (for example phenoxy groups), acyloxy groups (for example acetoxy groups), acylamino groups (for example acetylamino groups), sulfonamido groups (for example methanesulfonamido groups), sulfamoyl groups (for example methylsulfamoyl groups), halogen atoms (for example fluorine atoms, chlorine atoms, bromine atoms etc.), carboxyl groups, carbamoyl groups (for example methylcarbamoyl groups), alkoxycarbonyl groups (for example methoxycarbonyl groups) and sulfonyl groups (for example methylsulfonyl groups). When there are two or more of these substituent groups they may be the same or different.

The non-color forming ethylenic monomer which does not undergo a coupling reaction with the oxidation products of a primary aromatic amine developing agent may be acrylic acid, α-chloroacrylic acid, an α-alkylacrylic acid or an ester or amide derived from these acrylic acids, methylenebisacrylamide, a vinyl ester, acrylonitrile, an aromatic vinyl compound, a maleic acid derivative or a vinylpyridine etc. Two or more types of the non-color forming ethylenic unsaturated monomers used here can be used at the same time.

Cases in which any two of the groups represented by A, $L_1$, $L_2$ an dZ in general formula (I') have free bonds other than the free bonds indicated in general formula (I') are included in the invention. The effect of the invention can be obtained even if the second free bond is not broken during development. Examples of these free bonds are indicated below.

$A—L_3—(L_2)_b—Z$ $A—L_1—L_2—Z$ $A—(L_1)_a—L_2—Z$

The most desirable examples of the above mentioned forms are those which can be represented by general formula (XVII) below.

General Formula (XVII)

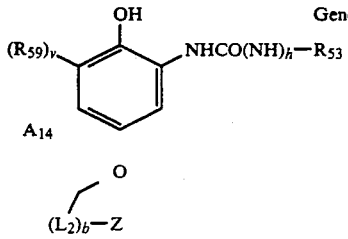

In this formula, $L_2$, b, Z, $R_{58}$ and $R_{59}$ have the same meaning as described before, h and v each represent 0 or 1, and $A_{14}$ represents a divalent organic residual group which forms a five to eight membered ring.

Examples of $A_{14}$ include an

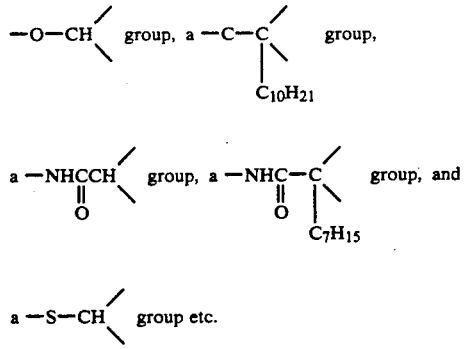

Actual examples of compounds which release a bleach accelerator which can be used in the invention are indicated below, but the invention is not limited to these compounds.

(1)

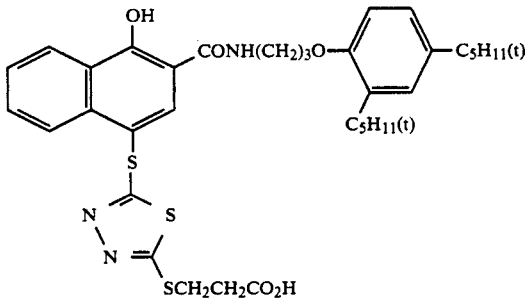

(2)

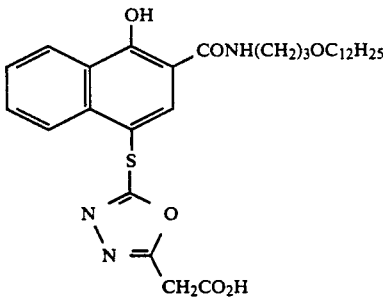

(3)

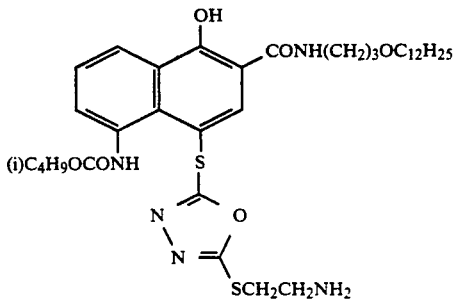

-continued
(4)
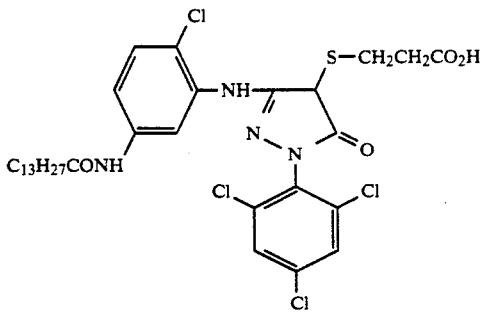
(5)
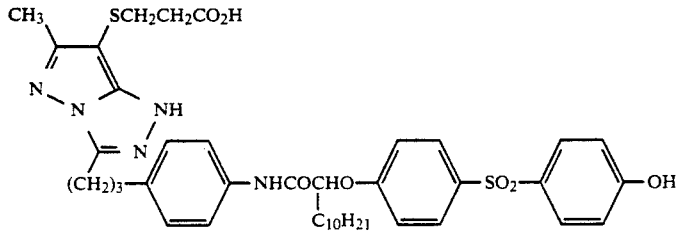
(6)
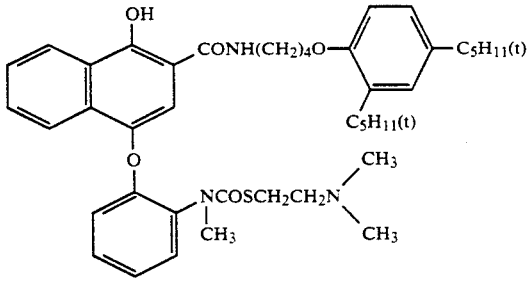
(7)
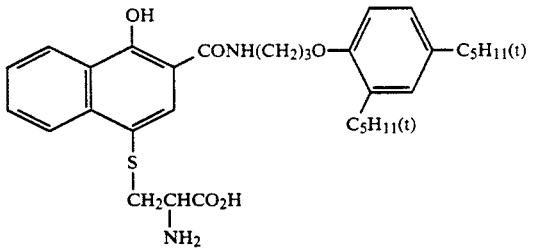
(8)
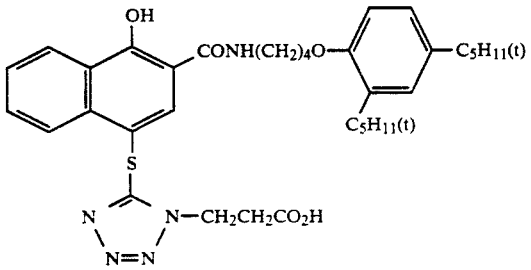

-continued
(9)
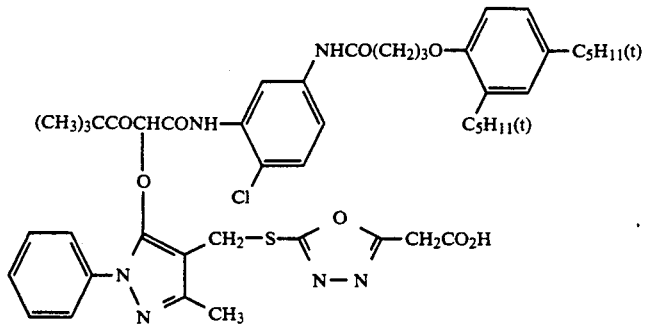
(10)
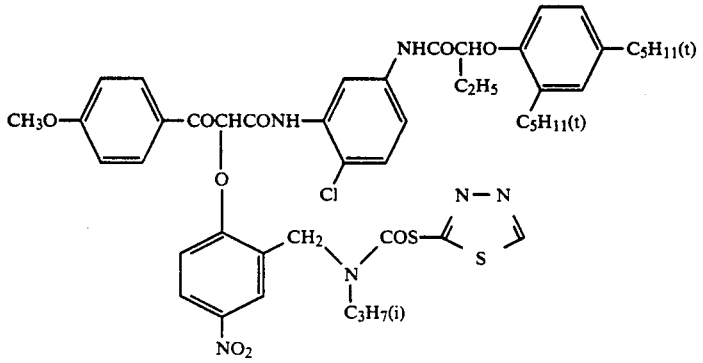
(11)
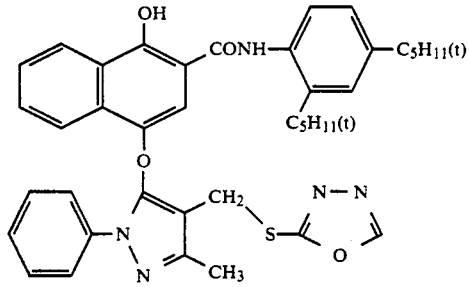
(12)
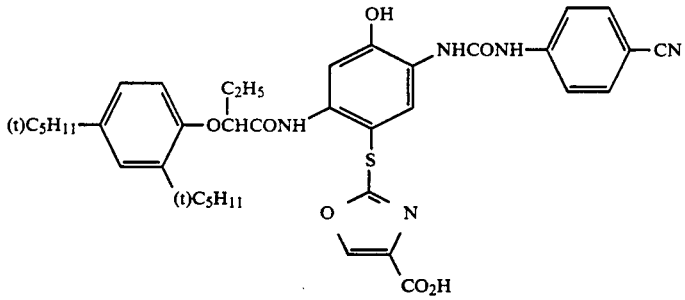
(13)
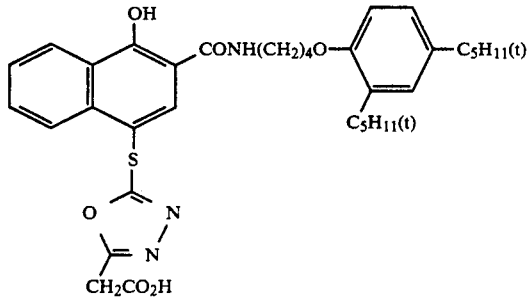

-continued
(14)
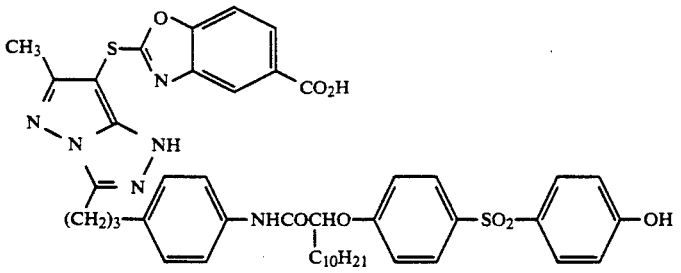
(15)
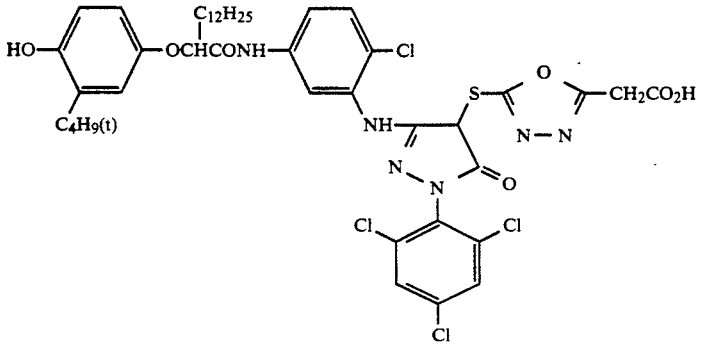
(16)
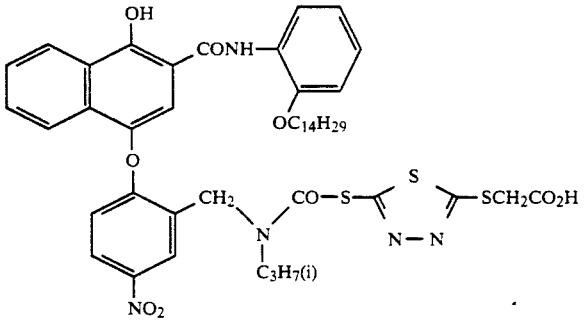
(17)
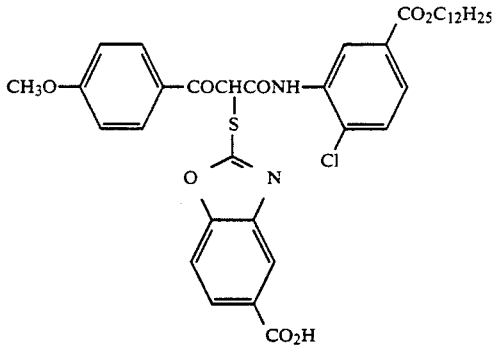
(18)
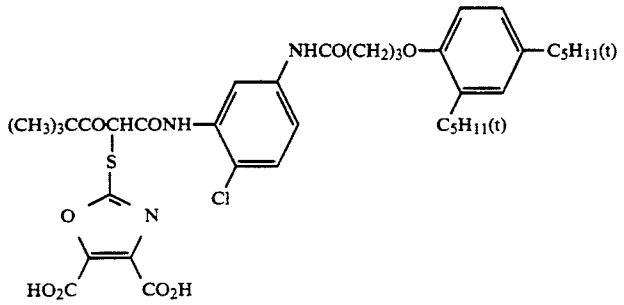

-continued
(19)
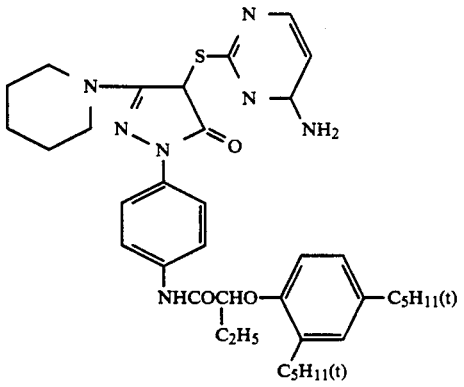
(20)
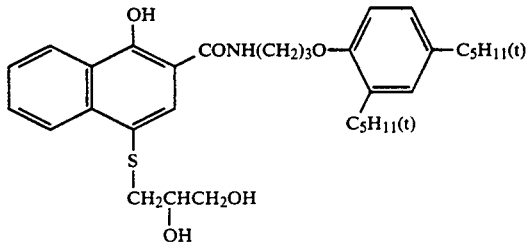
(21)
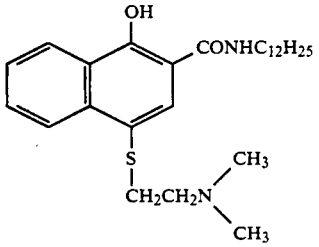
(22)
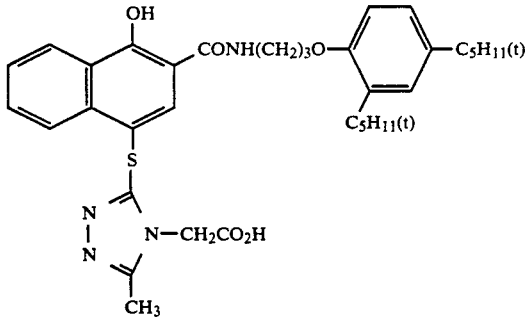
(23)
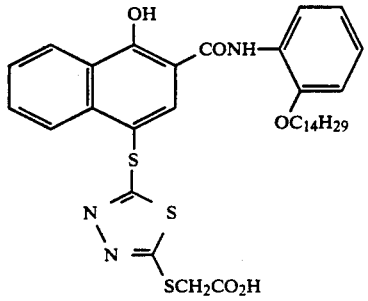

-continued
(24)
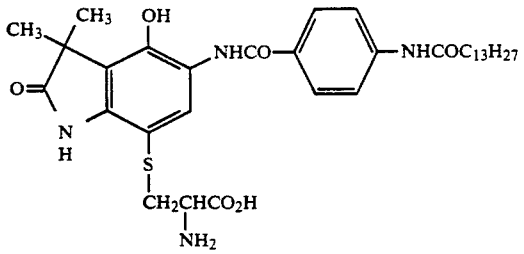
(25)
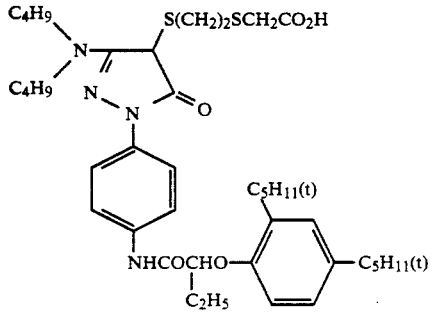
(26)
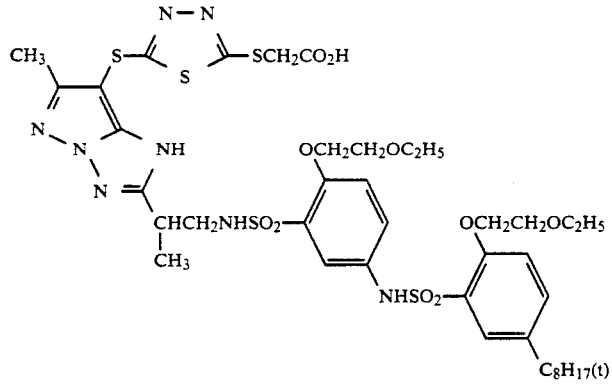
(27)
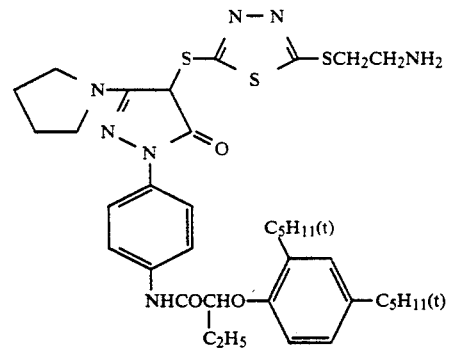
(28)
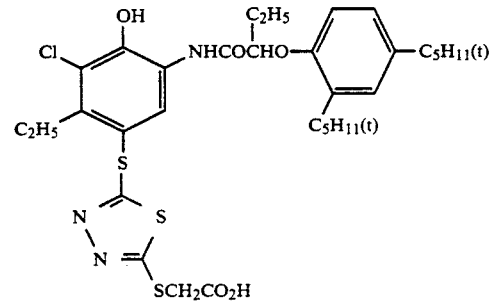

-continued
(29)
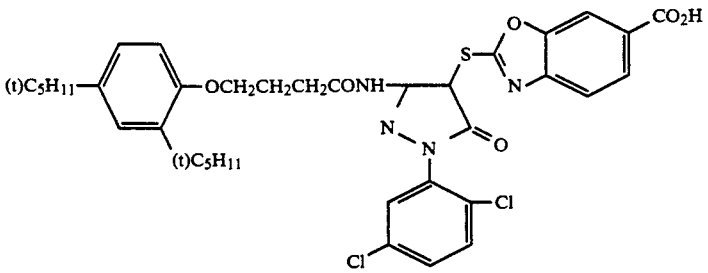
(30)
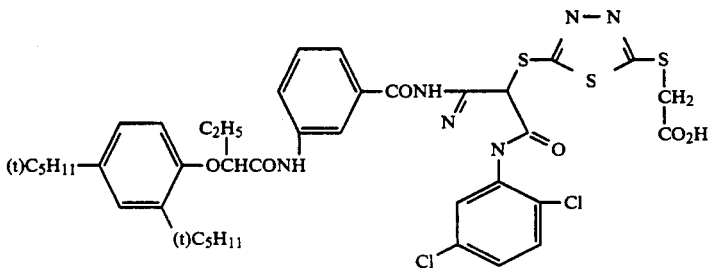
(31)
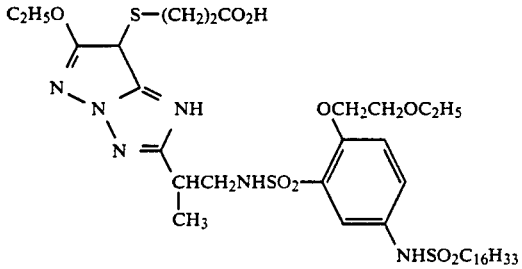
(32)
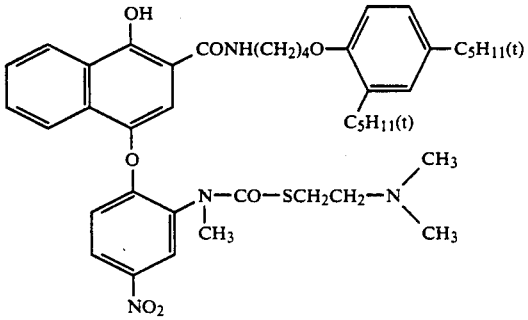
(33)
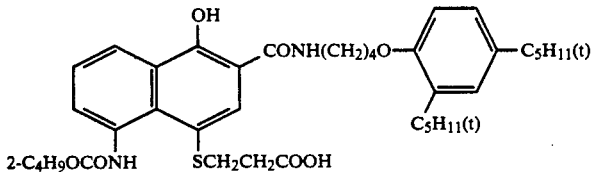
(34)
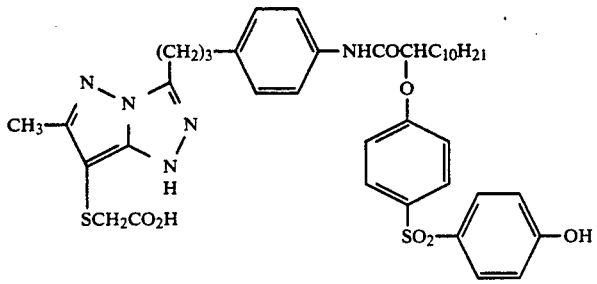

-continued
(35)
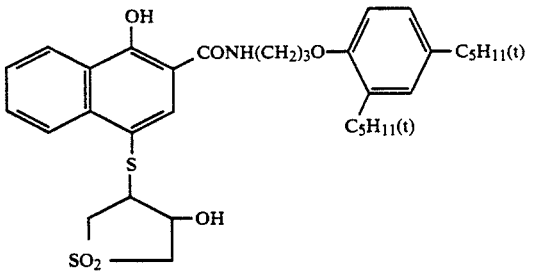
(36)
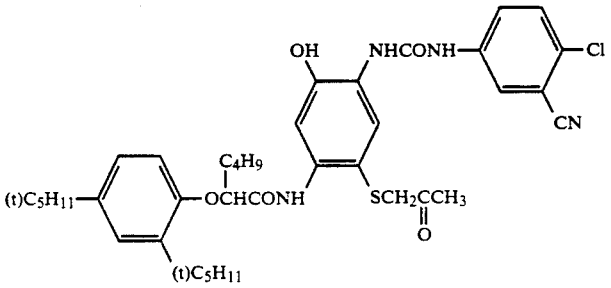
(37)
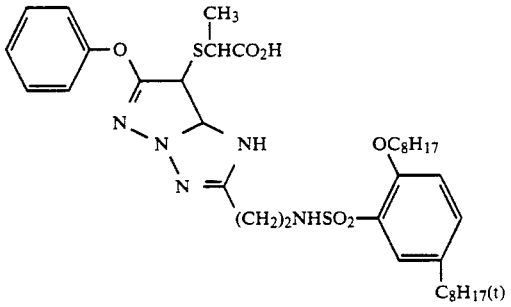
(38)
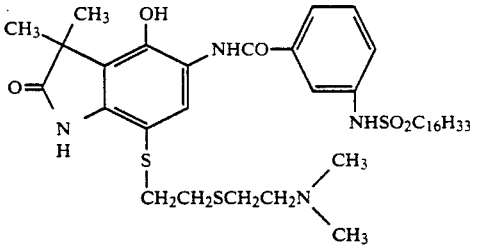
(39)
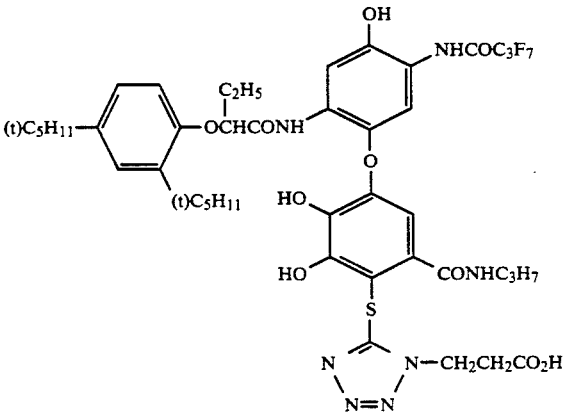

-continued
(40)
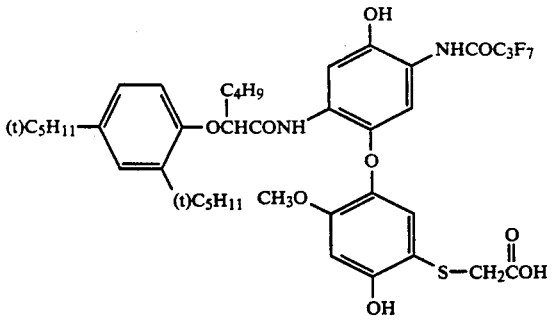
(41)
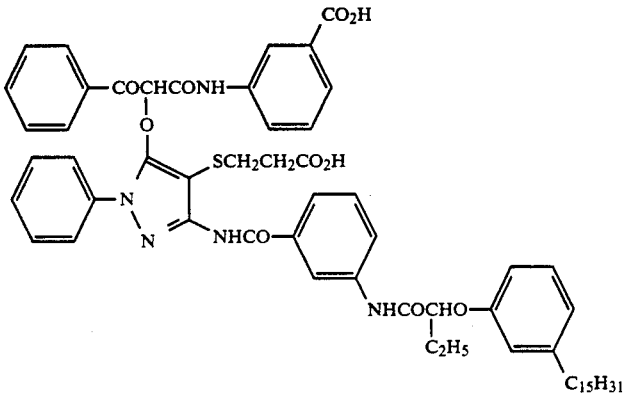
(42)
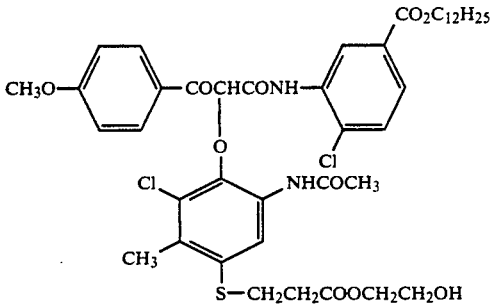
(43)
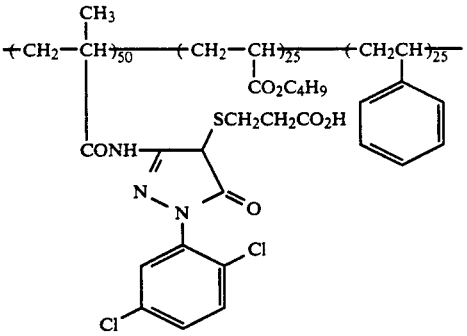
(44)
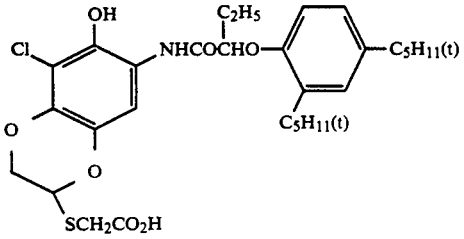

-continued
(45)
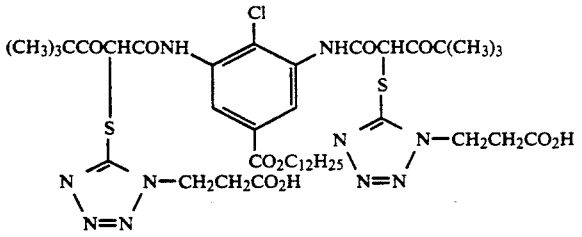
(46)
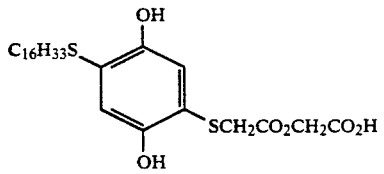
(47)
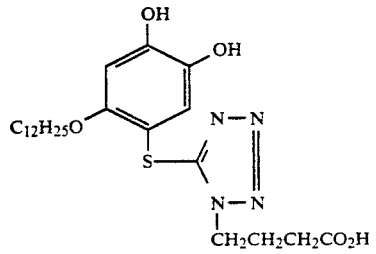
(48)
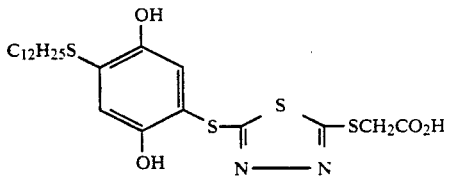
(49)
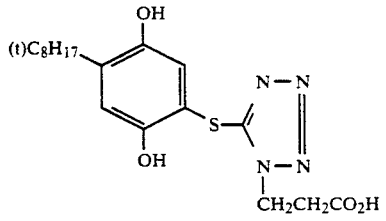
(50)
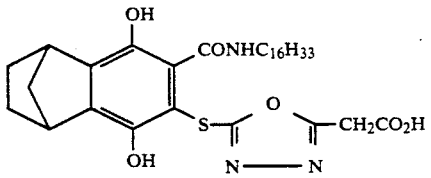
(51)
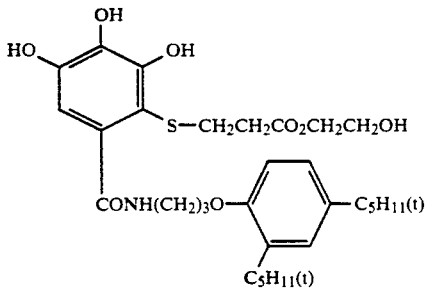

-continued (52)

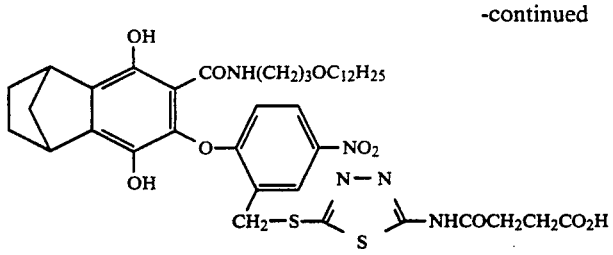

The compounds disclosed in Research Disclosure Item Nos. 24241 and 11449, Japanese Patent Application (OPI) No. 201247/86 and Japanese Patent Application Nos. 252847/86, 268870/86 and 268871/86 can also be used in the same way.

Furthermore, the bleach accelerating agent releasing compounds which are used in the invention can be prepared easily on the basis of the disclosures made in the above mentioned patent specifications.

The amount of the bleach accelerating agent releasing compound of this invention added to the photosensitive material is preferably from $1\times10^{-7}$ mol to $1\times10^{-1}$ mol, and most desirably from $1\times10^{-6}$ mol to $5\times10^{-2}$ mol, per square meter of photosensitive material. The bleach accelerating agent releasing compounds of this invention can be added to all of the layers of a photosensitive material, but they are preferably added to the photosensitive emulsion layers, and the effect becomes more pronounced as they are added to more of the photosensitive emulsion layers. When they are added to a non-photosensitive layer, a side effect such as decrease in sensitivity may be lessened.

The silver halide color photographic materials with which the invention can be used are described below. Any silver halide, such as silver bromide, silver iodobromide, silver chlorobromide, silver chloroiodobromide, silver chloride or silver chloroiodide, can be used in the emulsion layers of the photosensitive material, but the use of silver iodobromide is especially desirable. When silver iodobromide is used the silver iodide content is normally not more than 40 mol %, preferably not more than 20 mol %.

The above mentioned silver halide grains may be so-called regular grains which have a regular crystalline form such as a cubic, octahedral or tetradecahedral form, or they may have an irregular form such as a spherical form or they may have crystal defects such as twin crystal planes, or alternatively they may have a complex form consisting of these forms. Furthermore, mixtures of grains which have various crystalline forms can also be used.

The above mentioned silver halides may be monodisperse emulsions which have a narrow distribution or poly-disperse emulsions which have a wide distribution.

Furthermore, tabular grains which have an aspect ratio of at least 5 can also be used in the above mentioned emulsion layers.

The crystal structure of the above mentioned emulsion grains may be uniform, or the inner parts and outer parts of the grains may consist of materials which have different halogen compositions and the grains may have a layered structure. These emulsion grains have been disclosed in British Patent 1,027,146, U.S. Pat. Nos. 3,505,068 and 4,444,877, and in Japanese Patent Application (OPI) No. 143331/85 etc. Furthermore, the silver halides which have different compositions can be joined with an epitaxial junction and, moreover, they can be joined with compounds other than silver halides, such as silver thiocyanate, lead oxide etc.

The above mentioned emulsions may be of the surface latent image type where the latent image is formed principally on the surface, or of the internal latent image type where the latent image is formed within the grains, or of the type where the latent image is formed both at the surface and within the grains. Furthermore, the grains may be of the type where the interior of the grain has been chemically sensitized.

The silver halide photographic emulsions which can be used with the invention can be prepared conveniently using the known methods, and they can be prepared for example in accordance with the methods disclosed in "I. Emulsion Manufacture (Emulsion Preparation and Types)", on pages 22 to 23 of Research Disclosure Vol. 176, No. 17643 (December 1978), and on page 648 of Research Disclosure, Vol. 187, No. 18716 (November 1979).

Various silver halide solvents (for example ammonia, potassium thiocyanate or the thione compounds and thioethers disclosed in U.S. Pat. No. 3,271,157, Japanese Patent Application (OPI) Nos. 12360/76, 82408/78, 144319/78, 100717/79 or 155828/79) can be used, as required, in the preparation of the photographic emulsions of this invention.

Emulsions of a kind which contain silver halide grains of which the average grain diameter is greater than 0.1 micron and in which at least 95 wt % of the grains are within ±40% of the average grain diameter are typical of the mono-disperse emulsions. Emulsions in which the average grain diameter is from 0.25 to 2 microns, and in which at least 95 wt % or 95% of the silver halide grains (in terms of the number of grains) is/are within ±20% of the average grain diameter, can be used in the invention.

Cadmium salts, zinc salts, lead salts, thallium salts, iridium salts or complex salts thereof, rhodium salts or complex salts thereof, and iron salts or complex salts thereof etc. may be present during the formation or physical ripening of the silver halide grains.

The emulsions which are used in the invention are normally used after carrying out chemical ripening and spectral sensitization after physical ripening. The additives used in such processes have been disclosed in Research Disclosure Nos. 17643 (December 1978) and 18716 (November 1979), and the locations in the said disclosures are indicated in the table below.

Known additives for photographic purposes which can be used in the invention have also been disclosed in the two Research Disclosures mentioned above, and the locations in these disclosures are indicated in the following table.

| Type of Additive | RD 17643 | RD 18716 |
|---|---|---|
| 1. Chemical sensitizers | Page 23 | Page 648, |

-continued

| Type of Additive | RD 17643 | RD 18716 |
|---|---|---|
| | | right col. |
| 2. Speed increasing agents | | As above |
| 3. Spectral sensitizers, strong color sensitizers | Pages 23 to 24 | Pages 648 right col. to 649 right col. |
| 4. Whiteners | Page 24 | |
| 5. Anti-foggants and Stabilizers | Pages 24 to 25 | Page 649 right col. |
| 6. Light absorbers, filter dyes, UV Absorber | Pages 25 to 26 | Pages 649, right col. to 650, left col. |
| 7. Anti-staining agents | Page 25, right col. | Page 650 left to right col. |
| 8. Dye image stabilizers | Page 25 | |
| 9. Film hardening agents | Page 26 | Page 651, left col. |
| 10. Binders | Page 26 | As above |
| 11. Plasticizers, lubricants | Page 27 | Page 650, right col. |
| 12. Coating aids, Surfactants | Pages 26 to 27 | As above |
| 13. Anti-static agents | Page 27 | As above |

The known, previously described, spectral sensitizing agents can be used in the color photographic materials of this invention, but the use of compounds represented by general formulae (IV) or (V) in the disclosure on pages 90 to 110 of the specification of Japanese Patent Application No. 313598/86 and the actual examples of these compounds is preferred in the processing method of this invention.

Various color couplers can be used in addition to the aforementioned cyan image forming couplers of formula (A) in this invention and actual examples are disclosed in the patents disclosed in the aforementioned Research Disclosure (RD) No. 17643, VII-C to G. The couplers which form the three primary colors of the subtractive method (which is to say yellow, magenta and cyan) on color development are important as dye forming couplers, and as well as the couplers which have been disclosed in the patents disclosed in sections VII-C and D of the aforementioned RD 17643 which are actual non-diffusible four equivalent or two equivalent couplers. Those indicated below are preferably used in this invention.

The known oxygen atom elimination type yellow couplers or nitrogen atom elimination type yellow couplers are typical of the yellow couplers which can be used. The α-pivaloylacetanilide based couplers provide colored dyes which have excellent fastness, especially light fastness, while the α-benzoylacetanilide based couplers provide high color densities.

Hydrophobic 5-pyrazolone based and pyrazoloazole based magenta couplers, with ballast groups, can be used in the invention. 5-Pyrazolone based couplers which have an arylamino group or an acylamino group substituted in the 3-position are preferred from the point of view of the hue of the colored dye which is formed, and the color density.

Non-diffusible, hydrophobic, naphthol based and phenol based cyan couplers can be also used in the invention, and typically the two equivalent naphthol based couplers of the oxygen atom elimination type are preferred. Furthermore, the use of couplers which can form cyan dyes which are fast with respect to humidity and temperature is preferred, and typical examples include the phenol based cyan couplers which have an alkyl group consisting of an ethyl or larger group in the meta position of the phenol ring as disclosed in U.S. Pat. No. 3,772,002, the 2,5-diacylamino substituted phenol based couplers, and the phenol based couplers which have a phenylureido group in the 2-position and a diacylamino group in the 5-position.

Graininess can be improved by the conjoint use of couplers of which the colored dye has a suitable degree of diffusibility. Actual examples of magenta couplers of this type have been disclosed in U.S. Pat. No. 4,366,237 etc. and actual examples of yellow, magenta and cyan couplers of this type have been disclosed in European Patent 96,570 etc.

The dye forming couplers and the above mentioned special couplers may take the form of polymers consisting of at least dimers. Typical examples of polymerized dye forming couplers are disclosed in U.S. Pat. No. 3,451,820 etc. Actual examples of polymerized magenta couplers have been described in U.S. Pat. No. 4,367,282 etc.

The use of couplers which release photographically useful residual groups as a result of coupling is preferred in this invention. The DIR couplers which release development inhibitors disclosed in the patents disclosed in the aforementioned RD 17643, section VII-F, are useful.

Couplers which release a nucleating agent or development inhibitor, or precursors thereof, in the form of the image during development can be used in the photosensitive materials of this invention. Actual examples of such compounds have been disclosed in British Patents 2,097,140 and 2,131,188. Use can also be made of the DIR redox compound releasing couplers disclosed in Japanese Patent Application (OPI) No. 185950/85 etc. and the couplers which release dyes which are recolored after elimination as disclosed in European Patent 173,302A, etc.

The couplers which are used in the invention can be introduced into the photosensitive material using a variety of known dispersion methods. Examples of high boiling point organic solvents which can be used in the oil in water dispersion method have been disclosed in U.S. Pat. No. 2,322,027 etc. Furthermore, actual examples of the process and effect of the latex dispersion method and latexes for impregnation have been disclosed in U.S. Pat. No. 4,199,363 and West German Patent Application (OLS) 2,541,274 and 2,541,230 etc.

The photosensitive materials of this invention may also contain hydroquinone derivatives, aminophenol derivatives, amines, gallic acid derivatives, catechol derivatives, ascorbic acid derivatives, colorless couplers, sulfonamidophenol derivatives etc. as anti-color fogging agents and anti-color mixing agents.

The known anti-fading agents can be used in the photosensitive materials of this invention. Typical examples of known anti-fading agents include hydroquinones, 6-hydroxychromans, 5-hydroxycoumarin, spirochromans, p-alkoxyphenols, hindered phenols centered on bisphenols, gallic acid derivatives, methylenedioxybenzenes, aminophenols, hindered amines and ether and ester derivatives obtained by silylating or alkylating the phenolic hydroxyl groups of these compounds. Furthermore, metal complexes typified by the (bis-salicylaldoxymato)nickel complex and the (bis-N,N-dialkyldithiocarbamato)nickel complex can also be used.

The photographic emulsion layers and other layers are coated onto a flexible support, such as a plastic film as normally used for photographic materials.

A variety of known coating methods such as the dip coating method, roller coating method, curtain coating method, extrusion coating method etc. can be used for coating the photographic emulsion layers and other hydrophilic coating layers.

The invention can be applied to a variety of color photographic materials. Typical examples of such materials include general purpose and projection color negative films, color reversal films for slides and television purposes, color papers, color positive films and color reversal papers etc.

The color development baths used for the color development of the photosensitive materials of this invention are alkaline aqueous solutions which contain a primary aromatic amine based color developing agents as the principal component. Aminophenol based compounds are useful as color developing agents but the use of p-phenylenediamine based compounds is preferred, and typical examples of these include 3-methyl-4-amino-N,N-diethylaniline, 3-methyl-4-amino-N-ethyl-N-β-hydroxyethylaniline, 3-methyl-4-amino-N-ethyl-N-β-methanesulfonamidoethylamiline, 3-methyl-4-amino-N-ethyl-N-β-methoxyethylaniline and their sulfates, hydrochlorides, phosphates or p-toluenesulfonates, tetraphenylborates, p-(t-octyl)benzenesulfonates etc. These diamines are generally more stable as salts than in the free state and the use of the salts is preferred.

Aminophenol based derivatives include for example o-aminophenol, p-aminophenol, 4-amino-2-methylphenol, 2-amino-3-methylphenol and 2-oxy-3-amino-1,4-dimethylbenzene etc.

Those described on pages 226 to 229 of "Photographic Processing Chemistry", by, L. F. A. Mason, published by Focal Press (1966), and those disclosed in U.S. Pat. Nos. 2,193,015 and 2,592,364 and in Japanese Patent Application (OPI) No. 64933/73 etc. can also be used. Combinations of two or more of the above mentioned color developing agents can be used as required.

The color development bath may contain pH buffers such as the carbonates, borates or phosphates of alkali metals; development inhibitors or anti-foggants such as bromides, iodides, benzimidazoles, benzothiazoles and mercapto compounds; preservatives such as hydroxylamine, triethanolamine, the compounds disclosed in West German Patent Application (OLS) 2,622,950, sulfites and bisulfites; organic solvents such as diethylene glycol; development accelerators such as benzyl alcohol, poly(ethylene glycol), quaternary ammonium salts, amines, thiocyanates, 3,6-thiaoctan-1,8-diol; dye forming couplers; competitive couplers; nucleating agents such as sodium borohydride; auxiliary developing agents such as 1-phenyl-3-pyrazolidone; viscosity imparting agents; and chelating agents, such as the aminopolycarboxylic acids typified by ethylenediamine tetra-acetic acid, nitrilotriacetic acid, cyclohexanediamine tetra-acetic acid, iminodiacetic acid, N-hydroxymethylethylenediamine triacetic acid, diethylenetriamine penta-acetic acid, triethylenetetramine hexa-acetic acid, and the compounds disclosed in Japanese Patent Application (OPI) No. 195845/83, 1-hydroxyethylidene-1,1'-diphosphonic acid, the organic phosphonic acids disclosed in Research Disclosure No. 18170 (May 1979), aminophosphonic acids such as aminotris(methylenephosphonic acid), ethylenediamine-N,N,N',N'-tetramethylenephosphonic acid etc., and the phosphonocarboxylic acids disclosed in Research Disclosure No. 18170 (May 1979), etc.

The color developing agents is generally used at a concentration of from about 0.1 gram to about 30 grams, and preferably at a concentration of from about 1 gram to about 15 grams, per liter of color development bath. Furthermore the pH of the color development bath is normally about 7 or more and a pH from about 9 to 13 is generally used.

In this invention, the silver halide color photographic material is subjected to a color development process of the type described after imagewise exposure, and it is then processed in a processing bath which has a bleaching potential.

The processing bath which has a bleaching potential is a processing bath which has the capacity to convert, by means of oxidation, the metallic silver produced by the development reaction and the colloidal silver which is contained in the sensitive material to a soluble silver salts such as a silver thiosulfate complex salt or to an insoluble silver salt such as silver bromide, being for example a bleach bath or a bleach-fix bath. Processing in a processing bath which has a bleach-fixing potential immediately after the color development process is preferred in this invention.

Oxidizing agents such as ferric iron complex salts such as ferricyanide iron complex salts, ferric citrate complex salts etc. and oxidizing substances such as persulfates, hydrogen peroxide etc., can be used as the bleaching agents which are used in the processing baths which have a bleaching potential of this invention, but the aminopolycaroxylic acid ferric iron complex salts, consisting of ferric ions and aminopolycarboxylic acid, or salts thereof are preferred.

Typical examples of these aminopolycarboxylic acids and salts thereof are indicated below.

1. Diethylenetriamine penta-acetic acid
2. Diethylenetriamine penta-acetic acid penta-sodium salt
3. Ethylenediamine-N-(β-oxyethyl)-N,N',N'-triacetic acid
4. Ethylenediamine-N-(β-oxyethyl)-N,N',N'-triacetic acid tri-sodium salt
5. Ethylenediamine-N-(β-oxyethyl)-N,N',N'-triacetic acid tri-ammonium salt
6. 1,2-diaminopropane tetra-acetic acid
7. 1,2-diaminopropane tetra-acetic acid di-sodium salt
8. Nitrilotriacetic acid
9. Nitrilotriacetic acid sodium salt
10. Cyclohexanediamine tetra-acetic acid
11. Cyclohexanediamine tetra-acetic acid di-sodium salt
12. N-methyl-iminodiacetic acid
13. Iminodiacetic acid
14. Dihydroxyethylglycine
15. Ethyl ether diamine tetra-acetic acid
16. Glycol ether diamine tetra-acetic acid
17. Ethylenediamine tetra-propionic acid
18 1,3-diaminopropane tetra-acetic acid
19. Ethylenediamine tetra-acetic acid.

Of course, these acids and salts are not limited to the illustrative examples indicated above.

Of these compounds, those numbered 1, 2, 6, 7, 10, 11, 12, 16 and 18 are especially desirable.

The aminocarboxylic acid ferric complex salts can be used in the form of the complex salt, or the ferric ion complex salts can be formed in solution using for example ferric sulfate, ferric chloride, ferric ammonium sulfate, ferric phosphate etc. and the aminopolycarboxylic acid. When used in the form of a complex salt, either one type of complex salt or two or more types of complex salt can be used. On the other hand, when a complex salt is formed in solution using a ferric salt and an amino polycarboxylic acid, it is possible to use one, or more than one, type of ferric salt. Moreover, it is possible to use one, or more than one, type of aminopolycarboxylic acid. Furthermore, in any case it is possible to use the aminopolycarboxylic acid in an amount in excess of that required to form the ferric ion complex salt.

It is possible to use combinations of ethylenediamine tetra-acetic acid iron (III) complex salts with at least one type of iron (III) complex salt of the aminopolycarboxylic acids other than number 19 indicated above.

Metal ion complex salts of cobalt, nickel, copper etc. as well as iron ions can be introduced into the processing baths which have a bleaching potential which contain the above mentioned ferric complex salts.

The amount of bleaching agent used is from 0.1 mol to 1 mol, and preferably from 0.2 mol to 0.5 mol, per liter of the processing bath which has a bleaching potential of this invention. Furthermore, the pH of the bleach bath is preferably from 4.0 to 8.0 and most desirably from 5.0 to 7.5.

Re-halogenating agents such as bromides, for example potassium bromide, sodium bromide and ammonium bromide, or chlorides, for example potassium chloride, sodium chloride and ammonium chloride etc., can also be included as well as the bleaching agent and the above mentioned compounds in the processing baths which have a bleaching potential used in this invention. Moreover, the known additives normally used in bleach-fix baths, for example nitrates such as sodium nitrate, ammonium nitrate etc. and one or more type of inorganic acid, organic acid or salts thereof which have a pH buffering potential such as boric acid, borax, sodium metaborate, acetic acid, sodium acetate, sodium carbonate, potassium carbonate, phosphorous acid, phosphoric acid, sodium phosphate, citric acid, sodium citrate, tartaric acid etc. may also be added to the processing bath.

In this invention, it is possible to include the compounds known as fixing agents, for example the thiosulfates such as sodium thiosufate, ammonium thiosulfate, ammonium sodium thiosufate and potassium thiosulfate, thiocyanates such as ammonium thiocyanate, and potassium thiocyanate, thiourea, thioethers etc. in a fixing bath which is used after the bleaching bath, or in a processing bath which has a bleach-fixing potential etc. The amount of these fixing agents added is preferably not more than 3 mol, and most desirably not more than 2 mol, per liter of the precessing bath which has a fixing or bleach-fixing potential.

Sulfites or bisulfites such as sodium sulfate, ammonium sulfite etc. and ,so-called sulfite ion releasing compounds, for example bisulfite adducts of aldehydes such as carbonyl bisulfites etc., can be included in processing baths which have a bleach-fixing potential of this invention for example.

Moreover, aminopolycarboxylic acid salts as indicated by Nos. 1–19 or organic phosphonic acid compounds such as ethylenediamine tetrakis-methylenephosphonic acid, diethylenetriamine pentakis-methylenephosphonic acid, 1,3-diaminopropane tetrakis-methylenephosphonic acid, nitrilo-N,N,N-trimethylenephosphonic acid and 1-hydroxyethylidene-1,1'-diphosphonic acid can also be included.

In this invention, the processing can be carried out by including at least one type of bleach accelerating agent selected from among the compounds which have a mercapto group or a disulfide bond, the iso-thiourea derivatives, and the thiazolidine derivatives in the said processing bath which has a bleaching potential. These compounds are preferably added in an amount of from $1\times10^{-5}$ mol to $1\times10^{-1}$ mol, and most desirably in an amount of from $1\times10^{-4}$ mol to $5\times10^{-2}$ mol, per liter of the said bath which has a bleach-fixing potential.

The bleach accelerating agent which is included in the said processing bath which has a bleaching potential in this invention is selected from among the compounds which have mercapto groups or disulfide bonds, the thiazolidine derivatives, the thiourea derivatives and the isothio urea derivatives, provided that they have a bleach accelerating effect. The compounds represented by general formula (a) to (g) and the actual examples disclosed on pages 63 to 77 of the specification of Japanese Patent Application No. 313598/86 are preferred.

These compounds are generally pre-dissolved in water or an alkali, organic acid, organic solvent etc. for addition to the processing bath, but they may be added directly in the form of a powder to the processing bath which has a bleaching potential, this having no effect on the bleach accelerating effect.

Moreover, in this invention, a bleach accelerating agent can be included in the photosensitive material. In this case, the bleach accelerating agent can be included in any of the blue sensitive, green sensitive and red sensitive emulsion layers or in the gelatin layers such as the uppermost layer, the intermediate layers and the lowermost layer.

The processing bath which has a bleach-fixing potential of the invention may be used in a one tank process or it may be used for processing in two or more tanks, and replenisher can be supplied with a multi-stage counterflow system to said tank group and, moreover, the processing baths of said tank group may be circulated alternately to form a processing bath which is uniform throughout, and the replenisher may be supplied to one of the baths of said tank group.

The silver halide color photographic materials of this invention are generally subjected to a water washing and/or stabilization process after a de-silvering process such as fixing or bleach-fixing.

The amount of wash water used in the water washing process can be set over a wide range depending on the characteristics of the photosensitive material (for example in accordance with the materials such as couplers which have been used) and the application of the photosensitive material and, moreover, on the temperature of the water wash, the number of water wash tanks (number of stages) and on whether a counter-flow or sequential-flow replenishment system is being used and a variety of other conditions. The relationship between the amount of water used and the number of washing tanks in a multi-stage counter-flow system can be deduced using the method described on pages 248 to 253 of Vol. 64 of the Journal of the Society of Motion Picture and Television Engineers (May 1955).

The amount of wash water can be greatly reduced by using the multi-stage counter-flow system described in the aforementioned reference, but problems can arise with bacterial growth and the attachment of the suspended matter which is produced thereby on the photosensitive material due to the increased residence time of the water in the tanks. The method in which the calcium and magnesium contents are reduced disclosed in Japanese Patent Application (OPI) No. 288838/87 as a means of overcoming problems of this type can be used very effectively in the processing of the color photosensitive materials of this invention. Furthermore, the isothiazolene compounds and thiabendazoles disclosed in Japanese Patent Application (OPI) No. 8542/82, chlorine based disinfectants such as chlorinated sodium isocyanurate etc., benzotriazoles etc, and the disinfectants disclosed by Horiguchi in "The Chemistry of Disinfectants and Fungicides", in the Hygiene Technology Association publication entitled "Microbiological Disinfection, Disinfection and Fungicidal Techniques" and in the Japanese Antibacterial and Antifungal Society Publication entitled "A Dictionary of Biocides and Fungicides" can also be used.

The pH of the wash water on processing photosensitive materials of this invention is from 4 to 9, and preferably from 5 to 8. The wash water temperature and the washing time can be set variously according to the characteristics and application of the photosensitive material, but in general a washing time between 20 seconds and 10 minutes at a temperature between 15° C. and 45° C., and preferably between 30 seconds and 5 minutes at a temperature between 25° C. and 40° C., is selected.

Moreover, the photosensitive materials of this invention can be processed with a direct stabilization bath instead of the above mentioned water washing treatment. The known methods disclosed in Japanese Patent Application (OPI) Nos. 8543/82, 14834/83, 184343/84, 220345/85, 238832/85, 239784/85, 239749/85, 4054/86 and 118749/86 etc. can all be used for such a stabilization process. The use of stabilizing baths which contain 1-hydroxyethylidene-1,1-diphosphonic acid, 5-chloro-2-methyl-4-isothiazolin-3-one, bismuth compounds, ammonium compounds etc. is especially desirable.

Furthermore, there are also cases in which a stabilization process is carried out following the aforementioned water washing process, and the stabilizing baths which contain formaldehyde and a surfactant which are used as final baths for color photographic materials for filming purposes can be used in such cases.

The invention is illustrated by means of examples below, but the invention is in no way limited by these examples.

EXAMPLE 1

Sample 101, a multi-layer color photosensitive material consisting of the layers of which the compositions are indicated below, was prepared on an undercoated cellulose triacetate film support.

The amounts coated are indicated in units of grams of silver per square meter in the case of the silver halides and colloidal silver, in units of g/m$^2$ in the case of the couplers, additives and gelatin, and in units of mol per mol of silver halide in the same layer in the case of the sensitizing dyes.

| | |
|---|---|
| First Layer (Anti-halation Layer) | |
| Black colloidal silver | 0.2 |
| Gelatin | 1.3 |
| ExM-8 | 0.06 |
| UV-1 | 0.1 |
| UV-2 | 0.2 |
| Solv-1 | 0.01 |
| Solv-2 | 0.01 |
| Second Layer (Intermediate Layer) | |
| Fine grained silver bromide (average grain size 0.07μ) | 0.10 |
| Gelatin | 1.5 |

-continued

| | |
|---|---|
| UV-1 | 0.06 |
| UV-2 | 0.03 |
| ExC-2 | 0.02 |
| EcF-1 | 0.004 |
| Solv-1 | 0.1 |
| Solve-2 | 0.09 |
| Third Layer (First Red Sensitive Emulsion Layer) | |
| Silver iodobromide emulsion (AgI 2 mol %, high internal AgI content type, diameter of the corresponding sphere 0.3μ, variation coefficient of the corresponding sphere diameter 29%, regular crystals, twinned crystal admixed grains, diameter/thickness ratio 2.5) | 0.4 (Coated silver weight) |
| Gelatin | 0.6 |
| ExS-1 | $1.0 \times 10^{-4}$ |
| ExS-2 | $3.0 \times 10^{-4}$ |
| ExS-3 | $1.0 \times 10^{-5}$ |
| ExC-3 | 0.06 |
| ExC-4 | 0.06 |
| ExC-7 | 0.04 |
| ExC-2 | 0.03 |
| Solv-1 | 0.03 |
| Solv-2 | 0.012 |
| Fourth Layer (Second Red Sensitive Emulsion Layer) | |
| Silver iodobromide emulsion (AgI 5 mol %, high internal AgI content type, diameter of the corresponding sphere 0.7μ, variation coefficient of the corresponding sphere diameter 25%, regular crystals, twinned crystal admixed grains, diameter/thickness ratio 4) | 0.7 (Coated silver weight) |
| Gelatin | 0.5 |
| ExS-1 | $1.0 \times 10^{-4}$ |
| ExS-2 | $3.0 \times 10^{-4}$ |
| ExS-3 | $1.0 \times 10^{-5}$ |
| ExC-3 | 0.24 |
| ExC-4 | 0.24 |
| ExC-7 | 0.04 |
| ExC-2 | 0.04 |
| Solv-1 | 0.15 |
| Solv-2 | 0.02 |
| Fifth layer (Third Red Sensitive Emulsion Layer) | |
| Silver iodobromide emulsion (AgI 10 mol %, high internal AgI content type, diameter of the corresponding sphere 0.8μ, variation coefficient of the corresponding sphere diameter 16%, regular crystals, twinned crystal admixed grains, diameter/thickness ratio 1.3) | 1.0 (Coated silver weight) |
| Gelatin | 1.0 |
| ExS-1 | $1.0 \times 10^{-4}$ |
| ExS-2 | $3.0 \times 10^{-4}$ |
| ExS-3 | $1.0 \times 10^{-5}$ |
| ExC-6 | 0.13 |
| Solv-1 | 0.01 |
| Solv-2 | 0.05 |
| Sixth Layer (Intermediate Layer) | |
| Gelatin | 1.0 |
| Cpd-1 | 0.03 |
| Solv-1 | 0.05 |
| Seventh Layer (First Green Sensitive Emulsion Layer) | |
| Silver iodobromide emulsion (AgI 2 mol %, high internal AgI content type, diameter of the corresponding sphere 0.3μ, variation coefficient of the corresponding sphere diameter 28%, regular crystals, twinned crystal admixed grains, diameter/thickness ratio 2.5) | 0.30 (Coated silver weight) |
| ExS-4 | $5.0 \times 10^{-4}$ |
| ExS-6 | $0.3 \times 10^{-4}$ |
| ExS-5 | $2.0 \times 10^{-4}$ |
| Gelatin | 1.0 |
| ExM-9 | 0.2 |
| ExY-14 | 0.03 |
| ExM-8 | 0.03 |
| Solv-1 | 0.5 |
| Eighth Layer (Second Green Sensitive Emulsion Layer) | |
| Silver iodobromide emulsion (AgI 4 mol %, high internal AgI content type, diameter of the corresponding sphere 0.6μ, variation coefficient of the corresponding sphere diameter 38%, regular crystals, twinned crystal admixed grains, diameter/thickness ratio 4) | 0.40 (Coated silver weight) |
| Gelatin | 0.5 |

-continued

| | |
|---|---|
| ExS-4 | $5.0 \times 10^{-4}$ |
| ExS-5 | $2.0 \times 10^{-4}$ |
| ExS-6 | $0.3 \times 10^{-4}$ |
| ExM-9 | 0.25 |
| ExM-8 | 0.03 |
| ExM-10 | 0.015 |
| ExY-14 | 0.01 |
| Solv-1 | 0.2 |
| Ninth Layer (Third Green Sensitive Emulsion Layer) | |
| Silver iodobromide emulsion (AgI 6 mol %, high internal AgI content type, diameter of the corresponding sphere 1.0μ, variation coefficient of the corresponding sphere diameter 80%, regular crystals, twinned crystal admixed grains, diameter/thickness ratio 1.2) | 0.85 (Coated silver weight) |
| Gelatin | 1.0 |
| ExS-7 | $3.5 \times 10^{-4}$ |
| ExS-8 | $1.4 \times 10^{-4}$ |
| ExM-11 | 0.1 |
| ExM-12 | 0.03 |
| ExM-13 | 0.20 |
| ExM-8 | 0.02 |
| ExY-14 | 0.02 |
| Solv-1 | 0.20 |
| Solv-2 | 0.05 |
| Tenth Layer (Yellow Filter Layer) | |
| Gelatin | 1.2 |
| Yellow colloidal silver | 0.08 |
| Cpd-2 | 0.1 |
| Solv-1 | 0.3 |
| Eleventh Layer (First Blue Sensitive Emulsion Layer) | |
| Silver iodobromide emulsion (AgI 4 mol %, high internal AgI content type, diameter of the corresponding sphere 0.5μ, variation coefficient of the corresponding sphere diameter 15%, octahedral grains) | 0.4 (Coated silver weight) |
| Gelatin | 1.0 |
| ExS-9 | $2 \times 10^{-4}$ |

-continued

| | |
|---|---|
| ExY-16 | 0.9 |
| ExY-14 | 0.07 |
| Solv-1 | 0.20 |
| Twelfth Layer (Second Blue Sensitive Emulsion Layer) | |
| Silver iodobromide emulsion (AgI 10 mol %, high internal AgI content type, diameter of the corresponding sphere 1.3μ, variation coefficient of the corresponding sphere diameter 25%, regular crystals, twinned crystal admixed grains, diameter/thickness ratio 4.5) | 0.5 (Coated silver weight) |
| Gelatin | 0.6 |
| ExS-9 | $1 \times 10^{-4}$ |
| ExY-16 | 0.25 |
| Solv-1 | 0.07 |
| Thirteenth Layer (First Protective Layer) | |
| Gelatin | 0.8 |
| UV-1 | 0.1 |
| UV-2 | 0.2 |
| Solv-1 | 0.01 |
| Solv-1 | 0.01 |
| Fourteenth Layer (Second Protective Layer) | |
| Fine grained silver bromide (Average grain size 0.07μ) | 0.5 |
| Gelatin | 0.45 |
| Poly(methyl methacrylate) grains (diameter 1.5μ) | 0.2 |
| H-1 | 0.4 |
| Cpd-3 | 0.5 |
| Cpd-4 | 0.5 |

Surfactant was added to each layer as a coating aid in addition to the components indicated above. The sample prepared in this way was Sample 101.

The chemical structural formula or chemical name of the compounds used in the example are indicated below.

UV-1

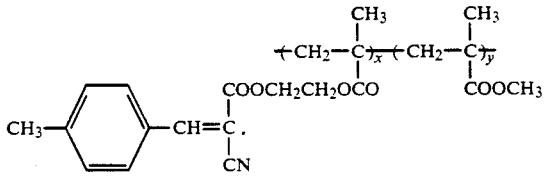

x/y = 7/3 (weight ratio)

UV-2

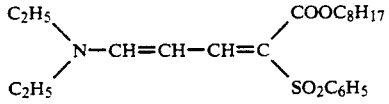

Solv-1 Tricresyl phosphate

Solv-2 Dibutyl phthalate

Solv-3 Bis(2-ethylhexyl)phthalate

ExM-8

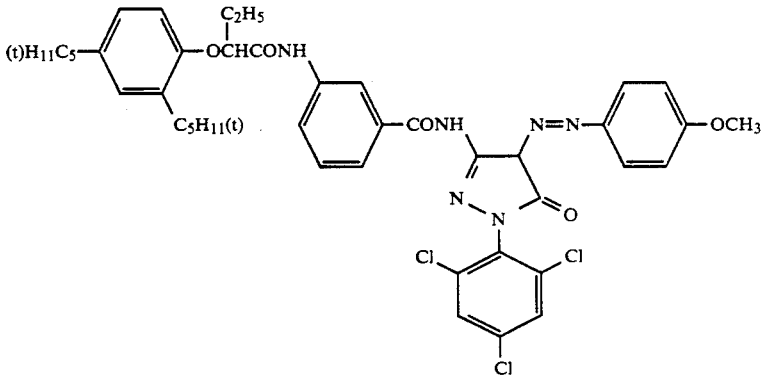

-continued
ExF-1
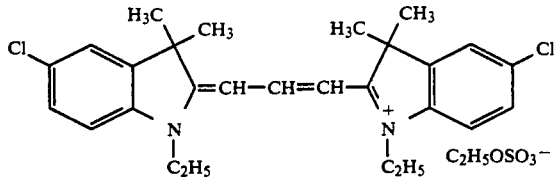
ExC-2
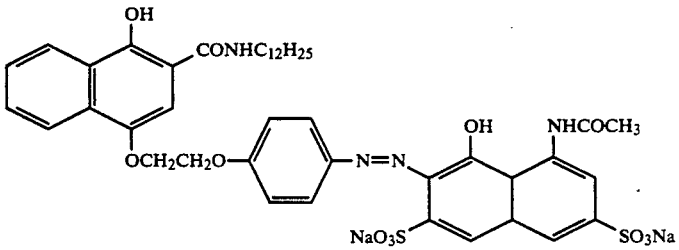
ExC-3
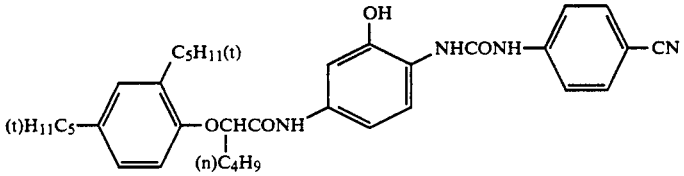
ExY-14
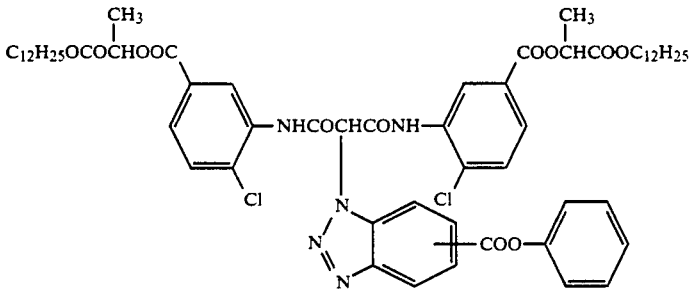
ExC-4
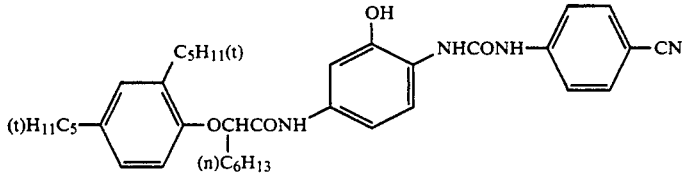
ExC-6
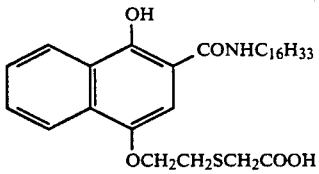
ExC-7
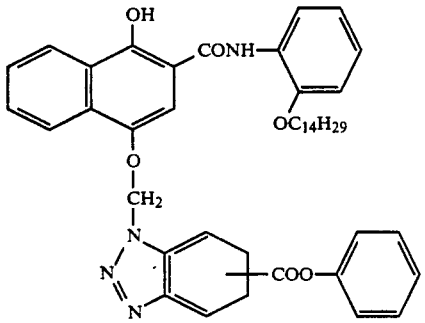

-continued
ExM-9
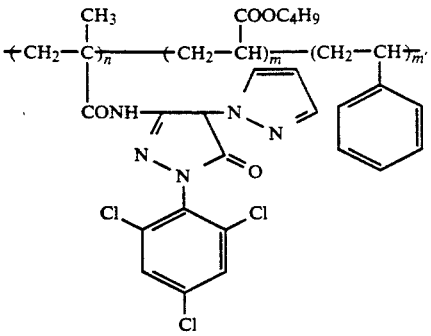
n = 50
m = 25
m' = 25
molecular weight: about 20,000
ExM-10
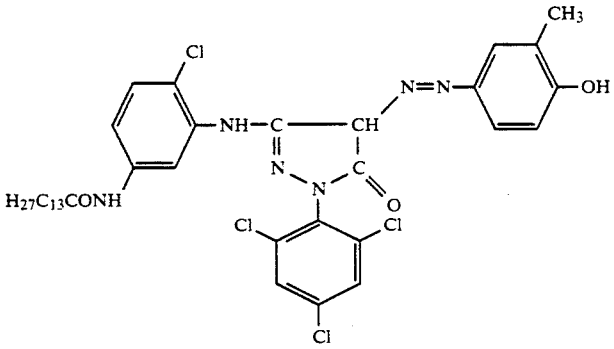
ExM-11
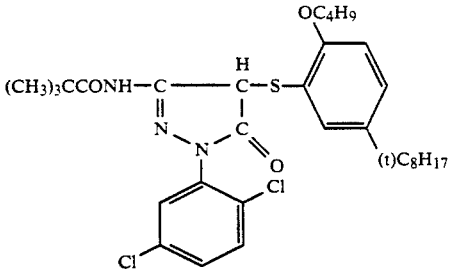
ExM-12
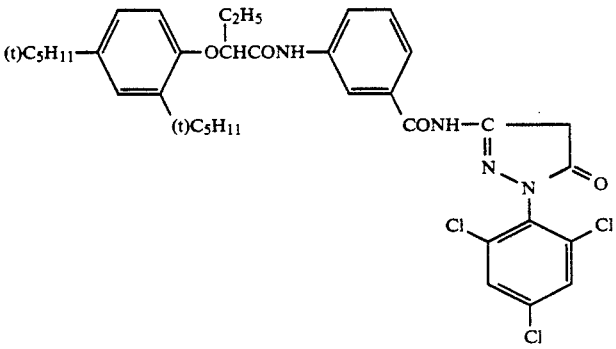

-continued
ExM-13
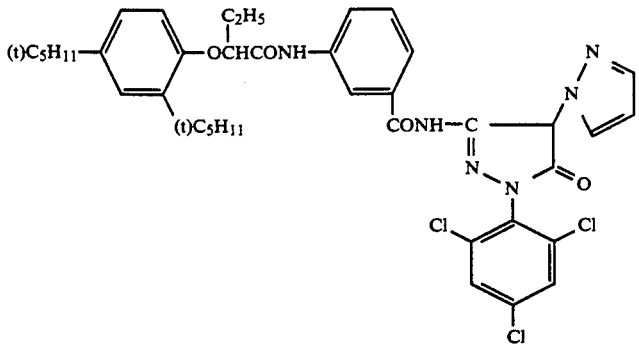
ExY-16
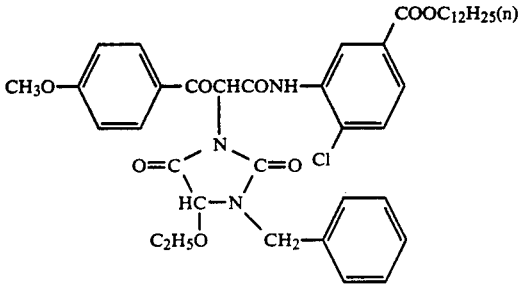
Cpd-1
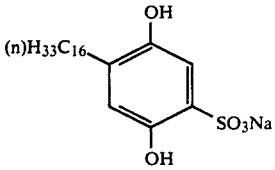
Cpd-2
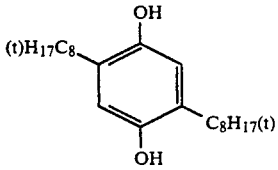
ExS-1
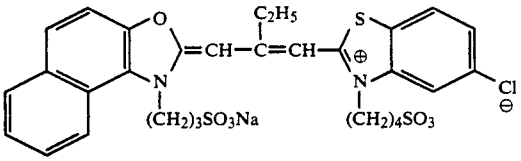
ExS-2
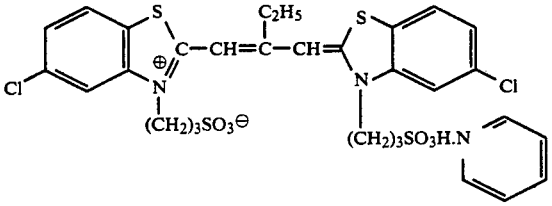
ExS-3
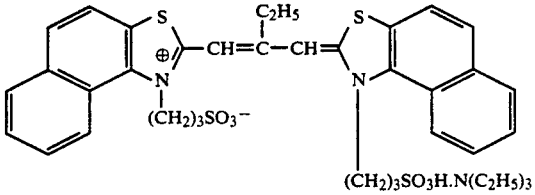

-continued
ExS-4
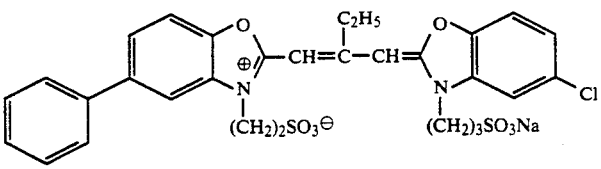
ExS-5
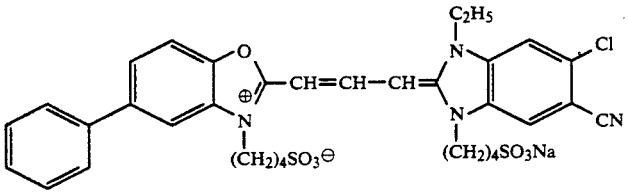
ExS-6
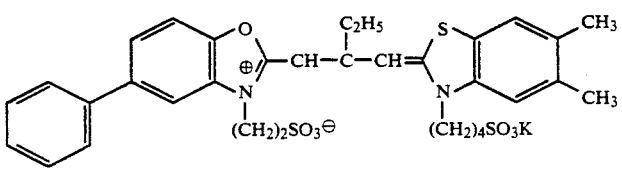
ExS-7
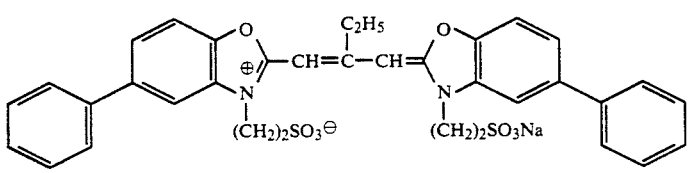
ExS-8
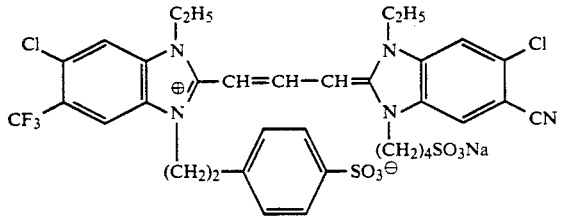
ExS-9
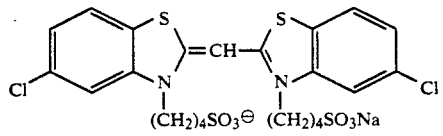
H-1
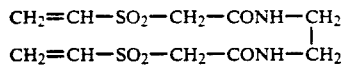
Cpd-3
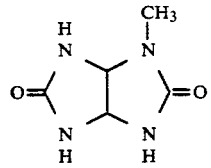
Cpd-4
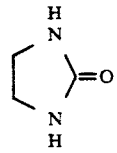
The sample prepared in the way described above was Sample 101.
Preparation of Sample 102
Sample 102 was prepared in the same way as Sample 101 except that an amount of Comparative Compound A, of which the structural formula is shown below, equimolar with the total amount of ExC-3 and ExC-4 Sample 101, was used in place of the ExC-3, ExC-4 added to the third and fourth layers in Sample 101.

Comparative Compound A

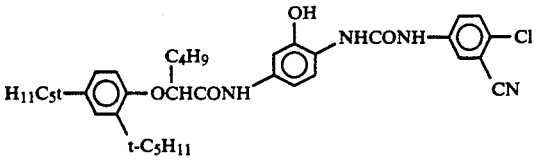

Preparation of Samples 103 to 110

Samples 103 to 110 were prepared in the same way as Sample 102 except that equimolar amounts of compounds of this invention as indicated in Table 3 below were used in place of Comparative Compound A and coupler ExC-6 in the fifth layer of Sample 102.

Samples 101 to 110 obtained were cut into strips of width 35 mm and then a standard photographic subject was photographed and 500 m running tests were carried out using the processing operations (I) and (II) described below, in Tables 1 and 2. On completion of the running tests, Samples 101 to 110 were given a 20 CMS wedge exposure using white light and processed using processing operations (I) and (II). The residual silver contents were measured subsequently using the fluorescence X-ray method, and density measurements were also made.

TABLE 1

Processing Operation (I) (Temperature 38° C.)

| Operation | Process (I) Time | Replenishment Rate* |
|---|---|---|
| Color development | 3 min. 15 sec. | 15 ml |
| Bleach | 2 min. 00 sec. | 5 ml |
| Fix | 4 min. 00 sec. | 30 ml |
| Stabilization (1) | 30 sec. | — |
| Stabilization (2) | 30 sec. | 30 ml |
| Stabilization (3) | 30 sec. | 30 ml |
| Drying (50° C.) | 1 min. 30 sec. | |

*Per 1 m × 35 mm width.

In the process described above stabilizations (1), (2) and (3) consisted of a counter-flow system going from (3) → (2) → (1). Furthermore, the carry-over of fixer bath into the water wash tank was 2 ml per meter.

| | Tank (Grams) | Replenisher (Grams) |
|---|---|---|
| Color Development Bath | | |
| Diethylenetriamine penta-acetic acid | 1.0 | 2.0 |
| 1-Hydroxyethylidene-1,1-diphosphonic acid | 2.0 | 3.3 |
| Sodium sulfite | 4.0 | 5.0 |
| Potassium carbonate | 30.0 | 38.0 |
| Potassium bromide | 1.4 | — |
| Potassium iodide | 1.3 mg | — |
| Hydroxylamine | 2.4 | 3.2 |
| 4-(N-Ethyl-N-β-hydroxyethylamino)-2-methylaniline sulfate | 4.5 | 7.2 |
| Water to make | 1 liter | 1 liter |
| pH | 10.00 | 10.05 |
| Bleach Bath | | |
| Ethylenediamine tetra-acetic acid ferric ammonium salt | 50 | 60 |
| 1,3-Diaminopropane tetra-acetic acid ferric ammonium salt | 60 | 72 |

-continued

| | Tank (Grams) | Replenisher (Grams) |
|---|---|---|
| Aqueous ammonia | 7 ml | 5 ml |
| Ammonium nitrate | 10.0 | 12.0 |
| Ammonium bromide | 150 | 170 |
| Water to make | 1 liter | 1 liter |
| pH | 6.0 | 5.8 |
| Fixing Bath | | |
| Ethylenediamine tetra-acetic acid di-sodium salt | 1.0 | 1.2 |
| Sodium sulfite | 4.0 | 5.0 |
| Sodium bisulfite | 4.6 | 5.8 |
| Aqueous ammonium thiosulfate solution (70%) | 175 ml | 200 ml |
| Water to make | 1 liter | 1 liter |
| pH | 6.6 | 6.6 |
| Stabilizing Bath | | |
| Formaldehyde (37% w/v) | 2.0 ml | 3.0 ml |
| Polyoxyethylene-p-monononylphenyl ether (average degree of polymerization 10) | 0.3 | 0.45 |
| 5-Chloro-2-methyl-4-isothiazolin-3-one | 0.03 | 0.045 |
| Water to make | 1 liter | 1 liter |

TABLE 2

Processing Operation (II) (Temperature 38° C.)

| Process | Processing Time | Tank Capacity | replenishment Rate* |
|---|---|---|---|
| Color Development | 3 min. 15 sec. | 8 liters | 15 ml |
| Bleach-Fix | 2 min. 30 sec. | 8 liters | 25 ml |
| Water Wash (1) | 20 sec. | 4 liters | — |
| Water Wash (2) | 20 sec. | 4 liters | — |
| Water Wash (3) | 20 sec. | 4 liters | 10 ml |
| Stabilization | 20 sec. | 4 liters | 10 ml |

*Per meter of photosensitive material 35 mm wide

In the process described above the water wash (1), (2) and (3) was a counter-flow system from 3) → (2) → (1).

| | Tank (Grams) | Replenisher (Grams) |
|---|---|---|
| Color Development Bath | | |
| Diethylenetriamine penta-acetic acid | 1.0 | 1.2 |
| 1-Hydroxyethylidene-1,1-diphosphonic acid | 2.0 | 2.4 |
| Sodium sulfite | 2.0 | 4.8 |
| Potassium carbonate | 35.0 | 45.0 |
| Potassium bromide | 1.6 | — |
| Potassium iodide | 2.0 mg | — |
| Hydroxylamine | 2.0 | 3.6 |
| 4-(N-Ethyl-N-β-hydroxyethylamino)-2-methylaniline sulfate | 5.0 | 7.5 |
| Water to make | 1 liter | 1 liter |
| pH (Adjusted with potassium hydroxide) | 10.20 | 10.35 |
| Bleach-Fix Bath | | |
| Ethylenediamine tetra-acetic acid ferric ammonium salt | 40 | 45 |
| Diethylenetriamine penta-acetic acid ferric ammonium salt | 40 | 45 |
| Ethylenediamine tetra-acetic acid di-sodium salt | 10 | 10 |
| Sodium sulfite | 15 | 20 |
| Aqueous ammonium thiosulfate solution (70% w/v) | 240 | 270 |
| Aqueous ammonia (26%) | 14 ml | 12 ml |
| Water to make | 1 liter | 1 liter |
| pH | 6.7 | 6.5 |

Water Wash Water

The three types indicated below were used. (1) Town Water

| | |
|---|---|
| Calcium | 26 mg/liter |
| Magnesium | 9 mg/liter |
| pH | 7.2 |

(2) Ion Exchanged Water

The town water described above was treated with a strongly acidic cation exchange resin (Na form) made by Mitsubishi Kasei Chemical Industries, Ltd. to provide the water quality indicated below.

| | |
|---|---|
| Calcium | 1.1 mg/liter |
| Magnesium | 0.5 mg/liter |
| pH | 6.6 |

(3) Town Water with Added Chelating Agent

Ethylenediamine tetra-acetic acid di-sodium salt was added to the aforementioned town water at the rate of 500 mg/liter.

| | |
|---|---|
| pH | 6.7 |

The samples were processed in these processing baths in accordance with the processing operations outlined above.

The results obtained are shown in Table 3 below.

TABLE 3

| Sample Number | Coupler in Layers 3 and 4 | Coupler in Layer 5 | Processing Operation | Residual Silver Content (mg/m$^2$) | $D_{min}$* (Magenta) |
|---|---|---|---|---|---|
| 101 (Comparison) | ExC-3 | ExC-6 | (I) | 100 | 0.51 |
| | | | (II) | 125 | 0.53 |
| 102 (Comparison) | A | ExC-6 | (I) | 98 | 0.53 |
| | | | (II) | 120 | 0.55 |
| 103 (Comparison) | ExC-3 | (33) | (I) | 21 | 0.53 |
| | | | (II) | 26 | 0.55 |
| 104 (Comparison) | A | (33) | (I) | 20 | 0.52 |
| | | | (II) | 28 | 0.56 |
| 105 (Invention) | A-18 | (33) | (I) | 8 | 0.44 |
| | | | (II) | 13 | 0.46 |
| 106 (Invention) | A-1 | (33) | (I) | 9 | 0.45 |
| | | | (II) | 13 | 0.46 |
| 107 (Invention) | A-18 | (21) | (I) | 3 | 0.45 |
| | | | (II) | 8 | 0.45 |
| 108 (Invention) | A-1 | (21) | (I) | 4 | 0.45 |
| | | | (II) | 8 | 0.45 |
| 109 (Comparison) | ExC-3 | (21) | (I) | 9 | 0.52 |
| | | | (II) | 14 | 0.54 |
| 110 (Comparison) | A | (21) | (I) | 10 | 0.54 |
| | | | (II) | 14 | 0.56 |

*$D_{min}$ here is the value including the film base density of 0.36 after de-silvering.

It is clear from the results shown in Table 3 above that the preferred, lower minimum density ($D_{min}$) was obtained when the couplers of this invention were used rather than when cases (Sample 104 to 110) in which a ureido-phenol type cyan coupler were used, both in process (I) in which individual bleach and fixing baths were used, and in process (II) in which a bleach-fix bath was used. In the case of process (II) which is a high speed process, a good, almost constant minimum density was obtained using the couplers of this invention, but there was a marked increase in the minimum density in the cases where a ureidophenol type cyan coupler was used.

Moreover, on looking at the change in gradation of the cyan layer on adding 50 ppm of ferric chloride in processing operation (II), it was found that there was no great change with any of Samples 101 to 110.

It was clear that the amount of residual silver was not more than 30 mg/m$^2$ and prints with which there were no particular, practical problems were obtained.

The samples of this invention have a satisfactorily low residual silver content for practical purposes and it is also known that the increase and fluctuation of $D_{min}$ for magenta were small.

It is possible by means of this invention to obtain silver halide color photographic materials which are superior in terms of the rapidity of de-silvering and which are improved in terms of re-coloring properties and minimum image density.

While the invention has been described in detail and with reference to specific embodiments thereof, it will be apparent to one skilled in the art that various changes and modifications can be made therein without departing from the spirit and scope thereof.

What is claimed is:

1. A silver halide color photographic material comprising a support having thereon at least one silver halide emulsion layer, wherein said material contains (1) at least one compound which reacts with an oxidized product of a primary aromatic amine based developing agent and releases a bleach accelerating agent, and (2) at least one cyan dye forming coupler represented by general formula (A) below which does not release a bleach accelerating agent upon reaction with the oxidized product of the developing agent:

General formula (A)

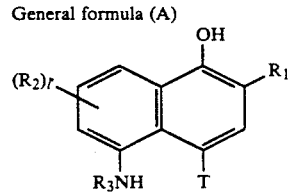

wherein $R_1$ represents a halogen atom, an aliphatic group, an aromatic group, a heterocyclic group, an amidino group, a guantidino group or a group which can be represented by —$COR_4$, —$SO_2R_4$,

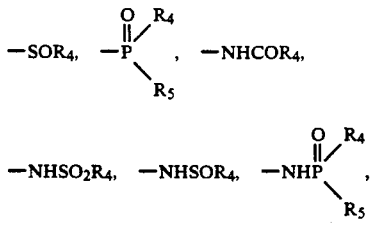

$R_2$ represents a halogen atom, a hydroxyl group, a carboxyl group, a sulfo group, an amino group, a cyano group, a nitro group, an aliphatic group, an aromatic group, a carbonamido group, a sulfonamido group, a carbamoyl group, a sulfamoyl group, a ureido group, an acyl group, an acyloxy group, an aliphatic oxy group, an aromatic oxy group, an aliphatic sulfonyl group, an aromatic sulfonyl group, an aliphatic sulfinyl group, an aromatic sulfinyl group, an aliphatic oxycarbonyl group, an aromatic oxycarbonyl group, an aliphatic oxycarbonylamino group, an aromatic oxycarbonylamino group, a sulfamoylamino group, a heterocyclic group or an imido group, l' represents an integer of value from 0 to 3, $R_3$ represents a hydrogen atom or $R_6U$, and T represents a hydrogen atom or a group which can be eliminated by a coupling reaction with the oxidized product of a primary aromatic amine developing agent, wherein $R_4$ and $R_5$ each represent independently an aliphatic group, an aromatic group, a heterocyclic group, an amino group, an aliphatic oxy group or an aromatic oxy group, and $R_6$ represents a hydrogen atom, an aliphatic group, an aromatic group, a heterocyclic group,

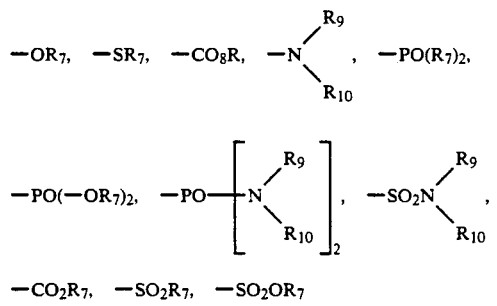

or an imido group, and U represents

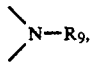

—CO—, —$SO_2$—, —SO— or a simple bond, wherein $R_7$ represents an aliphatic group, an aromatic group or a heterocyclic group, $R_8$ represents a hydrogen atom, an aliphatic group, an aromatic group or a heterocyclic group, and $R_9$ and $R_{10}$ each represent independently a hydrogen atom, an aliphatic group, an aromatic group, a heterocyclic group, an acyl group, an aliphatic sulfonyl group or an aromatic sulfonyl group, when l' is 2 or 3 the $R_2$ groups may be the same or different, and they may be joined together to form a ring, and $R_3$, or $R_3$ and T, may be joined, respectively, together to form rings, further, dimers or oligomers or polymers which are linked together via divalent groups or groups of a valency greater than two for any of $R_1$, $R_2$, $R_3$ or T may also be formed.

2. The silver halide photographic material of claim 1, wherein $R_1$ in general formula (A) represents a halogen atom or —$SO_2R_4$.

3. The silver halide photographic material of claim 1, wherein, l' in $(R_2)l'$ represents 0.

4. The silver halide photographic material of claim 1, wherein, $R_6$ of general formula (A) represents an aliphatic group, an aromatic group, —$OR_7$, or —$SR_7$.

5. The silver halide photographic material of claim 1, wherein, T in general formula (A) represents a hydrogen atom, a halogen atom, an aliphatic oxy group, an aromatic oxy group, an aliphatic thio group, or a heterocyclic thio group.

6. The silver halide photographic material of claim 1, wherein said coupler represented by general formula (A) is employed in an amount of from 0.01 mol % to 100 mol % with respect to the total amount of silver coated.

7. The silver halide photographic material of claim 6, wherein said coupler represented by general formula (A) is employed in an amount of from 0.01 mol % to 50 mol % with respect to the total amount of silver coated.

8. The silver halide photographic material of claim 7, wherein said coupler represented by general formula (A) is employed in an amount of from 1 mol % to 20 mol % with respect to the total amount of silver coated.

9. The silver halide photographic material of claim 1, wherein said compound which releases a bleach accelerating agent is represented by general formula (I) below:

$$A—(L)p—Z$$

wherein A represents a group of which the bond with $(L)_P$—Z is cleaved by reaction with the oxidized product of the developing agent, L represents a timing group or a group of which the bond with Z is cleaved by reaction with the oxidized product of the developing agent, p represents an integer of 0 to 3, and when p is 2 or 3, the p individual L groups may be the same of different, and Z represents a group which, when the bond with A—$(L)_P$ has been cleaved, has a bleach accelerating action.

10. The silver halide photographic material of claim 9, wherein said compound represented by general formula (I) is represented by general formula (I') below:

$$A—(L)_P—(Z_2)_b—A$$

wherein A represents a group of which the bond with $(L)_P$—$(Z_2)_b$—Z is cleaved by reaction with the oxidized product of the developing agent, $L_1$ represents a timing group or a group of which the bond with $(L)_p$—Z is cleaved by reaction with the oxidized product of the developing agent, $L_2$ represents a timing group or a group of which the bond with Z is cleaved by reaction with the oxidized product of the developing agent, Z represents a group which, when the bond with A—$(L)_P$—$(Z_2)_b$ has been cleaved, has a bleach accelerating action, and a and b each have a value of 0 or 1.

11. The silver halide color photographic material of claim 10, wherein, said group represented by Z is a group which can be represented by general formula (XII), (XIII) or (XIV) below:

General Formula (XII)

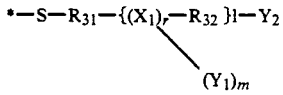

General Formula (XIII)

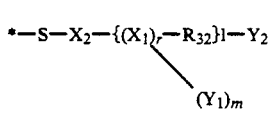

General Formula (XIV)

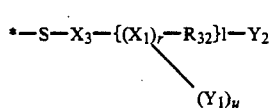

wherein * indicates the position of bonding with A—(L-)$_a$—(Z$_2$)$_b$—, $R_{31}$ represents a divalent aliphatic group which has from 1 to 8 carbon atoms, $R_{32}$ represents a group which has the same meaning as $R_{31}$, a divalent aromatic which has from 1 8 carbon atoms, $R_{32}$ represents a group group which has from 6 to 10 carbon atoms, or a three to eight membered divalent heterocyclic group, $X_1$ represents an —O— group, a —S— group, a —COO— group, a —$SO_2$— group, an $-\underset{\underset{R_{33}}{|}}{N}-$ group, an $-\underset{\underset{R_{33}}{|}}{N}-CO-$ group, an $-\underset{\underset{R_{33}}{|}}{N}-SO_2$ group, a $-S-\underset{\underset{O}{\|}}{C}-$ group, -continued a $-\underset{\underset{O}{\|}}{C}-$ group, a $-\underset{\underset{R_{33}}{|}}{N}COO-$ group, a $-\underset{\underset{R_{33}}{|}}{N}=C-$ group, an $-\underset{\underset{R_{33}}{|}}{N}CO-\underset{\underset{R_{34}}{|}}{N}-$ group or an $-\underset{\underset{R_{33}}{|}}{N}SO_2\underset{\underset{R_{34}}{|}}{N}-$ group, $X_2$ represents an aromatic group which has from 6 to 10 carbon atoms, $X_3$ represents a three to eight membered heterocyclic group which has at least one carbon atom which is bonded to sulfur within the ring, $Y_1$ represents a carboxyl group or a salt thereof, a sulfo group or a salt thereof, a hydroxyl group, a phosphonic acid group or a salt thereof, an amino group, an —$NHSO_2$—$R_{35}$ group, or —$SO_2NH$—$R_{35}$ group, $Y_2$ represents a group having the same meaning as those described for $Y_1$ or a hydrogen atom, r represents 0 or 1, l represents an integer of 0 to 4, m represents an integer of 1 to 4, and u represents an integer of 0 to 4.

12. The silver halide color photographic material of claim 1, wherein said compound which releases a bleach accelerating agent is employed in an amount of from $1\times10^{-7}$ to $5\times10^{-1}$ mol per square meter of photosensitive material.

13. The silver halide color photographic material of claim 1, wherein said compound which releases a bleach accelerating agent is employed in an amount of from $1—10^{-6}$ to $5\times10^{-2}$ mol per square meter of photosensitive material.

* * * * *